(12) United States Patent
Hwang et al.

(10) Patent No.: US 9,948,952 B2
(45) Date of Patent: Apr. 17, 2018

(54) BROADCAST SIGNAL TRANSMITTING DEVICE AND BROADCAST SIGNAL RECEIVING DEVICE

(71) Applicant: LG ELECTRONICS INC., Seoul (KR)

(72) Inventors: Soojin Hwang, Seoul (KR); Hyunmook Oh, Seoul (KR); Jongyeul Suh, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/117,372

(22) PCT Filed: Feb. 23, 2015

(86) PCT No.: PCT/KR2015/001727
§ 371 (c)(1),
(2) Date: Aug. 8, 2016

(87) PCT Pub. No.: WO2015/126213
PCT Pub. Date: Aug. 27, 2015

(65) Prior Publication Data
US 2016/0353130 A1   Dec. 1, 2016

Related U.S. Application Data

(60) Provisional application No. 61/942,628, filed on Feb. 21, 2014, provisional application No. 61/944,075, (Continued)

(51) Int. Cl.
*H04N 5/445* (2011.01)
*H04N 19/597* (2014.01)
(Continued)

(52) U.S. Cl.
CPC ....... *H04N 19/597* (2014.11); *H04N 13/0059* (2013.01); *H04N 19/463* (2014.11);
(Continued)

(58) Field of Classification Search
CPC .................................................. H04N 21/8146
(Continued)

(56) References Cited

U.S. PATENT DOCUMENTS

2012/0106921 A1* 5/2012 Sasaki ............... H04N 13/0048
386/230
2013/0142247 A1 6/2013 Hattori et al.
(Continued)

FOREIGN PATENT DOCUMENTS

EP        2651138 A1   10/2013
KR   10-2012-0038385 A   4/2012
(Continued)

*Primary Examiner* — Michael Hong
(74) *Attorney, Agent, or Firm* — Birch, Stewart, Kolasch & Birch, LLP

(57) ABSTRACT

A broadcast signal transmitting apparatus is provided. The broadcast signal transmitting apparatus includes a first encoder, a second encoder and a transmitter. The first encoder generates a video stream of a frame compatible 3-Dimensional Television (3DTV) service. The second encoder generates signaling information for signaling the video stream. The transmitter transmits a broadcast signal comprising the video stream and the signaling information. The signaling information includes first information indicating whether the video stream includes a frame packing arrangement supplemental enhancement information (SEI) message, service type information indicating that a service type of the video stream is a High Efficiency Video Coding (HEVC) frame compatible 3DTV service, and a plurality of component descriptors indicating a type of component stream with respect to the video stream. Each of the plurality of component descriptors includes: component tag information, first stream content information, second stream content information, and component type information.

12 Claims, 64 Drawing Sheets

Related U.S. Application Data filed on Feb. 25, 2014, provisional application No. 62/073,005, filed on Oct. 30, 2014.

(51) Int. Cl.
  *H04N 21/2362* (2011.01)
  *H04N 21/81* (2011.01)
  *H04N 21/845* (2011.01)
  *H04N 19/70* (2014.01)
  *H04N 13/00* (2018.01)
  *H04N 19/463* (2014.01)

(52) U.S. Cl.
  CPC ......... *H04N 19/70* (2014.11); *H04N 21/2362* (2013.01); *H04N 21/816* (2013.01); *H04N 21/8451* (2013.01)

(58) Field of Classification Search
  USPC .......................................................... 725/38
  See application file for complete search history.

(56) References Cited

U.S. PATENT DOCUMENTS

| | | |
|---|---|---|
| 2013/0155186 A1 | 6/2013 | Lee et al. |
| 2013/0162771 A1 | 6/2013 | Suh et al. |
| 2013/0169762 A1* | 7/2013 | Kanemaru ......... H04N 13/0452 348/51 |
| 2013/0182074 A1 | 7/2013 | Yun et al. |
| 2016/0286246 A1 | 9/2016 | Suh et al. |

FOREIGN PATENT DOCUMENTS

| | | |
|---|---|---|
| KR | 10-2013-0077828 A | 7/2013 |
| KR | 10-2013-0096223 A | 8/2013 |
| KR | 10-2014-0004069 A | 1/2014 |
| WO | WO 2012/050381 A2 | 4/2012 |
| WO | WO 2012/121543 A2 | 9/2012 |
| WO | WO 2014/003240 A1 | 1/2014 |

\* cited by examiner

FIG. 3

| Syntax | Number of bits | Identifier |
|---|---|---|
| network_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

FIG. 4

| Syntax | Number of bits | Identifier |
|---|---|---|
| service_list_descriptor(){ | | |
|   descriptor_tag | 8 | uimsbf |
|   descriptor_length | 8 | uimsbf |
|   for (i=0;i<N;I++){ | | |
|     service_id | 16 | uimsbf |
|     service_type | 8 | uimsbf |
|   } | | |
| } | | |

FIG. 5

| Syntax | Number of bits | Identifier |
|---|---|---|
| service_description_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i<N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j++){ | | |
|       descriptor() | | |
|     } | | |
|   } | | |
|   CRC_32 | 32 | rpchof |
| } | | |

FIG. 6

| Syntax | Number of bits | Identifier |
|---|---|---|
| service_descriptor(){ | | |
|    descriptor_tag | 8 | uimsbf |
|    descriptor_length | 8 | uimsbf |
|    service_type | 8 | uimsbf |
|    service_provider_name_length | 8 | uimsbf |
|    for (i=0;i<N;I++){ | | |
|       char | 8 | uimsbf |
|    } | | |
|    service_name_length | 8 | uimsbf |
|    for (i=0;i<N;I++){ | | |
|       char | 8 | uimsbf |
|    } | | |
| } | | |

FIG. 7

| Syntax | Number of bits | Identifier |
|---|---|---|
| TS_program_map_section() { | | |
|   table_id | 8 | uimsbf |
|   '0' | 1 | bslbf |
|   reserved | 1 | bslbf |
|   section_length | 2 | bslbf |
|   program_number | 12 | uimsbf |
|   reserved | 16 | uimsbf |
|   version_number | 5 | bslbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0; i < N; i++) { | | |
|     descriptor() | | |
|   } | | |
|   for (i = 0; i < N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | |

FIG. 8

| Syntax | Number of bits | Identifier |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

FIG. 9

| Syntax | Number of bits | Format |
|---|---|---|
| 3D_service_descriptor(){ | | |
|   descriptor_tag | 8 | 0×TBD |
|   descriptor_length | 8 | uimsbf |
|   reserved | 2 | '11' |
|   3D_structure | 4 | uimsbf |
|   3D_metadata_location_flag | 2 | bslbf |
|   reserved | 2 | '11' |
|   3D_sampling | 4 | uimsbf |
|   3D_orientation | 2 | uimsbf |
|   reserved | 2 | '11' |
|   if(3D_metadata_exist_flag='01'){ | | |
|     3D_metadata_type | 3 | uimsbf |
|     3D_metadata_length | 5 | uimsbf |
|     for (i=0;i<3D_metadata_length;i++){ | | |
|       3D_metadata[i] | 16 | uimsbf |
|     } | | |
|   } | | |
| } | | |

FIG. 13

| Syntax | Number of bits | Identifier |
|---|---|---|
| component_descriptor(){ | | |
|   descriptor_tag | 8 | uimsbf |
|   descriptor_length | 8 | uimsbf |
|   reserved_future_use | 4 | bslbf |
|   stream_content | 4 | uimsbf |
|   component_type | 8 | uimsbf |
|   component_tag | 8 | uimsbf |
|   ISO_639_language_code | 24 | bslbf |
|   for (i=0;i<N;i++){ | | |
|     text_char | 8 | uimsbf |
|   } | | |
| } | | |

FIG. 14

| Syntax | Number of bits | Identifier |
|---|---|---|
| linkage_descriptor(){ | | |
|   descriptor_tag | 8 | uimsbf |
|   descriptor_length | 8 | uimsbf |
|   transport_stream_id | 16 | uimsbf |
|   original_network_id | 16 | uimsbf |
|   service_id | 16 | uimsbf |
|   linkage_type | 8 | uimsbf |
|   if (linkage_type == 0x08){ | | |
|     mobile_hand-over_info() | | |
|   } else if (linkage_type == 0x0D){ | | |
|     event_linkage_info() | | |
|   } else if (linkage_type == 0x0E) { | | |
|     extended_event_linkage_info() | | |
|   } | | |
|   for (i=0;i<N;i++){ | | |
|     private_data_byte | 8 | bslbf |
|   } | | |
| } | | |

FIG. 17
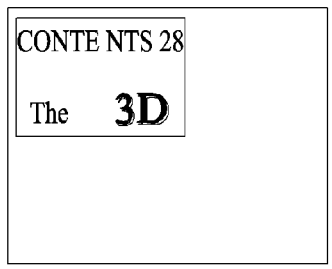
(a)
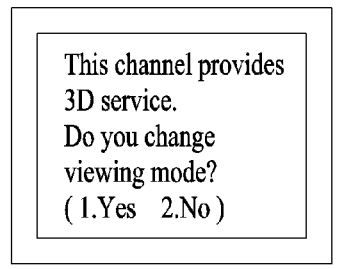
(b)
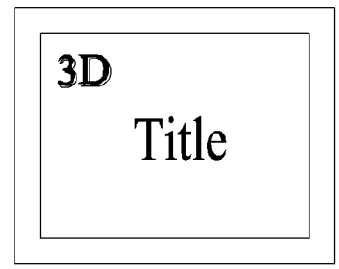
(c)

FIG. 21

| Simple Guide | | | |
|---|---|---|---|
| SBS | Wife Returns [2D]/[3D] | SBS news at 8 [2D] | SBS sports news [2D] |
| KBS | KBS sports news [2D] | Love in Asia [2D] | KBS news network [2D] |
| EBS | Magical Princess Seri [3D] | Self-conceit [2D]/[3D] | EBS news [2D] |
| MBC | MBC news [2D] | Star audition [2D] | High kick through the Roof [2D]/[3D] |

FIG. 22

| | 12:00 13:00 14:00 15:00 16:00 17:00 18:00 19:00 20:00 21:00 22:00 23:00 |
|---|---|
| SBS | SBS sports news [2D] |
| | Wife Returns #22 [2D] |
| | Wife Returns #22 [3D] |
| KBS | Taejo Wang Geon #30 [2D] |
| | KBS news network [2D] |
| EBS | Magical Princess Seri [2D] |
| | Self-conceit [2D] |
| MBC | High kick through the Roof #50 [2D] |
| | High kick through the Roof #50 [3D] |

FIG. 25

| KBS | Taejo Wang Geon #30  3D | |
| --- | --- | --- |
| | Taejo Wang Geon #30  2D This is 3D version of (Record Date : 2010/03/10) | |
| | Record reservation | Move back |

FIG. 30
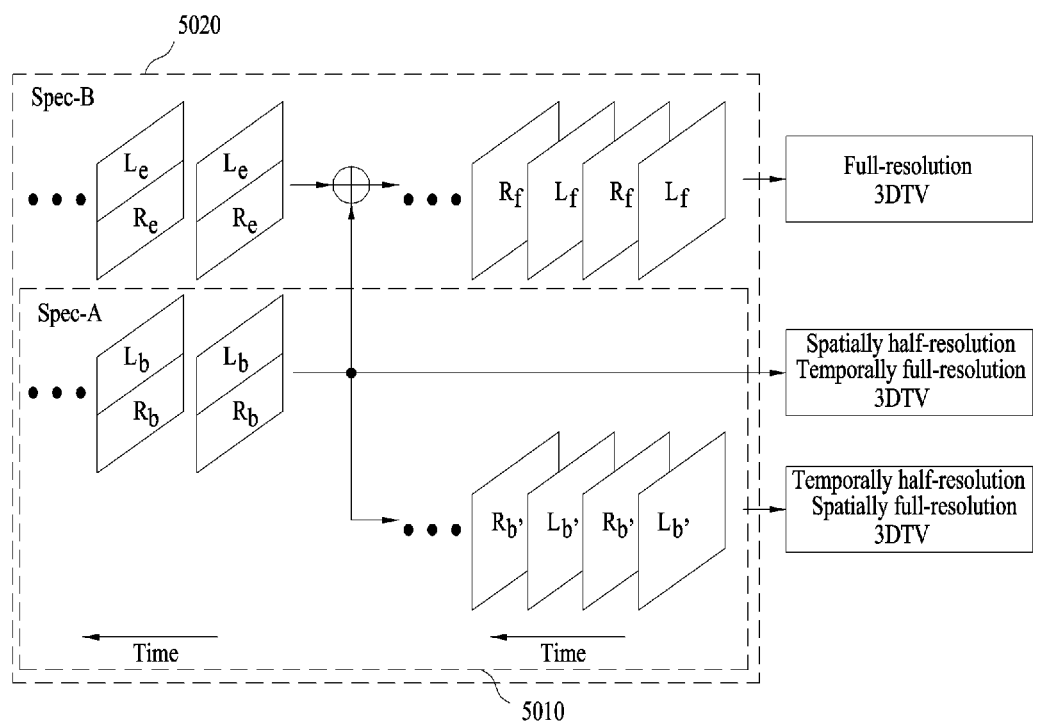
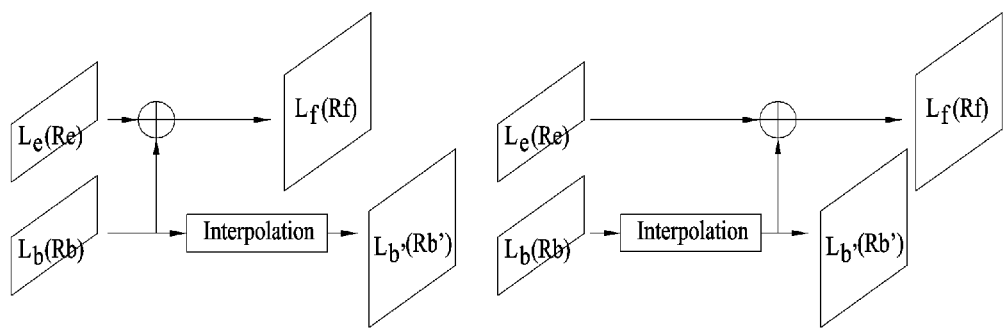

FIG. 31
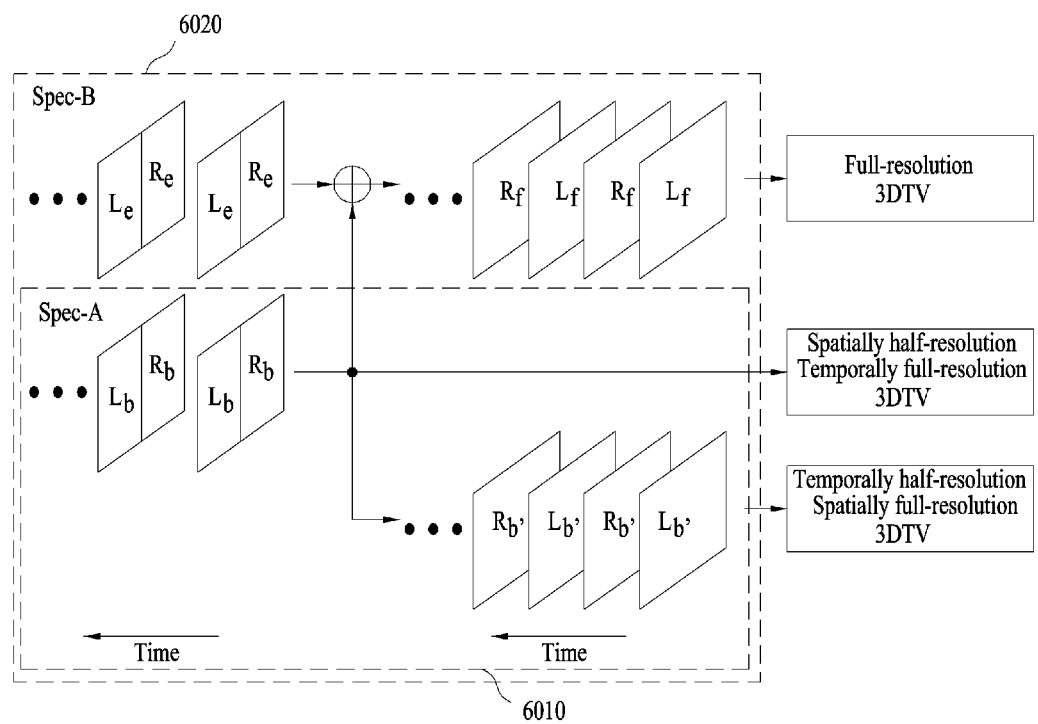
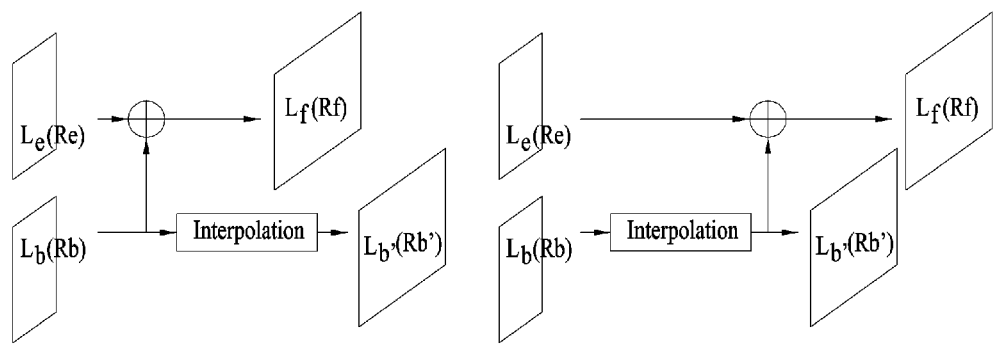

FIG. 33

|  | Near-term Half-res 3DTV | Next-Gen Full-res 3DTV |
|---|---|---|
| Current Source Device | Spec-A | Spec-A |
| Next-Gen Source Device | Spec-A | Spec-B |

FIG. 35

| Syntax | No. of Bits | Format | |
|---|---|---|---|
| terrestral_virtual_channel_table_section() { | | | |
|   table_id | 8 | 0xC8 | |
|   section_syntax_indicator | 1 | '1' | |
|   private_indicator | 1 | '1' | |
|   reserved | 2 | '11' | |
|   section_length | 12 | uimsbf | |
|   transport_stream_id | 16 | uimsbf | |
|   reserved | 2 | '11' | |
|   version_number | 5 | uimsbf | |
|   current_next_indicator | 1 | bslbf | |
|   section_number | 8 | uimsbf | |
|   last_section_number | 8 | uimsbf | |
|   protocol_version | 8 | uimsbf | |
|   num_channels_in_section | 8 | uimsbf | |
|   for (i=0; i< num_channels_in_section; i++) { | | | |
|     short_name | 7*16 | uimsbf | |
|     reserved | 4 | '1111' | |
|     major_channel_number | 10 | uimsbf | |
|     minor_channel_number | 10 | uimsbf | |
|     modulation_mode | 8 | uimsbf | |
|     carrier_frequency | 32 | uimsbf | |
|     channel_TSID | 16 | uimsbf | |
|     program_number | 16 | uimsbf | indicates 3D service 2.0 (Signals details on whether video data supporting Spec-B are included) |
|     ETM_location | 2 | uimsbf | |
|     access_controlled | 1 | bslbf | |
|     hidden | 1 | bslbf | |
|     reserved | 2 | '11' | |
|     hide_guide | 1 | bslbf | |
|     reserved | 3 | '111' | |
|     service_type | 6 | uimsbf | includes information on a complementary video component configuring a 3DTV service corresponding to Spec-B |
|     source_id | 16 | uimsbf | |
|     reserved | 6 | '111111' | |
|     descriptors_length | 10 | uimsbf | |
|     for (i=0; i<N; i++) { | | | |
|       descriptor() | | | |
|     } | | | |
|   } | | | |
|   reserved | 6 | '111111' | |
|   additional_descriptors_length | 10 | uimsbf | |
|   for (j=0; j<N; j++) { | | | |
|     additional_descriptor() | | | |
|   } | | | |
|   CRC_32 | 32 | rpchof | |
| } | | | |

8010 → reserved / hide_guide / reserved / service_type

8020 → source_id / reserved / descriptors_length / descriptor()

FIG. 36

| Syntax | No. of bits | Format |
|---|---|---|
| 3D_complementary_video_descriptor_VCT ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j < number_elements; j++) { | | |
|         reserved | 3 | '111' |
|         elementary_PID | 13 | uimsbf |
|         complementary_type | 7 | uimsbf |
|         naive_subsampling_flag | 1 | bslbf |
|         codec_type | 8 | uimsbf |
|         horizontal_size | 16 | uimsbf |
|         vertical_size | 16 | uimsbf |
|         frame_rate | 16 | uimsbf |
|         reserved | 5 | '11111' |
|         interpolation_filter_available_flag | 1 | uimsbf |
|         left_image_first_flag | 1 | bslbf |
|         complementary_first_flag | 1 | bslbf |
|     } | | |
| } | | |

FIG. 37

Meanings according to values of the Complementary_type field

| Value | Description |
|---|---|
| 0 | Line interleaving – complementary video carries complementary line data.<br>Depending on the value of complementary_first_flag, complementary video contains either even lines or odd lines part of the full resolution video frame while base video contain complementary lines.<br>Whether the line interleaving is done horizontally or vertically depends on the multiplexing type of the base video. (Side-by-Side will require vertical interleaving while Top-Bottom will require horizontal interleaving) |
| 1 | Pixel interleaving, order alternating between lines – complementary video carries every other pixel of the full resolution image.<br>Full resolution image will be constructed by interleaving base and complementary video by pixel-by-pixel basis.<br>The order of interleaving pixels will be changed between lines. (if order is fixed, it will be same as the vertical line interleaving)<br>The value of complementary_first_flag will tell which video component contains the first pixel of the reconstructed full resolution image. |
| 2 | Frame interleaving – complementary video carries every other frame of the full resolution image. (full resolution in terms of temporal resolution)<br>Full resolution image will be constructed by interleaving base and complementary video by frame-by-frame basis.<br>The value of complementary_first_flag will tell whether a frame from the complementary video component will be placed before or after the corresponding frame from the base video component. |
| 3 | Field interleaving – complementary video carries every other field of the full resolution image. (full resolution in terms of temporal resolution)<br>Full resolution image will be constructed by interleaving base and complementary video by field-by-field basis.<br>The value of complementary_first_flag will tell whether the complementary video component contains even or odd field of the full resolution image |
| 4 | Complementary video carries residual or incremental data.<br>Regardless of stereo-multiplexing format of the base video component, the complementary video component carries the residual or incremental data at the full resolution.<br>Thus it is required that the base video component be interpolated and doubled before combining it with the complementary video component data. |

FIG. 38

| Syntax | No. of bits | Format |
|---|---|---|
| 3D_complementary_video_descriptor_PMT ( ) { | | |
| descriptor_tag | 8 | 0xTBD |
| descriptor_length | 8 | uimsbf |
| complementary_type | 7 | uimsbf |
| native_subsampling_flag | 1 | bslbf |
| codec_type | 8 | uimsbf |
| horizontal_size | 16 | uimsbf |
| vertical_size | 16 | uimsbf |
| frame_rate | 16 | uimsbf |
| reserved | 5 | '11111' |
| interpolation_filter_available_flag | 1 | uimsbf |
| left_image_first_flag | 1 | bslbf |
| complementary_first_flag | 1 | bslbf |
| } | | |

FIG. 39

| Syntax | No. of Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor() | | |
|     } | | |
|     for (i=0; i< N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor() | | |
|         } | | |
|     } | | |
|     CRC_32 | 32 | rpchof |
| } | | |

11010

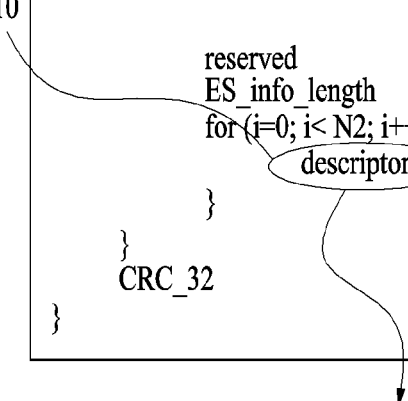
location of 3D_complementary_video_descriptor_PMT

FIG. 41

| Syntax | No. of bits | Format |
|---|---|---|
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

FIG. 43
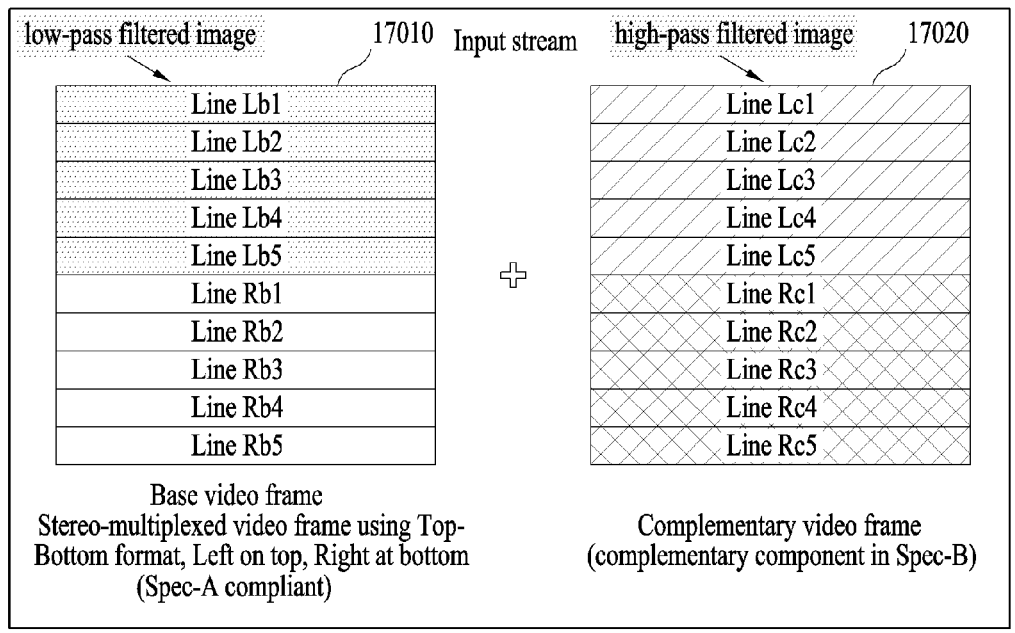
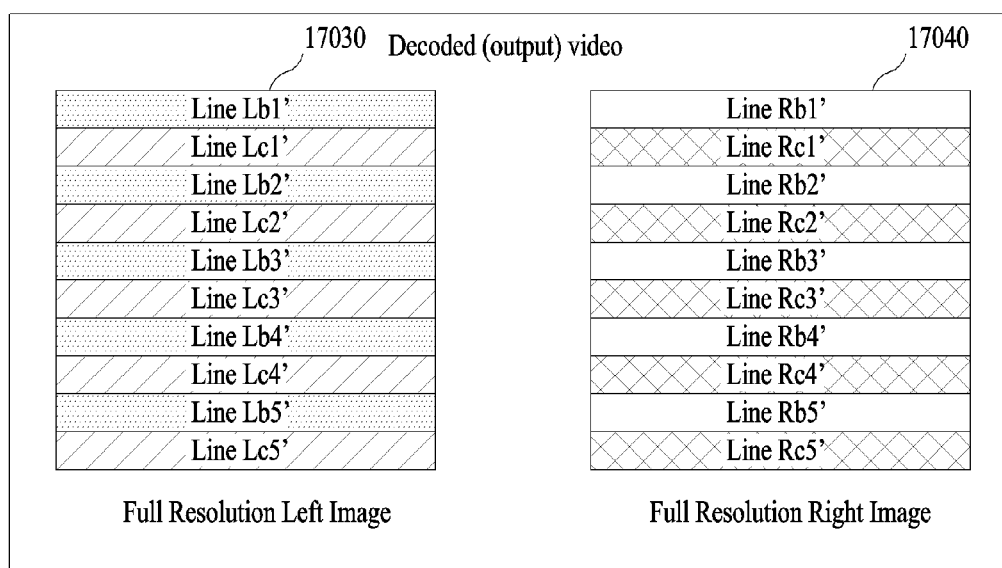

FIG. 46

| Syntax | No.of Bits | Identifier |
|---|---|---|
| service_descriptor_section( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i< N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j< N;j++){ | | |
|       descriptor( ) | | |
|     } | | |
|   } | | |
|   CRC_32 | 32 | rpchof |
| } | | |

1. Indicates that it is 3DTV 2.0 service in the Service Descriptor through Service type (signaling video data that supports Spec-B)

2. Includes information about complementary video component that configures 3DTV service corresponding to Spec-B

FIG. 47

| Stream_content | Description |
|---|---|
| 0×00 | reserved for future use |
| 0×01 | digital television service |
| 0×02 | digital radio sound service |
| 0×03 | Teletext service |
| 0×04 | NVOD reference service |
| 0×05 | NVOD time-shifted service |
| 0×06 | mosaic service |
| 0×07 | PAL coded signal |
| 0×08 | SECAM coded signal |
| 0×09 | D / D2-MAC |
| 0×0A | FM Radio |
| 0×0B | NTSC coded signal |
| 0×0C | data broadcast service |
| 0×0D | reserved for Common Interface Usage |
| 0×0E | RCS Map (see EN 301 790 [24]) |
| 0×0F | RCS FLS (see EN 301 790 [24]) |
| 0×10 | DVB MHP service |
| 0×0D to 0×7F | reserved for future use |
| 0×80 to 0×FE | user defined |
| 0×FF | reserved for future use |

FIG. 48

| Service_type | Description |
|---|---|
| 0x11 | Frame-compatible 3DTV service |
| 0x12 | DVB Full Resolution Stereoscopic 3DTV service – The service carries 3D television programming (stereo-multiplexed video, complementary video data to support the full resolution per eye, audio, and associated 3D metadata) |

FIG. 49

| Syntax | No.of Bits | Identifier |
|---|---|---|
| component_descriptor( ) { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO 639-2 [3]_language_code | 24 | bslbf |
|     for (i=0; < N; i++) { | 8 | uimsbf |
|         text_char | | |
|     } | | |
| } | | |

FIG. 50

| Stream_content | Component_type | Description |
|---|---|---|
| 0×01 | 0×11 | MPEG-2 video, Frame-compatible 3D video, 25Hz |
| 0×01 | 0×12 | MPEG-2 video, Frame-compatible 3D video, 30Hz |
| 0×01 | 0×13 | MPEG-2 video, 3D Complementary video for Full Resolution 3D Stereoscopic video, 25Hz |
| 0×01 | 0×14 | MPEG-2 video, 3D Complementary video for Full Resolution 3D Stereoscopic video, 30Hz |
| 0×03 | 0×14 | DVB subtitles (normal) for display on 3D monitor |
| 0×03 | 0×24 | DVB subtitles (for the hard of hearing) for display on 3D monitor |
| 0×05 | 0×11 | AVC/H.264 video, Frame-compatible 3D video, 25Hz |
| 0×05 | 0×12 | AVC/H.264 video, Frame-compatible 3D video, 30Hz |
| 0×05 | 0×13 | AVC/H.264 video, 3D Complementary video for Full Resolution 3D Stereoscopic video, 25Hz |
| 0×05 | 0×14 | AVC/H.264 video, 3D Complementary video for Full Resolution 3D Stereoscopic video, 30Hz |

FIG. 51

| Syntax | No. of bits | Format |
|---|---|---|
| 3D_complementary_video_descriptor_SDT ( ) { | | |
| descriptor_tag | 8 | 0xTBD |
| descriptor_length | 8 | uimsbf |
| descriptor_tag_extension | 8 | uimsbf |
| reserved | 1 | '1' |
| number_elements | 7 | uimsbf |
| for (j=0; j<number_elements; j++) { | | |
| component_tag | 8 | uimsbf |
| complementary_type | 7 | uimsbf |
| naive_subsampling_flag | 1 | bslbf |
| codec_type | 8 | uimsbf |
| horizontal_size | 16 | uimsbf |
| vertical_size | 16 | uimsbf |
| frame_rate | 16 | uimsbf |
| reserved | 5 | '11111' |
| interpolation_filter_available_flag | 1 | uimsbf |
| left_image_first_flag | 1 | bslbf |
| complementary_first_flag | 1 | bslbf |
| } | | |
| } | | |

FIG. 55

| Syntax | Number of bits | Identifier |
|---|---|---|
| event_information_section(){ | | |
|   table_id | 8 | uimsbf |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for(j=0;j<num_events_in_section;j++){ | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text() | var | |
|     reserved | 4 | '1111' |
|     descriptors_length | 12 | |
|     for(i=0;i<N;i++){ | | |
|       (descriptor()) | | |
|     } | | |
|   } | | |
|   CRC_32 | 32 | rpchof |
| } | | |

→ 3D_complementary_video_descriptor location

FIG. 56

| Syntax | Number of bits | Identifier |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

→ Location of Component descriptor or 3D_complementary_video_descriptor

FIG. 62

| FCC-3DTV system | Base layer stream_content/component_type | Enhancement layer stream_content/component_type |
|---|---|---|
| 25 Hz, Side-by-Side | 0x05/0x80 | 0x05/0x85 |
| 25 Hz, Top-and-Bottom | 0x05/0x81 | 0x05/0x85 |
| 30 Hz, Side-by-Side | 0x05/0x82 | 0x05/0x85 |
| 30 Hz, Top-and-Bottom | 0x05/0x83 | 0x05/0x85 |

FIG. 63

| linkage_type | link_type | Type of target service |
|---|---|---|
| 0x0E | 0 | SD |
| 0x0E | 1 | HD |
| 0x0E | 2 | frame compatible plano-stereoscopic |
| 0x0E | 3 | service compatible plano-stereoscopic MVC |

FIG. 67

| service_type | Description |
|---|---|
| 0x1F | H.265/HEVC frame compatible plano-stereoscopic HD digital television service |
| 0x20 | H.265/HEVC frame compatible plano-stereoscopic HD NVOD time-shifted service |
| 0x21 | H.265/HEVC frame compatible plano-stereoscopic HD NVOD reference service |

FIG. 68

| service_type | Description |
|---|---|
| 0x1F | H.265/HEVC frame compatible plano-stereoscopic 8 bit bitdepth HD digital television service |
| 0x20 | H.265/HEVC frame compatible plano-stereoscopic 8 bit bitdepth HD NVOD time-shifted service |
| 0x21 | H.265/HEVC frame compatible plano-stereoscopic 8 bit bitdepth HD NVOD reference service |
| 0x22 | H.265/HEVC frame compatible plano-stereoscopic 10 bit bitdepth HD digital television service |
| 0x23 | H.265/HEVC frame compatible plano-stereoscopic 10 bit bitdepth HD NVOD time-shifted service |
| 0x24 | H.265/HEVC frame compatible plano-stereoscopic 10 bit bitdepth HD NVOD reference service |

FIG. 69

| stream_content | component_type | 3DTV3 (phase 3) |
|---|---|---|
| 0x09 | 0x80 | H.265/HEVC plano-stereoscopic frame compatible high definition video, 16:9 aspect ratio, 25 Hz, Side-by-Side |
| 0x09 | 0x81 | H.265/HEVC plano-stereoscopic frame compatible high definition video, 16:9 aspect ratio, 25 Hz, Top-and-Bottom |
| 0x09 | 0x82 | H.265/HEVC plano-stereoscopic frame compatible high definition video, 16:9 aspect ratio, 30 Hz, Side-by-Side |
| 0x09 | 0x83 | H.265/HEVC plano-stereoscopic frame compatible high definition video, 16:9 aspect ratio, 30 Hz, Top-and-Bottom |

FIG. 70

| stream_content | component_type | 3DTV3 (phase 3) |
|---|---|---|
| 0x09 | 0x80 | H.265/HEVC plano-stereoscopic frame compatible high definition video, 16:9 aspect ratio, 25 Hz, Side-by-Side, 8 bit bitdepth |
| 0x09 | 0x81 | H.265/HEVC plano-stereoscopic frame compatible high definition video, 16:9 aspect ratio, 25 Hz, Top-and-Bottom, 8 bit bitdepth |
| 0x09 | 0x82 | H.265/HEVC plano-stereoscopic frame compatible high definition video, 16:9 aspect ratio, 30 Hz, Side-by-Side, 8 bit bitdepth |
| 0x09 | 0x83 | H.265/HEVC plano-stereoscopic frame compatible high definition video, 16:9 aspect ratio, 30 Hz, Top-and-Bottom, 8 bit bitdepth |
| 0x09 | 0x84 | H.265/HEVC plano-stereoscopic frame compatible high definition video, 16:9 aspect ratio, 25 Hz, Side-by-Side, 10 bit bitdepth |
| 0x09 | 0x85 | H.265/HEVC plano-stereoscopic frame compatible high definition video, 16:9 aspect ratio, 25 Hz, Top-and-Bottom, 10 bit bitdepth |
| 0x09 | 0x86 | H.265/HEVC plano-stereoscopic frame compatible high definition video, 16:9 aspect ratio, 30 Hz, Side-by-Side, 10 bit bitdepth |
| 0x09 | 0x87 | H.265/HEVC plano-stereoscopic frame compatible high definition video, 16:9 aspect ratio, 30 Hz, Top-and-Bottom, 10 bit bitdepth |

FIG. 71

| stream_content | stream_content_ext | component_type | 3DTV3 (phase 3) |
|---|---|---|---|
| 0xA | 0x0 | 0x00 | Top-and-Bottom |
| 0xA | 0x0 | 0x01 | Side-by-side |
| 0xA | 0x0 | 0x02 - 0xFF | Reserved |
| 0xA | 0x0 - 0xF | 0x00 - 0xFF | Reserved |

FIG. 72

| linkage_type | link_type | Type of target service |
|---|---|---|
| 0x0E | 0 | SD |
| 0x0E | 1 | HD |
| 0x0E | 2 | frame compatible plano-stereoscopic |
| 0x0E | 3 | service compatible plano-stereoscopic MVC |

BROADCAST SIGNAL TRANSMITTING DEVICE AND BROADCAST SIGNAL RECEIVING DEVICE

CROSS REFERENCE TO RELATED APPLICATIONS

This application is the National Phase of PCT International Application No. PCT/KR2015/001727, filed on Feb. 23, 2015, which claims priority under 35 U.S.C. 119(e) to U.S. Provisional Application Nos. 61/942,628, filed on Feb. 21, 2014, 61/944,075 filed on Feb. 25, 2014 and 62/073,005 filed on Oct. 30, 2014, all of which are hereby expressly incorporated by reference into the present application.

TECHNICAL FIELD

The present invention relates to a broadcast signal transmitting apparatus and a broadcast signal receiving apparatus, and more particularly, to a broadcast signal transmitting apparatus and a broadcast signal receiving apparatus, the video signal including additional information for identifying and processing a frame compatible video stream encoded in High Efficiency Video Coding (HEVC) to be service compatible.

BACKGROUND ART

A three-dimensional (3D) image allows the human to feel a cubic effect according to a principle that the human feels perspective using a stereo visual principle of two eyes, that is, parallax of two eyes, in other words, binocular parallax due to an interval between two eyes spaced apart by about 65 mm. To this end, the 3D image may allow the human to feel cubic effect and perspective by providing flat images that are associated to a left eye and a right eye, respectively.

A conventional broadcast service has been still mainly composed of a two-dimensional (2D) service for a 2D image to this day when digital broadcast is activated from an analog broadcast era.

However, recently, as interest in a 3D service for a 3D image (or stereoscopic image) for allowing presence and cubic effect compared with a flat 2D service from a specific field becomes higher, investment and services in the 3D service has gradually increased.

Also, there have been many researches on display devices for providing a 3D service.

A 3D image (i.e., stereoscopic image) may provide a cubic effect using principles of stereoscopic vision of two eyes of the human. The human (i.e., man or woman) detects perspective through parallax between two eyes, i.e., binocular parallax caused by human's two eyes spaced apart by about 65 mm. Accordingly, a 3D image provides flat images that are associated with a left eye and a right eye for image enabling and viewing so as to provide a cubic effect and perspective.

Methods of displaying a 3D image include a stereoscopic method, a volume metric method, a holographic method, and so on. In the stereoscopic method, a left visual image viewed by a left eye and a right visual image viewed by a right eye are provided and the left eye and the right eye perceive the left visual image and the right visual image through polarizing glasses or display equipment, respectively, thereby allowing a viewer to perceive a 3D effect.

DISCLOSURE

Technical Problem

Although, conventionally, digital broadcast entirely replaced analog broadcast, the possibility that a three-dimensional (3D) service and a 2D service coexist rather than entirely replacing the 2D service is high.

However, a standard for a 3D service is not established yet and, thus, a transmitter and a receiver may confuse a 2D service with the 3D service and the receiver may not appropriately handle the 3D service that may be provided in various manners.

Accordingly, according to the present invention, a transmitted and received 3D service may be signal such that a receiver may appropriately handle a 3D service received by the receiver.

Thereby, the present invention defines a method of smoothly conversion between 2D/3D services by a receiver.

An object of the present invention devised to provide a more convenient and effective broadcast environment to a user by transmitting and receiving information of 3D video data during transmission of a video stream for stereoscopic display by a 3D broadcast system and processing 3D video data using the information.

Technical Solution

The object of the present invention can be achieved by providing a broadcast signal transmitting apparatus (or transmitter or transmitting system or transmitting device) and a broadcast signal receiving apparatus (or receiver or receiving system or receiving device).

In another aspect of the present invention, provided herein is a broadcast signal transmitting apparatus including a first encoder configured to generate a video stream of a frame compatible 3-Dimensional Television (3DTV) service for a video component, a second encoder configured to generate signaling information for signaling the video stream, the signaling information including first information indicating whether the video stream is a frame compatible 3DTV video format or a High Definition Television (HDTV) video format, service type information indicating that a service type of the video stream is a High Efficiency Video Coding (HEVC) service, and a plurality of component descriptors indicating a type of the HEVC service with respect to the video stream, and a transmitting unit configured to transmit a broadcast signal including the video stream and the signaling information.

When the first information indicates that the video stream is the frame compatible 3DTV video format, the signaling information may further include a Frame Packing Arrangement SEI message for signaling an attribute of the video component of the frame compatible 3DTV service.

Each component descriptor may include first stream content information indicating a type of the video stream, second stream content information combined with the first stream content information to indicate the type of the video stream, and component type information indicating a type of the video component, and the plurality of component descriptors may indicate a type of the HEVC service based on the first stream content information, the second stream content information, and the component type information.

The plurality of component descriptors may include a first component descriptor, the first component descriptor may include codec information of the video stream, and the codec information may indicate HEVC.

The plurality of component descriptors may include at least one second component descriptor, and the at least one second component descriptor may include at least one of the codec information of the video stream, profile information, resolution information, image ratio information, frame rate information, image format information, and/or Bitdepth information.

The service type information and the first component descriptor may be included in a Service Descriptor Table (SDT), and the at least one second component descriptor may be included in an Event Information Table (EIT).

The image format information may indicate one of a side-by-side format and a top and bottom format.

In another aspect of the present invention, provided herein is a broadcast signal receiving apparatus including a receiving unit (or part) configured to receive a broadcast signal including a video stream of a frame compatible 3-Dimensional Television (3DTV) service for a video component and signaling information for signaling the video stream, the signaling information including first information indicating whether the video stream is a frame compatible 3DTV video format or a High Definition Television (HDTV) video format, service type information indicating that a service type of the video stream is a High Efficiency Video Coding (HEVC) service, and a plurality of component descriptors indicating a type of the HEVC service with respect to the video stream, a signaling information processor configured to identify a type of the video stream based on the signaling information, and an output unit configured to output the video stream in one of the 3DTV video format and the HDTV video format based on the type of the video stream.

When the first information indicates that the video stream is the frame compatible 3DTV video format, the signaling information may further include a Frame Packing Arrangement SEI message for signaling an attribute of the video component of a frame compatible 3DTV service; and the output unit may output the video stream in the 3DTV video format based on the Frame Packing Arrangement SEI message.

Each component descriptor may include first stream content information indicating a type of the video stream, second stream content information combined with the first stream content information to indicate a type of the video stream, and component type information indicating a type of the video component, and the plurality of component descriptors may indicate a type of the HEVC service based on the first stream content information, the second stream content information, and the component type information.

The plurality of component descriptors may include a first component descriptor, the first component descriptor may include codec information of the video stream, and the codec information may indicate HEVC.

The plurality of component descriptors may include at least one second component descriptor, and the at least one second component descriptor may include at least one of codec information of the video stream, profile information, resolution information, image ratio information, frame rate information, image format information, and/or Bitdepth information.

The service type information and the first component descriptor may be included in a Service Descriptor Table (SDT), and the at least one second component descriptor may be included in an Event Information Table (EIT).

The image format information may indicate one of a side-by-side format and a top and bottom format.

Advantageous Effects

According to the present invention,

First, when a three-dimensional (3D) service is dedicated or coexists with a two-dimensional (2D) service, the 3D service may be differentiated.

Second, a 3D service that is manufactured and provided in various manners may be appropriately signaled.

Third, a request for conversion between 2D/3D services may be appropriately handled.

Fourth, a broadcast signal of a video stream encoded using a H.265/High efficiency video coding (HEVC) coding scheme may be transmitted and/or received.

Fifth, a service frame compatible plano-stereoscopic 3DTV for HEVC coded services (SFC 3DTV service) with respect to services (e.g., video stream and video data) encoded using a H.265/High efficiency video coding (HEVC) may be provided.

DESCRIPTION OF DRAWINGS

FIG. 3 shows a bitstream syntax for a Network Information Table (NIT) section including a service list descriptor according to the present invention;

FIG. 4 shows a bitstream syntax illustrating a service list descriptor according to the present invention;

FIG. 5 shows a bitstream syntax illustrating a Service Description Table (SDT) including a service descriptor according to the present invention;

FIG. 6 shows a bitstream syntax illustrating a service descriptor according to the present invention;

FIGS. 7 and 8 illustrate bitstream syntaxes of examples of a Program Map Table (PMT) section and an Event Information Table (EIT) section, each of which includes a service descriptor;

FIG. 9 illustrates a bitstream syntax illustrating a 3D service descriptor according to the present invention;

FIG. 13 illustrates an example of a bitstream syntax of the component descriptor according to the present invention;

FIG. 14 illustrates an example of a bitstream syntax of the linkage descriptor according to the present invention;

FIG. 17 illustrates a UI according to an example embodiment of the present invention;

FIGS. 21 and 22 illustrate exemplary EPG screen images according to the present invention;

FIG. 25 illustrates an example of a detailed UI shown in FIG. 24;

FIG. 30 illustrates a method for providing a 3D broadcast service according to another embodiment of the present invention;

FIG. 31 illustrates a method for providing a 3D broadcast service according to another embodiment of the present invention;

FIG. 33 illustrates the full forward and backward interoperability for providing a 3D broadcast service according to an embodiment of the present invention;

FIG. 35 illustrates a syntax structure of a TVCT including 3D complementary video information according to an embodiment of the present invention;

FIG. 36 illustrates a syntax structure of a 3D complementary video descriptor included in a TVCT according to an embodiment of the present invention;

FIG. 37 illustrates an image configuration method according to a field value of a complementary_type field included in 3D complementary video information according to an embodiment of the present invention.

FIG. 38 illustrates a syntax structure of a PMT including 3D complementary video information according to an embodiment of the present invention;

FIG. 39 illustrates a syntax structure of a PMT including a 3D complementary video information according to another embodiment of the present invention;

FIG. 41 illustrates a Supplemental Enhancement Information (SEI) syntax structure of a user identifier and structure for decoding 3D complementary video information according to an embodiment of the present invention;

FIG. 43 illustrates a method for providing a full-resolution image using base video data, complementary video data, and 3D complementary video information received from a 3D video service Spec-B according to another embodiment of the present invention;

FIG. 46 illustrates a method of signaling a 3D broadcast service using Service Descriptor Table (SDT) according to an embodiment of the present invention;

FIG. 47 illustrates a service type values for signaling 3DTV service using SDT according to an embodiment of the present invention;

FIG. 48 illustrates additional service type values and descriptions for signaling 3DTV service using SDT according to an embodiment of the present invention;

FIG. 49 illustrates component descriptor indicating each elementary stream for DVB broadcast service according to an embodiment of the present invention;

FIG. 50 illustrates stream content, component type, and description for indicating a full-resolution 3D stereoscopic service in a DVB broadcast system according to an embodiment of the present invention;

FIG. 51 illustrates a syntax structure of a 3D complementary video descriptor for SDT according to an embodiment of the present invention;

FIG. 55 illustrates information on full-resolution 3DTV service located in ATSC PSIP EIT section according to an embodiment of the present invention;

FIG. 56 illustrates information on a full-resolution 3DTV service located in DVB SI EIT section according to an embodiment of the present invention;

FIG. 62 illustrates a stream_content field and/or a component_type field of a component descriptor according to an embodiment of the present invention;

FIG. 63 illustrates a linkage_type field and/or link_type field of a linkage descriptor according to an embodiment of the present invention;

FIG. 67 illustrates a service_type field of a service descriptor according to an embodiment of the present invention;

FIG. 68 illustrates a service_type field of a service descriptor according to an embodiment of the present invention;

FIG. 69 illustrates a stream_content field and/or a component_type field of a component descriptor according to an embodiment of the present invention;

FIG. 70 illustrates a stream_content field and/or a component_type field of a component descriptor according to an embodiment of the present invention;

FIG. 71 illustrates a stream_content field and/or a component_type field of a component descriptor according to an embodiment of the present invention;

FIG. 72 illustrates a linkage_type field and/or a link_type field of a linkage descriptor according to an embodiment of the present invention.

BEST MODE

Figure 1:
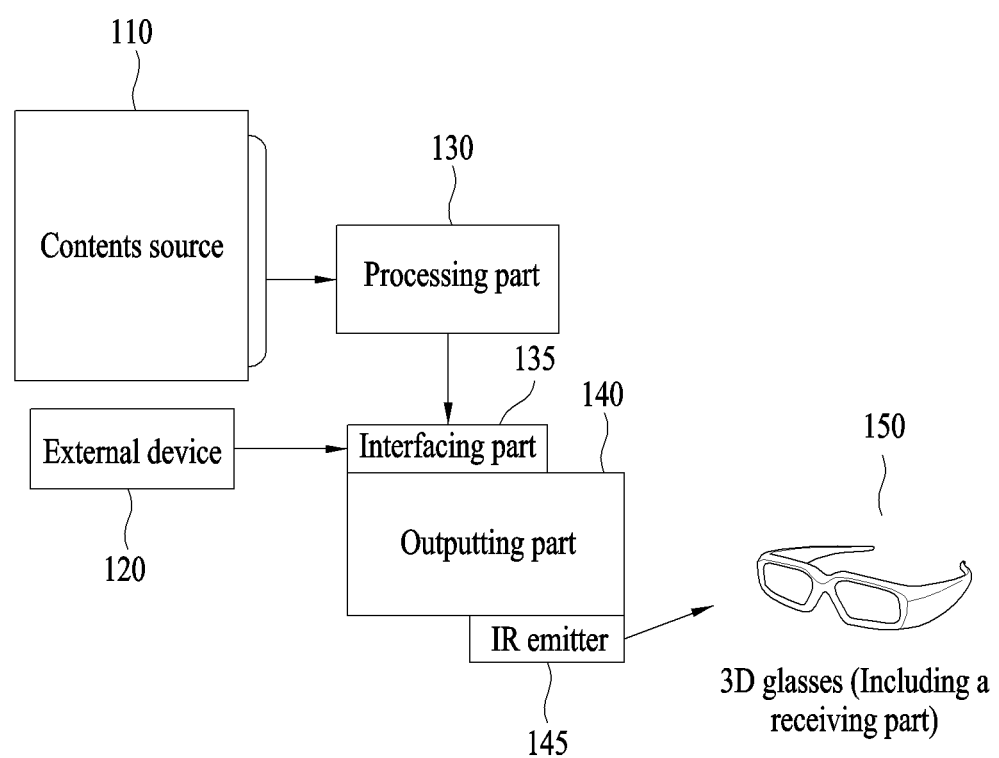
FIG. 1 is a block diagram illustrating an example of an image display apparatus according to the present invention.

Reference will now be made in detail to the preferred embodiments of the present invention with reference to the accompanying drawings. A method and apparatus for processing an image according to embodiments of the present invention will hereinafter be described with reference to the accompanying drawings.

Specifically, embodiments of the present invention provide an image processing method and apparatus to provide a variety of signaling information about identifying/processing of a three dimensional (3D) service, and allow a transmission/reception unit to process the signaling information.

For convenience of description and better understanding of the present invention, the present invention will hereinafter be described using a digital receiver as a 3D service processor. The digital receiver may include a digital television receiver, a receiving set including a set-top box (STB) for processing a 3D service and a display unit for processing the processed 3D image, and all devices (e.g., a personal digital assistant (PDA), a mobile phone, and a smart phone) capable of receiving, processing and providing 3D image data. In addition, the digital receiver may be any one of a 3D dedicated receiver and a 2D/3D combined receiver.

Associated with the present invention, a variety of 3D images may be used in the embodiments of the present invention, for example, a stereoscopic image (also called a stereo image) for utilizing two view points and a multiple view image (also called a multi-view image) for utilizing three or more view points.

The stereoscopic image may indicate one pair of right view image and left view image acquired when a left-side camera and a right-side camera spaced apart from each other by a predetermined distance capture the same target object. The multi-view image may indicate three or more images captured by three or more cameras spaced apart by a predetermined distance or angle.

A variety of transport formats may be used for the stereoscopic image disclosed in the above-mentioned description, for example, a single video stream format, a multiple video stream format (also called a multi-video stream format), etc.

There are a variety of single video stream formats, for example, a side-by-side format, a top/down format, an interlaced format, a frame sequential format, a checker board format, an anaglyph format, etc. And, a variety of multiple video stream formats may be used, for example, a full left/right format, a full left/half right format, a 2D video/depth format, etc.

A stereoscopic image or a multi-view image may be compressed and coded according to a variety of methods including a Moving Picture Experts Group (MPEG) scheme, and transmitted to a reception system.

For example, the stereoscopic image, for example, the side by side format, the top/down format, the interlaced format, the frame sequential format, or the checker board format, may be compressed and coded according to the H.264/Advanced Video Coding (AVC) scheme, and transmitted. In this case, the reception system may decode the stereoscopic image in reverse order of the H.264/AVC coding scheme, such that it can obtain the 3D image.

In addition, one of left view images of the full left/half right format or one of multi-view images may be assigned to an image of a base layer, and the remaining images may be assigned to an image of an enhanced layer. The base layer image may be encoded using the same method as the monoscopic imaging method. In association with the enhanced layer image, only information of a correlation between the base layer image and the enhanced layer image may be encoded and transmitted. As an exemplary compression coding scheme for the base layer image, a Joint Photographic Experts Group (JPEG), an MPEG-1, an MPEG-2, an MPEG-4, or a H.264/AVC scheme may be used. In one embodiment of the present invention, the H.264/Multi-view Video Coding (MVC) scheme may be used as the compression coding scheme for the enhanced layer image. In this case, the stereoscopic image may be assigned to a base layer image and a single enhanced layer image, but the multi view image may be assigned to a single base layer image and a plurality of enhanced layer images.

A reference for discriminating between the base layer image and at least one enhanced layer image may be determined according to a position of a camera, or may be determined according to an arrangement format of the camera. Alternatively, the base layer image and the at least one enhanced layer image may also be distinguished from each other on the basis of an arbitrary reference instead of a special reference.

The above-mentioned 3D image display method may be classified into a stereoscopic scheme, a volumetric scheme, a holographic scheme, etc. In addition, a 3D image display device adds depth information to two dimensional (2D) images, such that a user of the 3D image display device can feel a sense of vividness and a sense of reality in a 3D image.

In addition, a method for allowing the user to view the 3D image may be exemplarily classified into a first method for providing the user with glasses and a second method where the user does not wear glasses.

The first method for providing the user with polarized glasses is classified into a passive scheme and an active scheme. The passive scheme displays a left view image and a right view image using a polarization filter in different ways. The active scheme can discriminate between a left view image and a right view image using a liquid crystal shutter. In more detail, the left view image (i.e., a user's left eye) and the right view image (i.e., a user's right eye) are sequentially covered according to the active scheme, such that the left view image and the right view image can be distinguished from each other. That is, the active scheme repeatedly displays screen images created by time division at intervals of a predetermined time period, and allows a user who wears glasses including an electronic shutter synchronized with the predetermined time period to view a 3D image. The active scheme may also be called a scheme of a time split type or a scheme of a shuttered glass type.

Representative examples of the second scheme where the user does not wear glasses are a lenticular scheme and a parallax barrier scheme. In accordance with the lenticular scheme, a lenticular lens plate in which a cylindrical lens array is vertically arranged is installed in front of a video panel. In accordance with the parallax barrier scheme, a barrier layer including periodic slits is installed on the video panel. In order to more easily explain the technical idea of the present invention, a stereoscopic scheme among 3D display schemes will be used as an example, and the active scheme among stereoscopic schemes will be used as an example. However, although the shutter glasses will be used as an exemplary medium of the active scheme, the scope and spirit of the present invention are not limited thereto, and can also be applied to other mediums as necessary without departing from the spirit or scope of the present invention.

The embodiments of the present invention will hereinafter disclose a method for signaling a stereoscopic service using System Information (SI) so as to transmit/receive a stereoscopic video signal over a terrestrial DTV broadcast channel.

FIG. 1 is a block diagram illustrating an example of an image display apparatus according to the present invention.

Referring to FIG. 1, the image display apparatus according to the present invention mainly includes a processing part 130 for processing input sources received from the contents source 110, and an outputting part (i.e., a display unit) 140 for processing audio/video (A/V) data processed by the processing part 130. In this case, the source may exemplarily include a 3D image. The image display apparatus may further include an interfacing unit 135 for processing input sources received from an external device, except for input sources received from the content source 110. The image display apparatus may further include an Infrared Rays (IR) emitter 145 for outputting a synchronization signal (such as synchronization information) so as to allow a user who wears 3D glasses 150 to view a 3D image in such a manner that the user can view sources provided from the outputting unit 140.

In the image display apparatus shown in FIG. 1, the processing part 130 and the display unit 140 are configured in the form of one set acting as a digital receiver, or the processing part 130 may configured in the form of a set-top box (STB) so that the outputting part 140 may operate as a display used as only a output part of signals processed by the STB. Especially, in the latter case, the aforementioned interfacing part 135 may be used to exchange data between the processing part 130 and the outputting part 140.

In the above-mentioned description, the interfacing part 135 may be an interface (I/F) for supporting the High Definition Multimedia Interface (HDMI) specification supporting 3D services.

In addition, the 3D image may be contained in signals or sources received from the contents source 110, such as terrestrial broadcasting, cable broadcasting, satellite broadcasting, an optical disc, Internet Protocol Television (IPTV) broadcasting, or may be directly received from an external device 120 such as a universal serial bus (USB) or a game console. In the latter case in which the 3D image is directly received from the external device 120, signaling information for image display must be defined and provided in the interfacing unit 135 on the basis of the information provided from the external device 120.

In the case of using the external device 120, various formats of 3D images, for example, DivX, component, AV, SCART (Syndicat des Constructeurs d'Appareils Radiorecepteurs et Televiseurs, Radio and Television Receiver Manufacturers' Association) may be input to the image display apparatus. The image display apparatus may include various components for processing the above-mentioned formats.

The 3D glasses 150 may enable a user to view 3D images provided from the outputting part 140 using the receiving part (not shown) that receives a synchronization signal from the IR emitter 145. In this case, the 3D glasses 150 may further include a unit for performing 2D/3D viewing mode switching, and may further include a generator (not shown) for generating individual synchronization information according to the viewing mode switching unit. In addition, the synchronization information generated from the 3D glasses 150 may be generated when a viewing-mode switching request received from the viewing mode switching unit is transmitted to the image display apparatus or when synchronization information is received from the image display apparatus, and the image display apparatus may generate the synchronization information by referring to pre-received synchronization information. In this case, the 3D glasses 150 may further include a storage unit (or a memory) for storing the pre-received synchronization information from the image display apparatus.

Figure 2:
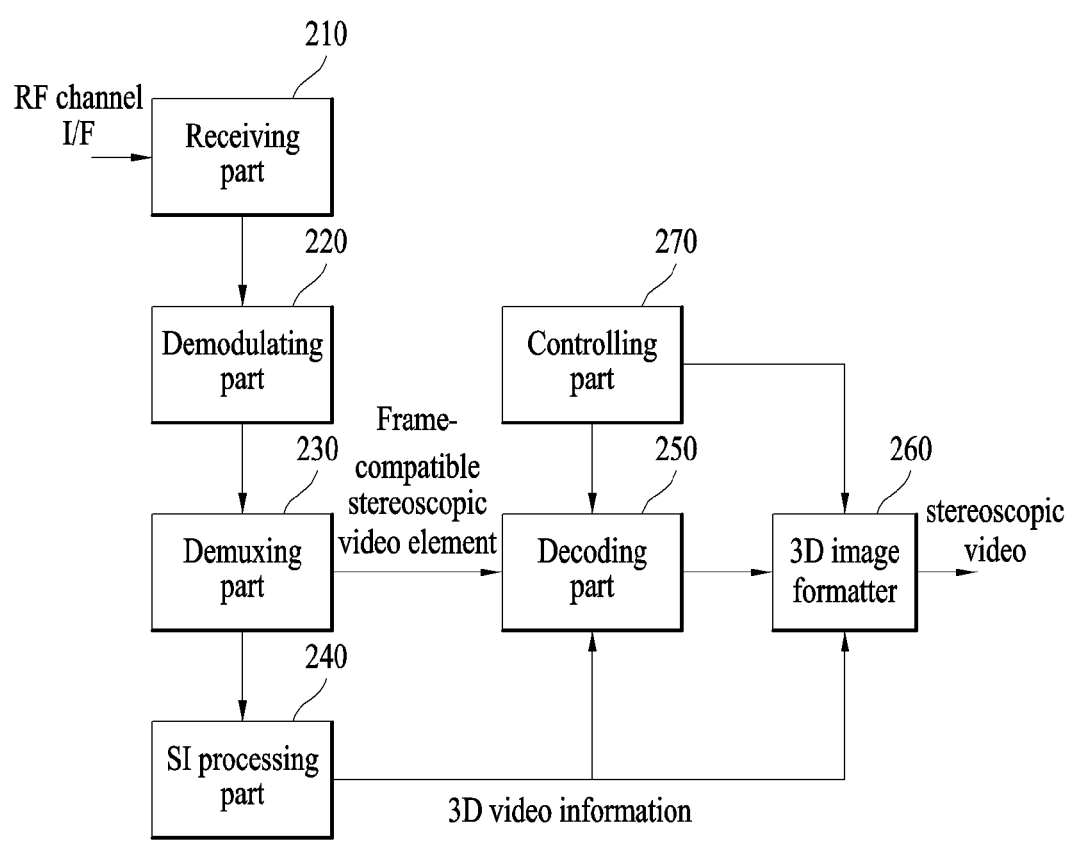
FIG. 2 is a block diagram illustrating another example of the 3D image display apparatus according to the present invention.

FIG. 2 is a block diagram illustrating another example of the 3D image display apparatus according to the present invention. For example, FIG. 2 may be a detailed block diagram of the processing part 130 shown in FIG. 1.

Referring to FIG. 2, the image display apparatus according to the present invention includes a receiving part 210, a demodulating part 220, a demultiplexing part 230, a system information or signaling information (SI) processing part 240, a video decoder 250, a 3D image formatter 260, and a controlling part 270.

Basic operations of the above-mentioned components of the image display apparatus will hereinafter be described, and a detailed description of the following embodiments will be given below with reference to the annexed drawings.

The receiving part 210 receives a digital broadcast signal including 3D image data from the contents source 110 through a radio frequency (RF) channel.

The demodulating part 220 demodulates the digital broadcast signal received from the receiving part 210 using the demodulation scheme mapped to the modulation scheme.

The demultiplexing part 230 may demultiplex audio data, video data and signaling information received from the demodulated digital signal. For this operation, the demultiplexing part 230 performs filtering using a packet identifier (PID) so as to demultiplex the digital broadcast signal. The demultiplexing part 230 outputs the demultiplexed video signal to the latter video decoder 220, and outputs the signaling information to the SI processing part 240. In this case, the signaling information may be any one of system information, for example, Program Specific Information (PSI), Program and System Information Protocol (PSIP), Digital Video Broadcasting-Service Information (DVB-SI), etc.

The SI processing part 240 processes signaling information received from the demultiplexing part 230, and outputs the processed signaling information to the controlling part 270. In this case, the SI processing part 240 may further include a database (DB) for temporarily storing the processed signaling information therein. A detailed description of such signaling information will be given in the following embodiments of the present invention.

The SI processing part 240 determines the presence or absence of signaling information that indicates whether content is a 2D or 3D image. If the presence of the signaling information is decided, the SI processing part 240 reads the signaling information and transmits it to the controlling part 270.

The video decoder 250 receives and decodes the demultiplexed video data. In this case, the decoding may be exemplarily performed on the basis of signaling information processed by the SI processing part 240.

The 3D image formatter 260 performs formatting of 3D image data decoded by the video decoder 260 according to an output format, and outputs the formatted result to the outputting part 140. In this case, the 3D image formatter 260 may be activated only when the decoded image data is 3D image data as necessary. In other words, if the decoded image data is 2D image data, the 3D image formatter 260 may be deactivated. Namely, the 3D image formatter 260 may bypass input image data in such a manner that the input image data is output without any additional processing.

The 3D image formatter 260 performs the required conversion from the input (decoded) video format to native 3D display format. Video processing such as artifact reduction, sharpness, contrast enhancement, de-interlacing, frame rate conversion, and other types of quality enhancement blocks can exist between the video decoder 250 and 3D image formatter 260.

As described above, the present invention enables a DTV receiving apparatus supporting a 3D video processing function to process a 3D video broadcast signal transmitted through a DTV broadcast signal, and output 3D video data on the screen.

For the above-mentioned function, the present invention provides a method for defining one or more descriptors for a 3D service/event supporting reception of a stereoscopic 3D broadcast signal, receiving a stereoscopic broadcast signal using the one or more descriptors, and supporting an stereoscopic display output. The existing terrestrial DTV reception standard is based on 2D video content. Especially, a descriptor for the 3D codec must be defined for the 3D TV service. In addition, the receiver has to properly process such a modified signal such that it can receive and output the 3D broadcast service.

The SI standard related to the existing DVB transmission is limited only to the 2D video service. Therefore, in order to receive a 3DTV signal, specifically, a stereoscopic video signal, through a terrestrial DTV broadcast channel, it is necessary for the existing SI standard to perform signaling of the stereoscopic service. In order to effectively perform signaling of the stereoscopic service, it is necessary to newly design and implement a DTV receiver so as to support 3D broadcast reception.

A service type for indicating a 3D service is defined in a service descriptor of an SDT. A 3D service descriptor for indicating details information about a 3D service and event (program) is defined. In order to indicate a 3D service through an EIT, a method for representing 3D images is defined using a stream_content and a component_type. The receiver processes newly defined 3D signaling so that 2D/3D service switching is smoothly performed.

A variety of signaling methods according to individual levels in association with 3D signaling will hereinafter be described in detail. For example, the term level may indicate a service level in units of a service, content in a service, and a content level in units of an event.

In this case, a descriptor format is mainly used to describe the signaling method of the present invention. However, the scope or spirit of the signaling method is not limited only to the descriptor format, and it should be noted that the concept of a conventional table section field may be extended and a new field may be added as necessary.

FIG. 3 illustrates a bitstream syntax for a Network Information Table (NIT) section including a service list descriptor according to the present invention. FIG. 4 shows a bitstream syntax illustrating a service list descriptor according to the present invention.

The NIT may convey information relating to a physical organization of the multiplexes/TSs carried via a given network, and the characteristics of the network itself. The combination of original_network_id and transport_stream_id allow each TS to be uniquely identified throughout the application area of the present document. Networks are assigned individual network_id values, which serve as unique identification codes for networks. The network_id and the original_network_id can take a same value, or may have to take different values subject to the allocation constraints for original_network_id and network_id.

The receiver may be able to store the NIT information in non-volatile memory in order to minimize the access time when switching between channels (channel hopping). It is also possible to transmit a NIT for other networks in addition to the actual network. Differentiation between the NIT for the actual network and the NIT for other networks is achieved using different table_id values.

Any sections forming part of an NIT shall be transmitted in TS packets with a PID value of 0x0010. Any sections of the NIT which describe the actual network (that is, the network of which the TS containing the NIT is a part) shall have the table_id 0x40 with the same table_id_extension (network_id). The network_id field takes the value assigned to the actual network.

Individual fields of the NIT section will hereinafter be described with reference to FIG. 3.

A table_id field may indicate the NIT section at this table section by a predefined value. A section_syntax_indicator field shall be set to 1. A section_length may be a 12-bit field, the first two bits of which shall be 00. It specifies the number of bytes of the section, starting immediately following the section_length field and including the CRC. The section_length shall not exceed 1021 so that the entire section has a maximum length of 1024 bytes.

A network_id field may serve as a label to identify the delivery system, about which the NIT informs, from any other delivery system. A version_number field may be a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table defined by the table_id and network_id. When the current_next_indicator is set to 0, then the version_number shall be that of the next applicable sub_table defined by the table_id and network_id. A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid.

A section_number field may give a number of the section. The section_number of the first section in the sub_table shall be 0x00. The section_number shall be incremented by 1 with each additional section with the same table_id and network_id. A last_section_number field may specify a number of the last section (that is, the section with the highest section_number) of the sub_table of which this section is part. A network_descriptors_length field may give a total length in bytes of the following network descriptors. A transport_stream_loop_length field may specify a total length in bytes of the TS loops that follow, ending immediately before the first CRC-32 byte. A transport_stream_id field may serve as a label for identification of this TS from any other multiplex within the delivery system. An original_network_id field may give a label identifying the network_id of the originating delivery system. A transport_descriptors_length field may specify a total length in bytes of TS descriptors that follow.

A CRC_32 field may contain a CRC value that gives a zero output of the registers in the decoder after processing the entire section.

Referring to FIG. 4, the service list descriptor is used as an NIT descriptor, such that it is possible to recognize an overall 3D service list.

The service list descriptor shown in FIG. 4 will hereinafter be described in detail.

The service list descriptor provides a means of listing the services by service_id and service type.

A descriptor_tag field may identify a corresponding descriptor by predefined values of descriptor_tag. A descriptor_length field may specify a total number of bytes of the data portion of the descriptor following the byte defining the value of this field.

A service_id field uniquely identifies a service within a TS. The service_id is the same as the program_number in the corresponding program_map_section, except that in the case of service_type=0x04, 0x18 or 0x1B (NVOD reference services) the service_id does not have a corresponding program_number.

A service_type field may specify a type of the service. The assignment of service_type value for a service is more specifically described in Table 1.

As described above, the image display apparatus performs filtering of the NIT sections shown in FIG. 3, parses service_list_descriptor (See FIG. 4) contained in the filtered NIT sections, recognizes service_id in which service_type field is a frame-compatible 3DTV service, and collects/outputs only the list of 3D service (program).

FIG. 5 shows a bitstream syntax illustrating a Service Description Table (SDT) including a service descriptor according to the present invention. FIG. 6 shows a bitstream syntax illustrating a service descriptor according to the present invention.

Each sub_table of the SDT shall describe services that are contained within a particular TS. The services may be part of the actual TS or part of other TSs, these being identified by means of the table_id. Any sections forming part of an SDT shall be transmitted in TS packets with a PID value of 0x0011. Any sections of the SDT which describe the actual TS (that is, the TS containing the SDT) shall have the table_id value 0x42 with the same table_id_extension (transport_stream_id) and with the same original_network_id. Any sections of an SDT which refer to a TS other than the actual TS shall take a table_id value of 0x46.

Individual fields of the SDT section will hereinafter be described with reference to FIG. 5.

A table_id field may indicate the NIT section at this table section by a predefined value. A section_syntax_indicator may be a 1-bit field which shall be set to 1. A section_length may be a 12-bit field, the first two bits of which shall be 00. It specifies the number of bytes of the section, starting immediately following the section_length field and including the CRC. The section_length shall not exceed 1021 so that the entire section has a maximum length of 1024 bytes.

A transport_stream_id may be a 16-bit field which serves as a label for identification of the TS, about which the SDT informs, from any other multiplex within the delivery system.

A version_number field may be a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table. When the current_next_indicator is set to 0, then the version_number shall be that of the next applicable sub_table. A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid.

A section_number field may give the number of the section. The section_number of the first section in the sub_table shall be 0x00. The section_number shall be incremented by 1 with each additional section with the same table_id, transport_stream_id, and original_network_id. A last_section_number field may specify the number of the last section (that is, the section with the highest section_number) of the sub_table of which this section is part. An original_network_id field may give the label identifying the network_id of the originating delivery system. A service_id may be a 16-bit field which serves as a label to identify this service from any other service within the TS. The service_id is the same as the program_number in the corresponding program_map_section.

An EIT_schedule_flag may be a 1-bit field which when set to 1 indicates that EIT schedule information for the service is present in the current TS, for information on maximum time interval between occurrences of an EIT schedule sub_table. If the flag is set to 0 then the EIT schedule information for the service should not be present in the TS. An EIT_present_following_flag may be a 1-bit field which when set to 1 indicates that EIT_present_following information for the service is present in the current TS, for information on maximum time interval between occurrences of an EIT present/following sub_table. If the flag is set to 0 then the EIT present/following information for the service should not be present in the TS.

A running_status may be a 3-bit field indicating the status of the service. For an Near Video On Demand (NVOD) reference service the value of the running_status shall be set to 0. A free_CA_mode may be a 1-bit field, when set to 0 indicates that all the component streams of the service are not scrambled. When set to 1 it indicates that access to one or more streams may be controlled by a Conditional Access (CA) system. A descriptors_loop_length field may give a total length in bytes of the following descriptors.

A CRC_32 may be a 32-bit field that contains the CRC value that gives a zero output of the registers in the decoder after processing the entire section.

Referring to FIG. 6, a service descriptor is used as a descriptor of the SDT, and uses the service_type field contained in the service descriptor so as to determine whether a specific service identifier of the SDT indicates a 3D service. In addition, by means of the service descriptor, it may also be possible to determine whether the corresponding 3D service can be decoded and displayed.

The service descriptor shown in FIG. 6 will hereinafter be described in detail.

The service descriptor provides the names of the service provider and the service in text form together with the service_type.

A descriptor_tag field may identify a corresponding descriptor by predefined values of descriptor_tag. A descriptor_length field may specify a total number of bytes of the data portion of the descriptor following the byte defining the value of this field.

A service_type field may specify a type of the service. The assignment of service_type value for a service is described in Table 1.

TABLE 1

| service_type | Description |
|---|---|
| 0x00 | reserved for future use |
| 0x01 | digital television service |
| 0x02 | digital radio sound service |
| 0x03 | Teletext service |
| 0x04 | NVOD reference service |
| 0x05 | NVOD time-shifted service |
| 0x06 | mosaic service |
| 0x07 | FM radio service |
| 0x08 | DVB SRM service |
| 0x09 | reserved for future use |
| 0x0A | advanced codec digital radio sound service |
| 0x0B | advanced codec mosaic service |
| 0x0C | data broadcast service |
| 0x0D | reserved for Common Interface Usage |
| 0x0E | RCS Map |
| 0x0F | RCS FLS |
| 0x10 | DVB MHP service |
| 0x11 | MPEG-2 HD digital television service |
| 0x12 to 0x15 | reserved for future use |
| 0x16 | advanced codec SD digital television service |
| 0x17 | advanced codec SD NVOD time-shifted service |
| 0x18 | advanced codec SD NVOD reference service |
| 0x19 | advanced codec HD digital television service |
| 0x1A | advanced codec HD NVOD time-shifted service |
| 0x1B | advanced codec HD NVOD reference service |
| 0x1C | advanced codec frame compatible stereoscopic HD digital television service |
| 0x1D | advanced codec frame compatible stereoscopic HD NVOD time-shifted service |
| 0x1E | advanced codec frame compatible stereoscopic HD NVOD reference service |
| 0x1F to 0x7F | reserved for future use |
| 0x80 to 0xFE | user defined |
| 0xFF | reserved for future use |

For some services the assignment of a service_type from the Table 1 may be obvious, e.g. MPEG-2 HD digital television service. However, the decision is not always so straightforward.

Also, a value of service_type is 0x01 indicating a digital television service. In the generic case this service_type provides no explicit indication to the receiver about the way in which the components of a service have been encoded. Of course, in the case of a specific platform a particular encoding could be implicitly linked to this service_type and so inferred by the receiver. However, any such arrangement is beyond the scope of the present document. This service_type should be used for MPEG-2 SD digital television service. However, it may also be used for services using other encodings, including encodings that have a specific entry elsewhere in table 79, e.g. MPEG-2 HD digital television service.

DVB has deliberately not refined the definition of this service_type from a digital television service to an MPEG-2 SD digital television service due pre-existing use in the context of other (non-MPEG-2 SD) encodings. On the assumption that all receivers will be able to decode and present MPEG-2 SD encoded material, all receivers will present any service assigned this service_type to the viewer for selection on the basis that it may be MPEG-2 SD coded material. However, as described above, this may not be the case and the receiver may not support the actual encoding used. This inability for the receiver to determine whether or not is will actually be able to decode and present a service assigned this service_type means that the service provider needs to allocate it with care depending on the viewer experience it wishes to achieve.

As an example, consider a platform where some services are based on MPEG-2 SD encoding and others are based on MPEG-2 HD encoding, both of which are delivered to a mixed population of MPEG-2 SD-only and MPEG-2 SD/HD receivers. For a service based on MPEG-2 SD encoding the assignment of service_type is obvious: 0x01 (digital television service). However, for a service based on MPEG-2 HD encoding the assignment of service_type depends on whether the service provider wants the service to be included in any service list presented to viewers of MPEG-2 SD-only receivers, even though they will not actually be able to view the service if selected.

If this is the desired viewer experience then the service should be allocated service_type 0x01 (digital television service). If, however, the desired viewer experience is only to list services that the viewer of an MPEG-2 SD-only receiver will actually be able to view then the service should be allocated service_type 0x11 (MPEG-2 HD digital television service). This service_type may also be allocated to a service that contains both an MPEG-2 SD encoding and an alternative encoding (e.g. an MPEG-4 HD) of the same material. This is reasonable on the assumption that all receivers will be able to decode and present MPEG-2 SD encoded material, hence the viewer will at least be presented with the MPEG-2 SD coded form. However, depending on the capabilities of the receiver in use the viewer may be presented with the alternative, typically superior, coded form. The components used for the different encodings can be discriminated between at the point of decode by the assigned value(s) for stream_type in PSI and/or use of the component_descriptor in SI.

Also, a value of the service_type is various indicating an advanced codec. The advanced codec service_types have been allocated so as to be able to indicate that a service has been encoded using something other than MPEG-2. More specifically, assignment of one of these service_types implies that the receiver must support a codec other than MPEG-2 to be able to decode and present the service. On this basis it is recommended that MPEG-2 SD-only receivers should not present any service assigned one of these service_types to the viewer for selection. The assignment of one of these service_types provides a generic indication of the use of some advanced codec but not specifically which one. As such, on its own, it does not fully allow a receiver to determine that it is able to decode and present a service assigned one of these service_types. Of course, in the case of a specific platform a particular encoding could be implicitly linked to one of this service_type and so inferred by the receiver. However, any such arrangement is beyond the scope of the present document. Where a service is assigned one of the advanced codec service_types the component_descriptor should be used in SI to indicate the particular advanced codec used. This allows a receiver to unambiguously determine whether or not it will be able to decode and present the service and handle as appropriate.

Also, the value of service_type is various indicating an advanced codec frame compatible stereoscopic HD. The frame compatible stereoscopic HD values allow a broadcaster to signal that a service operates (primarily) as a stereoscopic service. The use of these values requires careful consideration of the consequences for legacy receiver populations, which as a result may ignore these services. Therefore, a broadcaster may instead choose to signal a frame compatible stereoscopic service as a normal HD service, and use alternative signaling to indicate that the service (or event) is in a frame compatible stereoscopic format. A service_provider_name_length field may specify the number of bytes that follow the service_provider_name_length field for describing characters of the name of the service provider. A Char is an 8-bit field. A string of char fields specify the name of the service provider or service. Text information is coded using the character sets and methods. A service_name_length field may specify the number of bytes that follow the service_name_length field for describing characters of the name of the service.

FIGS. 7 and 8 illustrate bitstream syntaxes of examples of a Program Map Table (PMT) section and an Event Information Table (EIT) section, each of which includes a service descriptor. FIG. 9 illustrates a bitstream syntax illustrating a 3D service descriptor according to the present invention.

The PMT may provide mappings between program numbers and program elements that comprise them. A single instance of such a mapping is referred to as a program definition. The PMT is the complete collection of all program definitions for a TS. This table shall be transmitted in packets, the PID values of which are selected by the encoder. Sections are identified by the program_number field.

Individual fields of the PMT section will hereinafter be described with reference to FIG. 7.

A table_id field may indicate the PMT section at this table section by a predefined value. A section_syntax_indicator field shall be set to 1. A section_length field shall be a first two bits of which shall be 00 and a remaining 10 bits specifying the number of bytes of the section starting immediately following the section_length field, and including the CRC. The value in this field shall not exceed 1021 (0x3FD).

A program_number field may specify a program to which the program_map_PID is applicable. One program definition shall be carried within only one TS_program_map_section. This implies that a program definition is never longer than 1016 (0x3F8). The program_number may be used as a designation for a broadcast channel, for example. By describing the different program elements belonging to a program, data from different sources (e.g., sequential events) can be concatenated together to form a continuous set of streams using a program_number. A version_number field may be a version number of the TS_program_map_section. The version number shall be incremented by 1 modulo 32 when a change in the information carried within the section occurs. Version number refers to the definition of a single program, and therefore to a single section. When the current_next_indicator is set to 1, then the version_number shall be that of the currently applicable TS_program_map_section. When the current_next_indicator is set to 0, then the version_number shall be that of the next applicable TS_program_map_section. A current_next_indicator may be a 1-bit field, which when set to 1 indicates that the TS_program_map_section sent is currently applicable. When the bit is set to 0, it indicates that the TS_program_map_section sent is not yet applicable and shall be the next TS_program_map_section to become valid.

A section_number field shall be 0x00. A last section_number field shall be 0x00. A PCR_PID field may indicate a PID of the TS packets which shall contain the PCR fields valid for the program specified by program_number. If no PCR is associated with a program definition for private streams, then this field shall take the value of 0x1FFF. A program_info_length may be a 12-bit field, the first two bits of which shall be 00 and a remaining 10 bits specifying a number of bytes of the descriptors immediately following the program_info_length field.

A stream_type may be an 8-bit field specifying a type of program element carried within the packets with the PID whose value is specified by the elementary_PID. An auxiliary stream is available for data types defined by this Specification, other than audio, video, and DSM-CC, such as Program Stream Directory and Program Stream Map. An elementary_PID may be a 13-bit field specifying the PID of the TS packets which carry the associated program element. An ES_info_length may be a 12-bit field, the first two bits of which shall be 00 and a remaining 10 bits specifying a number of bytes of the descriptors of the associated program element immediately following the ES_info_length field.

A CRC_32 field may contain the CRC value that gives a zero output of the registers in the decoder after processing the entire TS program map section.

The EIT may provide information in chronological order regarding events contained within each service. All EIT sub-tables for the actual TS shall have a same transport_stream_id and original_network_id values. The present/following table shall contain only information pertaining to the present event and the chronologically following event carried by a given service on either the actual TS or another TS, except in the case of a NVOD reference service where it may have more than two event descriptions. The event schedule tables for either the actual TS or other TSs, contain a list of events, in the form of a schedule, namely, including events taking place at some time beyond the next event. The event information shall be chronologically ordered. Any sections forming part of an EIT shall be transmitted in TS packets with a PID value of 0x0012.

Individual fields of the EIT section will hereinafter be described with reference to FIG. 8.

A table_id field may indicate the EIT section at this table section by a predefined value. A section_syntax_indicator field shall be set to 1. A section_length field may specify a number of bytes of the section, starting immediately following the section_length field and including the CRC. The section_length shall not exceed 4093 so that the entire section has a maximum length of 4096 bytes.

A service_id field may serve as a label to identify this service from any other service within a TS. The service_id is the same as the program_number in the corresponding program_map_section. A version_number field is a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table. When the current_next_indicator is set to 0, then the version_number shall be that of the next applicable sub_table. A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid.

A section_number field may give a number of the section. The section_number of the first section in the sub_table shall be 0x00. The section_number shall be incremented by 1 with each additional section with the same table_id, service_id, transport_stream_id, and original_network_id. In this case, the sub_table may be structured as a number of segments. Within each segment the section_number shall increment by 1 with each additional section, but a gap in numbering is permitted between the last section of a segment and the first section of the adjacent segment. A last_section_number field may specify a number of the last section (that is, the section with the highest section_number) of the sub_table of which this section is part.

A transport_stream_id field may serve as a label for identification of the TS, about which the EIT informs, from any other multiplex within the delivery system. An original_network_id field may give the label identifying the network_id of the originating delivery system. A segment_last_section_number field may specify a number of the last section of this segment of the sub_table. For sub_tables which are not segmented, this field shall be set to the same value as the last_section_number field. A last table_id field may identify a last table_id used. An event_id field may contain an identification number of the described event (uniquely allocated within a service definition).

A start_time field may contain a start time of the event in Universal Time, Co-ordinated (UTC) and Modified Julian Date (MJD). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to 1. A Duration field may contain a duration of the event in hours, minutes, and seconds.

A running_status field may indicate a status of the event. For an NVOD reference event the value of the running_status shall be set to 0. A free_CA_mode may be a 1-bit field, when set to 0 indicates that all the component streams of the event are not scrambled. When set to 1 it indicates that access to one or more streams is controlled by a CA system. A descriptors_loop_field may give a total length in bytes of the following descriptors. A CRC_32 field may contain a CRC value that gives a zero output of the registers in the decoder after processing the entire private section.

Referring to FIG. 9, the 3D service descriptor according to the present invention may be contained in the SDT of FIG. 5 and the PMT of the FIG. 7. For example, the image display apparatus can recognize the corresponding service or program is a 3D service when the 3D service descriptor is contained in a specific service or program contained in the SDT or PMT. In addition, the image display apparatus can recognize 3D video format information and the like using information contained in the 3D service descriptor. In addition, it is determined whether there is a 3D service for a predetermined event using the 3D service descriptor contained in the EIT.

The 3D service descriptor may include details information of a 3D service and program, and may be located in the PMT or SDT (where the 3D service descriptor may be located in the EIT such that it may indicate 3D information for the announced program/event).

The 3D service descriptor may be used, when the service_type is a frame-compatible 3DTV or when stream_content and component_type for the event is the frame-compatible 3D, and may include the following fields.

A descriptor_tag field may identify a corresponding descriptor by predefined values of descriptor_tag. A descriptor_length field may specify a total number of bytes of the data portion of the descriptor following the byte defining the value of this field.

A 3D_structure field may indicate a video format of the 3D program. For example, the 3D_structure field may be represented by the following Table 2.

TABLE 2

| 3D_structure | Meaning |
| --- | --- |
| 0000 | Full resolution Left & Right |
| 0001 | Field alternative |
| 0010 | Line alternative |
| 0011 | Reserved |
| 0100 | L + depth |
| 0101 | Reserved |
| 0110 | Top and bottom |
| 0111 | Frame sequential |
| 1000 | Side-by-side |
| 1001~1111 | Reserved |

Referring to Table 2, if the 3D_structure field value is set to 0000, this means a Full Resolution Left & Right format. If the 3D_structure field value is set to 0001, this means a field alternative format. If the 3D_structure field value is set to 0010, this means a line alternative scheme. If the 3D_structure field value is set to 0100, this means a left image plus depth (L+depth) scheme. If the 3D_structure field value is set to 0110, this means a Top-and-Bottom (TaB) scheme. If the 3D_structure field value is set to 0111, this means a frame sequential scheme. If the 3D_structure field value is set to 1000, this means a side-by-side (SbS) scheme. However, fields and meaning shown in Table 2 are disclosed only for illustrative purposes, and the scope and spirit of the present invention are not limited thereto and may be applied to other examples as necessary.

If the 3D_metadata_location_flag field is set to 01, 3D_metadata_type, 3D_metadata_length, and 3D_metadata fields may be additionally present in the 3D service descriptor. If the 3D_metadata_location_flag field is set to 00, the corresponding data is not transmitted. If the 3D_metadata_location_flag field is set to 10, 3D_metadata_type, 3D_metadata_length, 3D_metadata fields and the like may be transmitted from a video region.

The 3D_sampling field indicates information regarding the frame-compatible format of the 3D program. For example, the 3D_sampling field may be represented by the following Table 3.

TABLE 3

| 3D_sampling | Meaning | |
| --- | --- | --- |
| 0000 | Horizontal/vertical | Odd/Left, Odd/Right |
| 0001 | sub-sampling | Odd/Left, Even/Right |
| 0010 | | Even/Left, Odd/Right |
| 0011 | | Even/Left, Even/Right |
| 0100 | Quincunx matrix | Odd/Left, Odd/Right |
| 0101 | | Odd/Left, Even/Right |
| 0110 | | Even/Left, Odd/Right |
| 0111 | | Even/Left, Even/Right |
| 1000 | | Averaging |
| 1001-1111 | | Reserved |

In addition, fields shown in Table 3 will hereinafter be described with reference to FIGS. 10 to 12. In this case, FIGS. 10(a), 11(a), and 12(a) show odd positions, and FIGS. 10(b), 11(b), and 12(b) show even positions.

Figure 10:
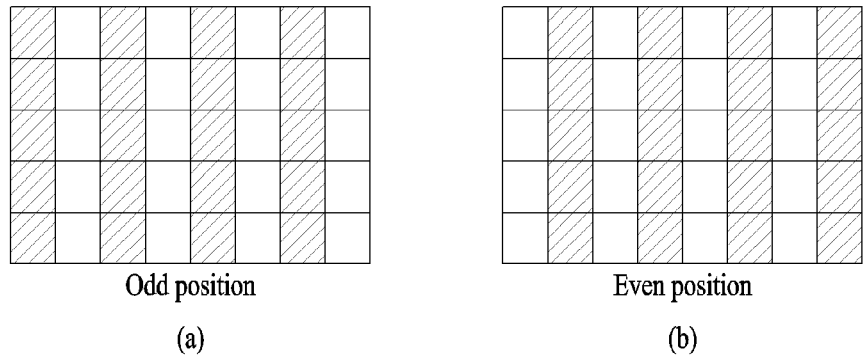
FIGS. 10, 11, and 12 illustrate an example of specifying the Table 3.
Figure 11:
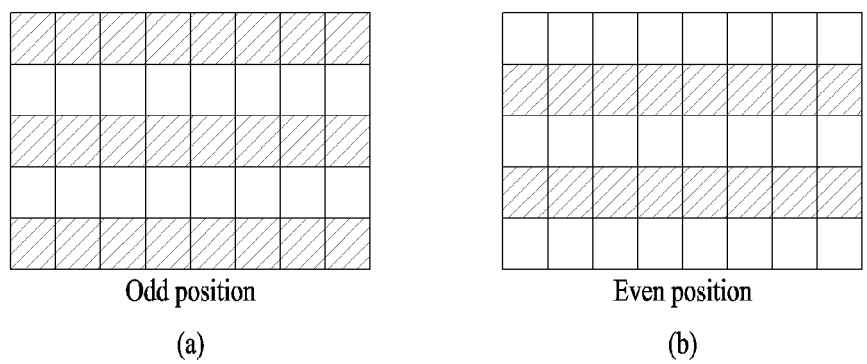

Referring to FIGS. 10 and 11, if the 3D_sampling field is set to 0000 to 0011, this means sub-sampling. In more detail, if the 3D_sampling field is set to 0000, this means subsampling, especially, means odd Left (L) and odd Right (R). If the 3D_sampling field is set to 0001, this means sub-sampling, especially, means odd Left (L) and even Right (R). If the 3D_sampling field is set to 0010, this means sub-sampling, especially, means even Left (L) and odd Right (R). If the 3D_sampling field is set to 0011, this means sub-sampling, especially, means even Left (L) and even Right (R).

Figure 12:
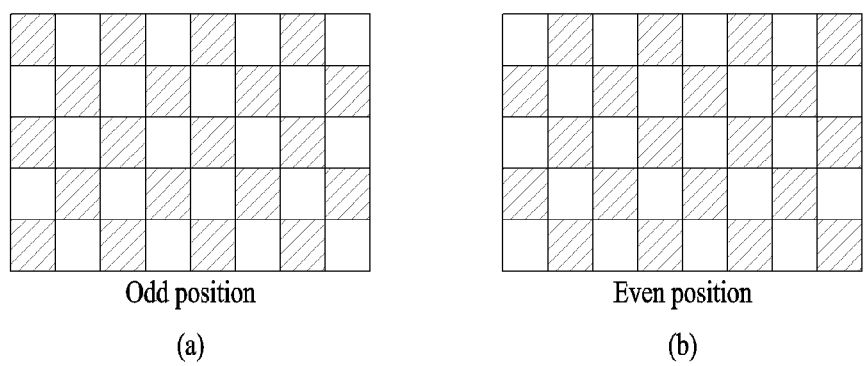

Referring to FIG. 12, if the 3D_sampling field is set to 0100 to 0111, this means a quincunx matrix. For example, if the 3D_sampling field is set to 0100, this means a quincunx matrix, especially, an odd Left (L) means odd Right (R). If the 3D_sampling field is set to 0101, this means a quincunx matrix, especially, means odd Left (L) and even Right (R). If the 3D_sampling field is set to 0110, this means a quincunx matrix, especially, means even Left (L) and odd Right (R). If the 3D_sampling field is set to 0111, this means a quincunx matrix, especially, means even Left (L) and even Right (R). Although the above-mentioned exemplarily discloses that the 3D video format is SbS, it should be noted that TaB may be defined as in the SbS, and may be additionally defined in the above-mentioned examples.

The 3D_orientation field indicates a pixel arrangement format of left- and right-view data contained in a 3D program, and may be defined as shown in Table 4.

TABLE 4

| 3D_orientation | Meaning |
| --- | --- |
| 00 | Left - Normal, Right - Normal |
| 01 | Left - Normal, Right - Inverted |
| 10 | Left - Inverted, Right - Normal |
| 11 | Left - Inverted, Right - Inverted |

Referring to FIG. 4, if the 3D_orientation field is set to 00, this means a normal case in which a left picture and a right picture are inverted in 3D video orientation. If the 3D_orientation field is set to 01, this means that only the right picture is inverted in the 3D video orientation. If the 3D_orientation field is set to 10, this means that only the left picture is inverted in the 3D video orientation. If the 3D_orientation field is set to 11, this means that left and right pictures are inverted in the 3D video orientation.

The 3D_metadata_type field is a valid field when the 3D_metadata_exist_flag is set to 1, so that 3D_metadata_length and 3D_metadata are defined as shown in Table 5.

If the 3D_metadata_type field is set to 000, the 3D_metadata_length may be set to 4, and 3D_metadata may be at least one of four values or all the four values. As examples of such four values, 3D_metadata[0] may indicate parallax_zero, 3D_metadata[1] may indicate parallax_scale, 3D_metadata[2] may indicate Dref, and 3D_metadata[3] may indicate Wref. On the other hand, if the 3D_metadata_type field is set to 001, 3D_metadata_length is also set to 4, and 3D_metadata may be at least one of four values or all the four values. As examples of such four values, 3D_metadata[0] may indicate xB, 3D_metadata[1] may indicate Zref, 3D_metadata[2] may indicate Dref, and 3D_metadata[3] may indicate Wref.

In association with the above-mentioned description, parameters shown in Table 5 are environmental values intended in the 3D content manufacturing process, and may enable the receiver to implement the stereoscopic effect intended by a manufacturer using the environmental values. Individual parameters are data for correctly interpreting each parallax on the condition that a parallax map is transmitted as in a depth map. In other words, upon receiving a parallax map, a new viewpoint image is formed using a reference value for each value and parallax values converted in consideration of the existing viewing environment.

The Dref parameter may be a distance (cm) from a viewer and a screen, wherein the distance (cm) may be defined as a reference in the 3D content manufacturing process. The Wref parameter is a horizontal size (cm) of a screen defined as a reference in the 3D content manufacturing process. The Zref parameter is a depth value (cm) defined as a reference in the 3D content manufacturing process. The xB parameter is a distance (reference value=65 mn) between the user's eyes.

Reference parallax Pref may be calculated using Equation 1 (It is assumed that each value of the parallax map is represented by N bits).

$$Pref = ((m\ parallax\_zero)/2^N) * (parallax\_scale/256) * (Wref/8)$$ [Equation 1]

Parallax on the actual screen is calculated as shown in Equation 2 (See ISO23002-3).

$$p = x_B\left(1 - \frac{D}{D - \left(\frac{D_{ref}}{W_{ref}} * \frac{W \cdot p_{ref}}{p_{ref} - x_B}\right)}\right) \simeq$$ [Equation 2]

TABLE 5

| 3D_metadata_type | 3D_metadata_length | 3D_metadata | Meaning |
| --- | --- | --- | --- |
| 000 | 4 | 3D_metadata[0] | parallax_zero |
| | | 3D_metadata[1] | parallax_scale |
| | | 3D_metadata[2] | Dref |
| | | 3D_metadata[3] | Wref |
| 001 | 4 | 3D_metadata[0] | xB |
| | | 3D_metadata[1] | Zref |
| | | 3D_metadata[2] | Dref |
| | | 3D_metadata[3] | Wref |

-continued $$-p_{ref} * \frac{dref}{wref} * \frac{W}{D} * \frac{x_B}{p_{ref} - x_B}$$

In Equation 2, D is a distance between a viewer and a receiver, and W is a horizontal size of the screen. If 3D_metadata_type is set to 000, the xB parameter is not transmitted, and it is assumed that the xB parameter is 65 mm.

FIG. 13 shows an example of a bitstream syntax of the component descriptor according to the present invention.

In this case, the component descriptor of FIG. 13 is defined as an SDT descriptor, so that it can determine whether the corresponding service is a 3D service. In addition, the component descriptor of FIG. 13 is defined as a descriptor of the EIT so that it is determined whether the corresponding event is a 3D event.

The component descriptor may identify a type of component stream and may be used to provide a text description of the elementary stream.

Individual fields of the component descriptor will hereinafter be described with reference to FIG. 13.

A descriptor_tag field may identify a corresponding descriptor by predefined values of descriptor_tag. A descriptor_length field may specify a total number of bytes of the data portion of the descriptor following the byte defining the value of this field.

A stream_content field may specify a type (video, audio, or EBU-data) of stream. The coding of this field is specified in table 26. A component_type field may specify a type of the video, audio or EBU-data component.

A component_tag field may have a same value as the component_tag field in the stream identifier descriptor (if present in the PSI program map section) for the component stream.

An ISO_639 language_code field may identify a language of the component (in the case of audio or EBU-data) and of the text description which may be contained in this descriptor. The ISO_639_language_code may contain a 3-character code as specified by ISO_639-2. Each character is coded into 8 bits and inserted in order into the 24-bit field.

A text_char field may have a string of specifying a text description of the component stream. Text information is coded using the character sets and methods.

Specifically, the stream_content field and the component_type field contained in the component descriptor are defined as shown in Table 6, such that the image display apparatus can identify a 3D service or 3D event of the corresponding service or event through the component descriptor.

TABLE 6

| Stream_content | Component_type | Description |
| --- | --- | --- |
| 0x01 | 0x11 | MPEG-2 video, Frame-compatible 3D video, 25 Hz |
| 0x01 | 0x12 | MPEG-2 video, Frame-compatible 3D video, 30 Hz |
| 0x03 | 0x15 | DVB subtitles (normal) for display on 3D monitor |
| 0x03 | 0x25 | DVB subtitles (for the hard of hearing) for display on 3D monitor |
| 0x05 | 0x11 | AVC/H.264 video, Frame-compatible 3D video, 25 Hz |
| 0x05 | 0x12 | AVC/H.264 video, Frame-compatible 3D video, 30 Hz |

Referring to Table 6, if the stream_content is set to 0x01, this means an MPEG-2 video stream. In this case, if the component_type is set to 0x11, this means a frame-compatible 3D video stream of 25 Hz. If the component_type is set to 0x12, this means a frame-compatible 3D video stream of 30 Hz.

In addition, if the stream_content is set to 0x05, this means H.264/AVC standard definition video. If the component_type is set to 0x11, this means a frame-compatible 3D video of 25 Hz. If the component_type is setot 0x12, this means a frame-compatible 3D video of 30 Hz.

In addition, if the stream_content is set to 0x03 and the component_type is set to 0x15, this means DVB subtitles (normal) for display on 3D monitor. If the stream_content is set to 0x03 and the component_type is set to 0x25, this means DVB subtitles (for the hard of hearing) for display on 3D monitor.

In this case, the comparison result between translation subtitling and hard-of-hearing is as follows.

The translation subtitles are usually white and placed in the centre of the screen. Hearing audience will be able to identify speakers and sound effects, so only dialogue is needed in subtitles. The hard-of-hearing may have to recognise extra needs of the deaf/hard-of-hearing audience. In conclusion, the normal is mainly based on a dialogue, and the hard-of-hearing may include overall situation information indicating who is talking about hard-of-hearing persons.

Therefore, the image display apparatus parses the component descriptor of FIG. 13, extracts a value of the stream_content field and a value of the component_type field, identifies whether the corresponding service is a 3D service, and determines whether the corresponding service or event is decoded and output.

Figure 15:
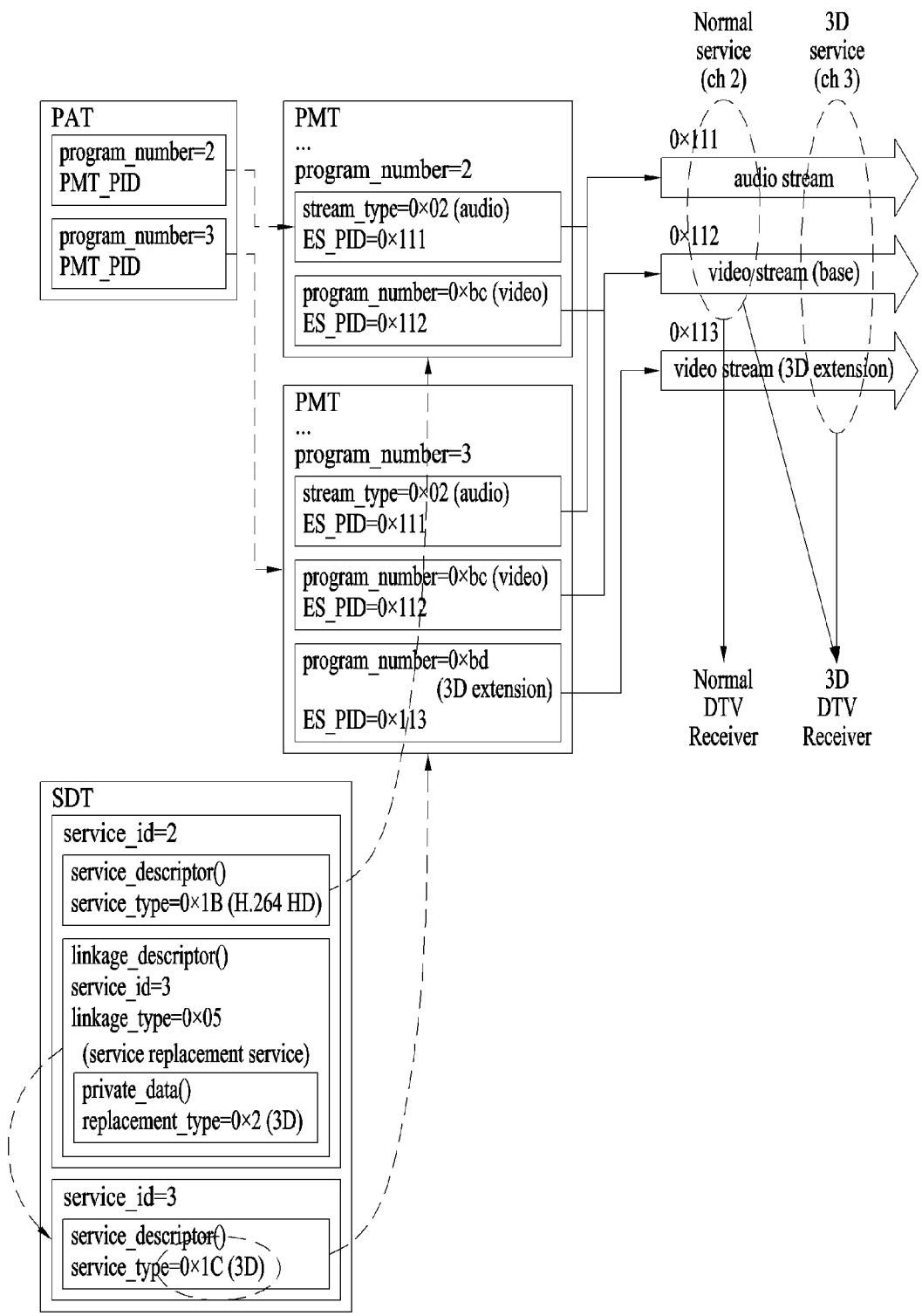
FIG. 15 illustrates a 3D service signaling method using the linkage descriptor according to the present invention.

FIG. 14 shows an example of a bitstream syntax of a linkage descriptor according to the present invention. FIG. 15 shows a 3D service signaling method using the linkage descriptor according to the present invention.

For example, the linkage descriptor may be contained in the SDT of FIG. 5 or EIT of FIG. 8. The image display apparatus can recognize a 3D service or event corresponding to a current viewing 2D service_id or a specific 2D event_id to be broadcast in future.

Referring to FIG. 14, a linkage_type contained in the linkage_descriptor is set to 0x05 (service replacement service), and a replacement type may be set to 3D in the private_data_byte field.

In another example, when the linkage descriptor is transmitted to the EIT, a linkage_type is set to 0x0D (event linkage), and the presence or absence of the corresponding 3D service can be recognized using a 3D service descriptor or a component descriptor for the target_event_id field.

In another example, the linkage_type may be set to a new value 0x0E, and the corresponding description may be set to 3D service.

In another example, the linkage_type is set to 0x05 (service replacement service). Here, as to the service_type for a target service, it is determined whether a 3D service is performed by directly parsing the SDT, EIT, etc. used in the corresponding service.

The linkage descriptor identifies a service that can be presented if the consumer requests for additional information related to a specific entity described by the SI system. The location of the linkage descriptor in the syntax indicates the entity for which additional information is available. For example a linkage descriptor located within the NIT shall point to a service providing additional information on the network, a linkage descriptor in the BAT shall provide a link to a service informing about the bouquet, etc.

A CA replacement service can be identified using the linkage descriptor. This service may be selected automatically by the receiver if the CA denies access to the specific entity described by the SI system. A service replacement service can also be identified using the linkage_descriptor. This replacement service may be selected automatically by the IRD when the running status of the current service is set to not_running.

Individual fields of the linkage descriptor will hereinafter be described with reference to FIG. 14.

A transport_stream_id field may identify the TS containing the information service indicated.

An original_network_id field may give a label identifying the network_id of the originating delivery system of the information service indicated.

A service_id field uniquely identifies an information service within a TS. The service_id is the same as the program_number in the corresponding program_map_section. If the linkage_type field has the value 0x04, then the service_id field is not relevant, and shall be set to 0x0000.

A linkage_type field may specify a type of linkage e.g. to information (see table 7).

TABLE 7

| Linkage_type | Description |
| --- | --- |
| 0x00 | reserved for future use |
| 0x01 | information service |
| 0x02 | EPG service |
| 0x03 | CA replacement service |
| 0x04 | TS containing complete Network/Bouquet SI |
| 0x05 | service replacement service |
| 0x06 | data broadcast service |
| 0x07 | RCS Map |
| 0x08 | mobile hand-over |
| 0x09 | System Software Update Service |
| 0x0A | TS containing SSU BAT or NIT |
| 0x0B | IP/MAC Notification Service |
| 0x0C | TS containing INT BAT or NIT |
| 0x0D | event linkage |
| 0x0E | extended event linkage |
| 0x0F to 0x7F | reserved for future use |
| 0x80 to 0xFE | user defined |
| 0xFF | reserved for future use |

Herein, the linkage_type with value 0x0D or 0x0E is only valid when the descriptor is carried in the EIT.

A mobile_hand-over_info( ) field shall be coded according to a predefined method. An event_linkage_info( ) field shall be coded according to a predefined method. An extended_event_linkage_info( ) field shall be coded according to a predefined method. A private_data_byte is an 8-bit field, the value of which is privately defined.

Referring to FIG. 15, the PAT defines the program_number value and a PMT_PID of the corresponding program. The image display device extracts a PMT from the PAT, and parses the extracted PMT.

Here, when using a 2D service, the PMT may indicate the stream_type and program_number of the corresponding program. For example, if the stream_type is set to 0x02, the corresponding stream is an audio stream. In this case, the PID of the audio ES may indicate 0x111. In addition, if the program_number is 0xbc, this means that the corresponding stream is a video stream. In this case, the PID of the video ES may indicate 0x112.

However, when using the 3D service, the PMT may further define one program_number other than stream_type and program_number. For example, if it is assumed that the program_number is 0xbd, this means 3D extension, and the ES PID may indicate 0x113. Therefore, the image display apparatus for supporting the 3D service extracts and parses one stream_type value and two program_number values, such that it can identify and process the 3D service.

In this case, the SDT is mapped to the program_number of the PMT through the service_id, such that the corresponding service can be signaled.

If the SDT service type is set to 2, the service_type of 2 is mapped to the program_number of the PMT, and the service_type of the service descriptor contained in the SDT is set to 0x1B. (H.264 HD) such that the 2D service can be signaled. If the service_id is set to 3 and the linkage_type is set to 0x05, this means a service replacement service, and the 3D is indicated through private_data( ) and replacement_type (0x02), such that the presence and processing of a 3D service corresponding to the service_id 2 can be signaled. Likewise, even in the case where the service_id is set to 3, the service_type of the service_descriptor is defined as 0x1C such that the 3D service can be immediately signaled.

In association with the above-mentioned description, the replacement_type defines the relationship between services as shown in Table 8, such that a HD multicast or a 3D service can be identified on the basis of the defined relationship.

TABLE 8

| Replacement_type | Type of replacement service |
| --- | --- |
| 0x00 | HD simulcast |
| 0x01 | SVC |
| 0x02 | 3D stereoscopic |
| 0x03-0xff | Reserved for use |

Figure 16:
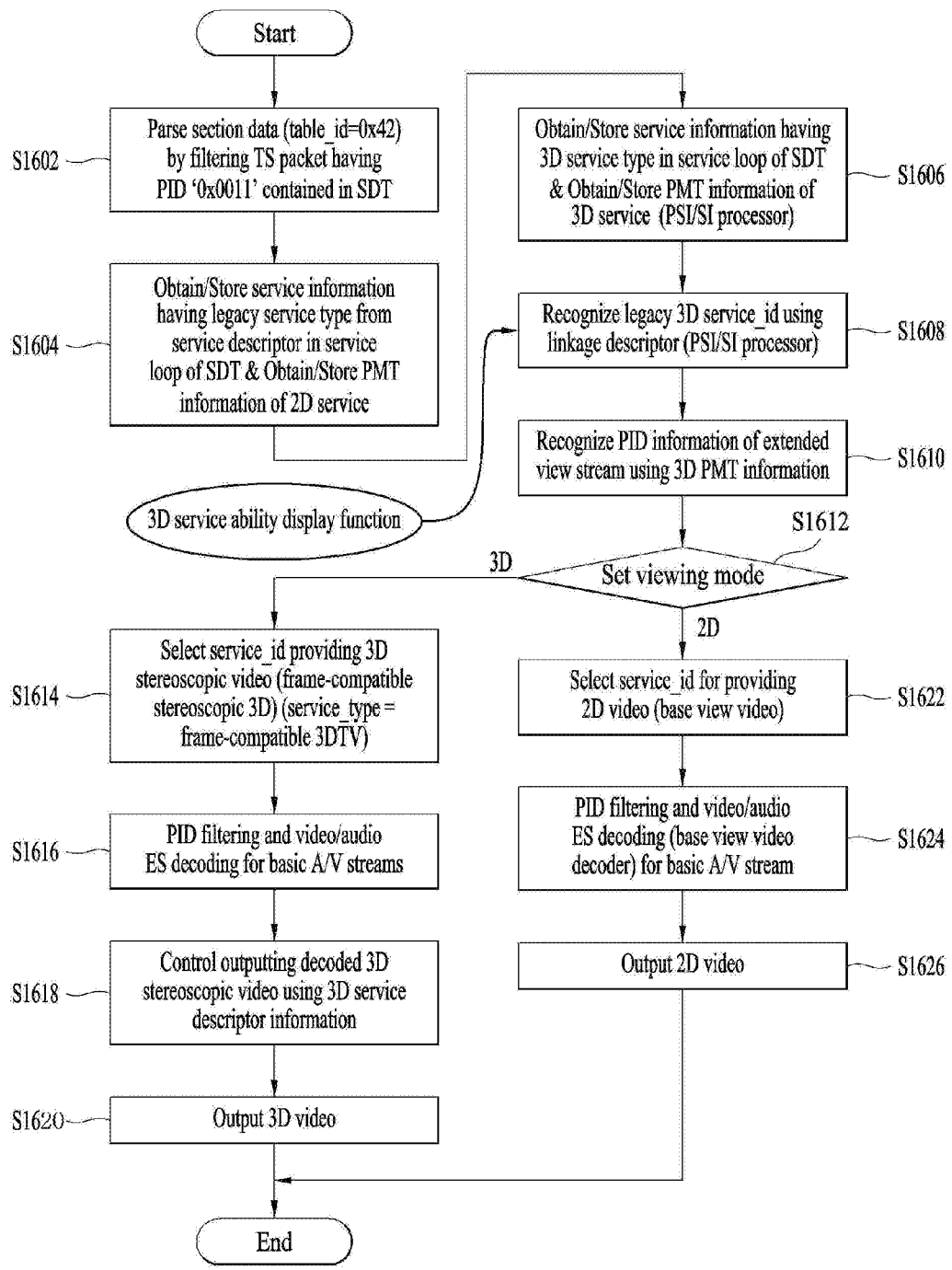
FIG. 16 is a flowchart illustrating a method for outputting a stereoscopic video signal using 3D signaling information according to the present invention.

FIG. 16 is a flowchart illustrating a method for outputting a stereoscopic video signal using 3D signaling information according to the present invention.

Referring to FIG. 16, the demultiplexing part 230 performs filtering and parsing of SDT sections upon receiving a digital broadcast signal. As described above, the demultiplexing part performs filtering of SDT sections through PID filtering. For example, the PID may be set to 0x0011, and a TS packet having the corresponding PID is filtered, such that section data of table_id=0x42 can be parsed (Step S1602).

The SI processing part 240 may obtain information of a service having a legacy service type from the service descriptor contained in the service loop contained in the SDT, and store the obtained information (Step S1604).

The SI processing part 240 may obtain information of a service having a 3D service type from the service loop of the parsed SDT, and store the obtained information. That is, the SI processing part may obtain and store PMT information regarding the 3D service (Step S1606).

The SI processing part 240 parses a linkage descriptor from the signaling information, and recognizes legacy 3D service ID information using the parsed linkage descriptor information (Step S1608).

The SI processing part 240 may recognize PID information of the extended view stream using the 3D PMT information (Step S1610).

The digital receiver receives information of a viewing mode setup (Step S1612).

Two methods can be used according to individual viewing modes. First, the case of a 3D viewing mode setup will hereinafter be described The digital receiver may select service_id for providing a 3D stereoscopic video (frame-compatible stereoscopic 3D) in step S1614.

In this case, the service_type of the service_id may be a frame-compatible 3DTV as an example (Step S1616).

The controller 270 may output a 3D stereoscopic video decoded by the 3D image formatter using the 3D service descriptor (Step S1618).

The 3D video being output through the 3D image formatter 260 is displayed on the screen through the output unit (Step S1620).

Next, the case of a 2D viewing mode setup will hereinafter be described in detail.

The digital receiver may select service_id for providing a 2D video (base view video) (Step S1622). For example, the channel having the service_id may be a legacy channel.

The controller may control the demultiplexing part and the decoder to perform PID filtering and video/audio ES decoding (Base View Video Decoder) of the basic A/V streams (Step S1624).

The controller outputs the decoded 2D video through the output unit (Step S1626).

FIG. 17 illustrates a UI according to an example embodiment of the present invention. Other embodiments and configurations are also within the scope of the present invention.

FIGS. 17(*a*), 17(*b*) and 17(*c*) show User Interfaces (UIs) or On Screen Display (OSD) screens configured to indicate that a channel searched during a channel search may provide 3D contents, distinguishable from a channel that provides 2D contents. At this time, the digital receiver can recognize whether the corresponding channel provides 3D service. As an example, the digital receiver can determine that the corresponding channel provides 3D service based on at least one of the service list descriptor of FIG. 4, the service descriptor of FIG. 6, the 3D service descriptor of FIG. 9 and the component descriptor of FIG. 13 in advance.

Since the viewer does not get knowledge of 3D channels during a channel search unlike the foregoing cases, the UIs or OSD screens may be configured as shown in FIGS. 17(*a*), 17(*b*) and 17(*c*) to indicate the 3D channels.

In FIG. 17(*a*), a 3D indicator 1715 may be displayed on a channel banner 1110 appearing during a channel search in the UI.

In FIG. 17(*b*), an OSD screen 1720 may indicate that an accessed channel provides 3D contents.

In FIG. 17(*c*), an OSD screen 1730 may display a 3D indicator 1735 over the title of a 3D content to indicate that an accessed channel provides the 3D content.

In the examples of FIGS. 17(*b*) and 17(*c*), when the viewer accesses a specific channel that provides 3D content during a channel search without prior channel information, the viewer may be notified of the 3D content by an OSD screen preliminarily during channel switching so that the viewer may view the channel in an appropriate mode. Accordingly, the viewer may skip the channel or view the 3D contents of the channel in a changed mode using the OSD screen.

The followings relate to an Electronic Program Guide (EPG) screen.

Figure 18:
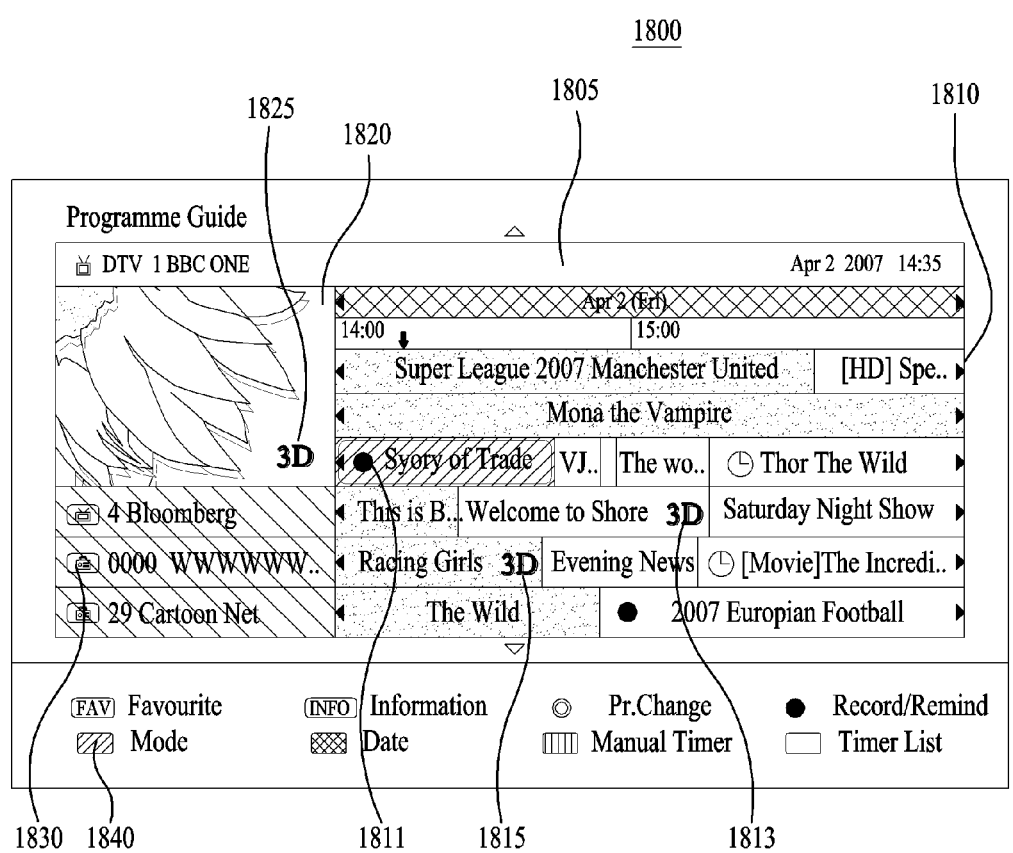
FIG. 18 illustrates an Electronic Program Guide (EPG) screen according to an example embodiment of the present invention.
Figure 19:
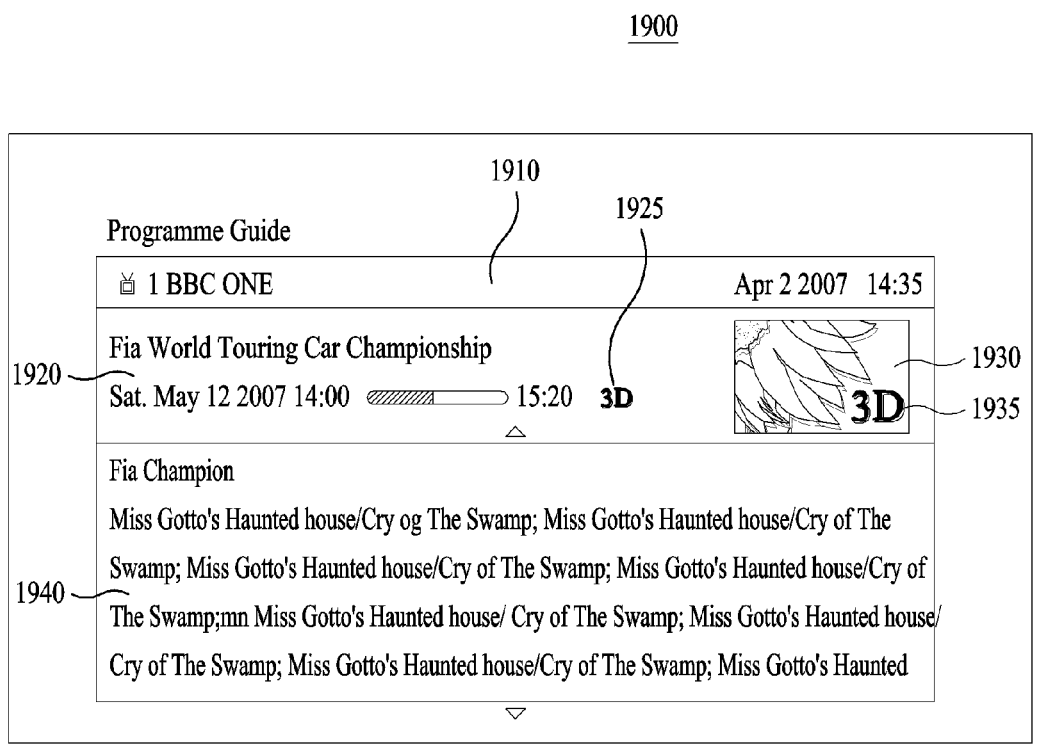
FIG. 19 illustrates an EPG screen according to an example embodiment of the present invention.
Figure 20:
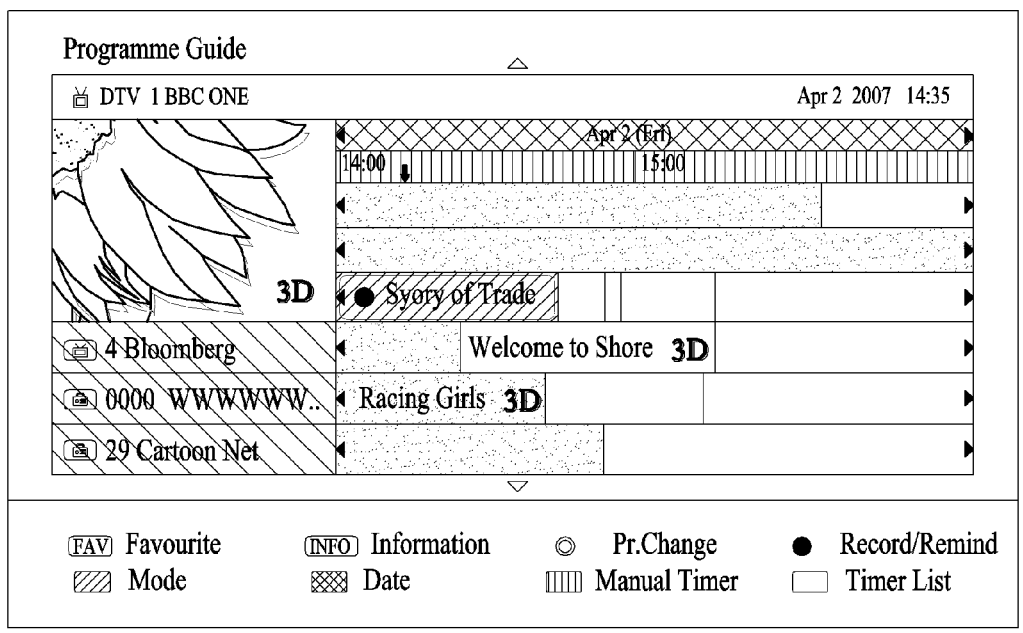
FIG. 20 illustrates an EPG screen according to an example embodiment of the present invention.

FIGS. 18, 19 and 20 illustrate EPG screens according to exemplary embodiments of the present invention. Other embodiments and configurations are also within the scope of the present invention.

FIGS. 18 to 20 are constructed based on at least one of data associated with the 3D service/event parsed/extracted from above-described tables or descriptors by the digital receiver.

As shown in FIG. 18, an EPG screen 1800 may include a first item 1805 indicating a current channel, a second item 1810 in which lists of contents for channels are displayed in a time order, a third item 1820 for displaying a preview image of a selected program from the second item 1810, a fourth item 1830 including additional information related to the preview image displayed in the third item 1820, and a fifth item 1840 for displaying other menus.

In FIG. 18, the EPG screen 1800 may include 3D indicators in various manners.

A 3D indicator may be displayed over the preview image in the third item 1820 while 3D indicators may not be displayed on the content lists in the second item 1810. Referring to FIG. 18, although a 3D indicator does not reside over a content 1811 selected from the content lists in the second item 1810, a 3D indicator 1825 may be positioned over the preview image in the third item 1820.

3D indicators may be displayed over the content lists in the second item 1810 while there is not a 3D indicator over the preview image in the third item 1820. Referring to FIG. 18, 3D indicators 1813 and 1815 may be displayed over two contents in the content lists of the second item 1810.

Additionally, the above two methods of displaying 3D indicators may be used in combination.

The 3D indicators may be configured as a 2D image or a 3D image. Along with or without the 3D indicators, 3D content may be indicated in a color or using depth information on the EPG screen 1800.

FIG. 19 illustrates a guide screen 1900 that displays details about a specific content selected from the EPG screen shown in FIG. 18.

As shown in FIG. 19, the guide screen 1900 may include a first item 1910 for indicating a current channel and a current time, a second item 1920 for indicating the title of a content and time information about the content, a third item 1930 for displaying a preview image, and a fourth item 1940 for displaying detail information about the content.

If the content includes 3D image data, the signal processing apparatus may display a 3D indicator 1925 or 1935 in at least one of the items 1910, 1920, 1930, 1940. The 3D indicator 1925 may be also configured in a 2D format or in a 3D format.

FIG. 20 illustrates an EPG screen 2000 that lists only 3D contents, as compared to the EPG screen 1800 shown in FIG. 18.

Referring to FIGS. 18 and 20, only the contents attached with the 3D indicators 1811, 1813 and 1815 in the EPG screen of FIG. 18 may be displayed in the EPG screen of FIG. 20, without the remaining 2D contents.

While the 3D contents are indicated in the EPG screen in FIG. 20, the 3D contents may be indicated in any manner other than the EPG screen.

FIGS. 21 and 22 show exemplary EPG screen images according to the present invention.

The image processing apparatus may recognize the presence or absence of a 2D/3D service corresponding to each service using the linkage descriptor of FIGS. 14 and 15. Accordingly, the image processing apparatus recognizes the service pair when 2D and 3D services mapped to each other are present. When providing the service list, the recognized service pair may provide the EPG screen image shown in FIG. 21 or 22.

In this case, the image processing apparatus may be operated according to a user's setup request, or may automatically download the service pair for one service. If the image processing apparatus further downloads the service pair and a user presses the 2D/3D switching button when the stored service or content is reproduced, the image processing apparatus performs switching to a current content so that the image display apparatus reproduces the resultant content, resulting in greater convenience of a user.

The receiver may perform a download reservation such that a user-selected service, an automatic service, or all the content pairs can be received in the receiver. In this case, when the corresponding content is broadcast, a service_id corresponding to the reserved recorded content is found and completely received/stored. The receiver may use the service_id value for each content from the parsed EIT. Therefore, if the user presses the 2D/3D switching button to reproduce the stored content, the image display apparatus performs switching to the corresponding content, and reproduces the resultant content, resulting in greater convenience of the user.

Figures 23, 24:
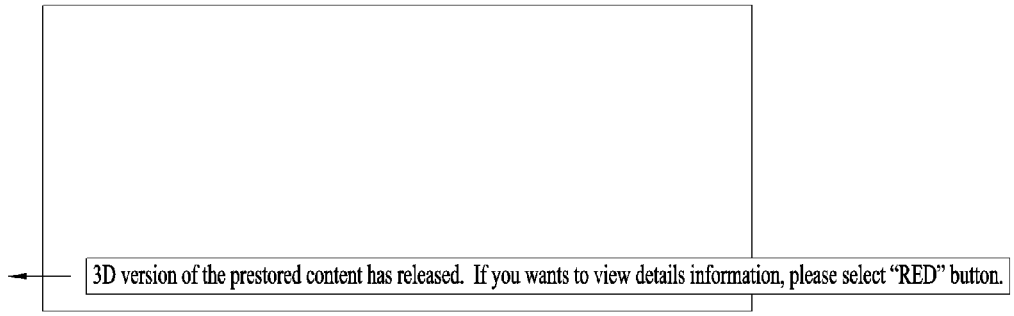
FIG. 23 illustrates an example of UI indicating the presence or absence of a 3D version according to the present invention.
FIG. 24 illustrates another example of the EPG.

FIG. 23 shows an example of UI indicating the presence or absence of a 3D version according to the present invention. FIG. 24 shows another example of the EPG. FIG. 25 is an example of a detailed UI shown in FIG. 24.

Referring to FIG. 23, on the basis of the signaling information of the receiver, if there is a content corresponding to the 2D content stored through an EIT when the user views the legacy broadcast image, i.e., if the 3D version is present, the receiver may enable a text bar to be scrolled as shown in FIG. 23. However, the scope or sprit of the present invention is not limited only to FIG. 23, an additional UI is configured such that information indicating the presence or absence of a 3D version and associated control information may be selected and established on the OSD.

FIG. 24 shows an EPG screen image obtained by parsing at least one of the SDT of FIG. 5 and the EIT of FIG. 8. For example, even when the user presses a specific button (such as RED), the same EPG may be provided. Referring to FIG. 24, the EPG provided in response to a user request provides each content with an indicator indicating whether the corresponding content can identify a 2D or 3D service. Specifically, the present invention may provide information corresponding to a specific content. For example, as can be seen from FIG. 24, the user can recognize information indicating that content of 2D-version Wife Returns Episode #22 begins from the SBS broadcasting station from 12:00, and other information indicating that 3D-version Wife Returns Episode #23 begins from the SBS broadcasting station from 15:30. In this case, the 3D-version content is not always limited only to the same episode, for example, may be a content of other episodes (e.g., #21, #23, Special and the like). In addition, although FIG. 24 exemplarily shows content information corresponding to a specific content, the scope or spirit of the present invention is not limited thereto, the present invention may further provide not only information about other channels but also content information corresponding to other media as necessary.

When the user selects a content of 3D-version Taejo Wang Geon Episode #30 shown in FIG. 24, detailed information and associated processing are shown in FIG. 25. For example, the content selected in FIG. 25 provides information indicating a 3D version of the pre-recorded 2D-version Taejo Wang Geon Episode #30, a reserved recording function, a backward function, etc. In this case, although the receiver is not shown in the drawings, details information of the corresponding content may also be provided to the receiver, for example, synopsis information, episode information, broadcast start time information, broadcast end time information, thumbnail information, and the like.

A video format transitions will hereinafter be described with reference to the above-described contents.

A frame compatible stereoscopic 3DTV service may switch video format between two of the frame compatible stereoscopic video formats, or it may switch to or from one of the frame compatible stereoscopic video formats to or from an HDTV video format (i.e. a non-frame compatible stereoscopic 3DTV video format). A format switch between the Side-by-Side and Top-and-Bottom frame packing arrangements is unlikely to be applied, but such a transition is not forbidden.

A video format switch shall be applied only at a Random Access Point (RAP) with an Instantaneous Decoding Refresh (IDR) video frame. Due to the lack of tight synchronization between occurrences of the PMT in the TS and occurrences of pictures in the video stream, there is an inconsistency for a short time if the video format is switched during the running frame compatible stereoscopic 3DTV service. The carriage of HDTV (i.e. non-3DTV) video format content usually means that the frame packing arrangement Supplemental Enhancement Information (SEI) message is not applicable. However, an IRD that is presented with such a format switch might not handle the transition correctly due to the temporary inconsistency with the information contained in the previous occurrence of the PMT. This is depicted in FIG. 5 with the example of a video format switch from 1080i 25 Hz Side-by-Side frame compatible stereoscopic 3DTV video to 1080i 25 Hz HDTV video.

In this example there is an inconsistency between the information carried in the last occurrence of the PMT before the video format switch, and the information conveyed by the frame packing arrangement SEI message after the video format switch. This inconsistency could cause the IRD to assume the incorrect video format during the period of inconsistency, the length of which is not known due to the mentioned lack of tight synchronization between the PMT and coded video pictures.

Format transition assistance signaling is defined that enables assurance of the robustness of the decoding process in the IRD. It is recommended that this format transition assistance signaling is applied when a frame compatible stereoscopic 3DTV service includes periods of content in a non-3DTV video format.

The format transition assistance signaling consists of the inclusion of frame packing arrangement SEI messages also in the video stream containing HDTV format video content, with the field frame_packing_arrangement_cancel_flag set to 1 to signal affirmatively that no frame compatible stereoscopic 3DTV video format is being transmitted currently.

In order to maximize the robustness of the decoding process in the IRD, it is recommended that the frame compatible stereoscopic 3DTV service applies the frame packing arrangement SEI message also during carriage of the HDTV format, at least for a period of two seconds before and after a format switch between the HDTV video format and the frame compatible stereoscopic 3DTV video format.

When a video format transition occurs either to or from an HDTV video format, the frame_packing_arrangement_cancel_flag in the frame packing arrangement SEI message should be set to '1', indicating that a non-3DTV video format is being carried, for a period of at least two seconds after the transition from a frame compatible stereoscopic 3DTV video format to an HDTV video format has occurred, or for at least two seconds before the transition from an HDTV video format to a frame compatible stereoscopic 3DTV video format will occur.

Carriage of the frame packing arrangement SEI message with frame_packing_arrangement_cancel_flag setting to '1' may persist during the complete duration of HDTV video format content, at the discretion of the service provider.

As well as enhancing the robustness of the handling by the IRD of video format transitions within a frame compatible stereoscopic 3DTV service, it also provides robustness in the case when the IRD hops from another service to a frame compatible stereoscopic 3DTV service. In some circumstances it might be more convenient to continue to apply this signaling than to cease to convey it.

In any case the frame packing arrangement SEI message signaling shall be consistent with the video format carried, and takes precedence over other signaling as regards video format. The temporary inconsistencies with the PMT mentioned above may occur, and are alleviated by the application of format transition assistance signaling as specified in the present section.

As described above, the embodiments of the present invention have disclosed associated technical matters.

The present invention provides a method for allowing a 3DTV to process signaling information for a stereoscopic video broadcast service, and a scheme for implementing the same. Especially, the present invention provides a method for receiving a broadcast service using the corresponding signaling information, and a method for operating and implementing a 3DTV to control the stereoscopic display output.

In addition, the present invention can identify a 3DTV service and a 2D legacy TV service through independent and separate logical channels (virtual channels), such that the user can easily perform 2D/3D conversion through channel switching.

In other words, under the condition that a 2D service and a 3D service are mixed with each other under the DTV broadcast environment, the present invention can recognize the relationship between the 2D service and the 3D service so as to recognize the presence or absence of 2D and 3D services. As a result, if the user desires service conversion to a 2D or 3D service, the present invention can enable the user to easily perform the 2D or 3D conversion, resulting in greater convenience of the user.

As described above, the present invention may apply to a totally or a partially of a digital broadcasting system.

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms, some of the terms mentioned in the description of the present invention may be varied by anyone skilled in the art at his or her discretion, according to custom, or due to the advent of new technologies. Also, in some cases, some of the terms mentioned in the description of the present invention have been selected by the applicant at his or her discretion. and, in these cases, the detailed meanings are described in relevant parts of the description of the present invention is understood not simply by the mere naming of the terms used herein but by the actual meaning of each term lying within and, also, based upon the overall content of the description of the present invention.

3D image presentation methods include a stereoscopic image method, which takes into account two perspectives (or viewpoints), and a multiple view image method, which takes into account three or more perspectives (or viewpoints). Conversely, the related art single view image type may be referred to as a monoscopic method.

A stereoscopic image method uses a left/right pair of images acquired by photographing the same subject with a left-side camera and a right-side camera, wherein both cameras are spaced apart from one another at a predetermined distance. A multiview image uses a set of at least 3 images acquired by photographing with at least 3 different cameras either spaced apart from one another at predetermined distances or placed at different angles. Hereinafter, although the stereoscopic method will be described according to an embodiment of the present invention, the ideas of the present invention may also be applied to the multi-view method. Also, hereinafter, the term stereoscopic may also be shortened to stereo.

The stereoscopic image or the multi-view image may be compression encoded in an MPEG (Moving Picture Experts Group) format or by using diverse methods, thereby being transmitted.

For example, a stereoscopic image or a multi-view image may be compression-encoded by using an H.264/AVC (Advanced Video Coding) method, thereby being transmitted. At this point, the receiving system performs a decoding process on the received image as an inverse process for the H.264/AVC method, thereby acquiring a 3D image.

Furthermore, any one of the left view image or the right view image of the stereoscopic image or any one image of the multi-view image may be assigned as a base layer image, and the remaining image may be assigned as an enhancement layer image. Thereafter, the image of the base layer may be encoded by using the same method used for encoding a monoscopic image. And, in the image of the enhancement layer, only the relation information between the base layer image and the enhancement layer image may be encoded. Then, the processed images may be transmitted.

Examples of the compression-encoding methods for the base layer image may include JPEG, MPEG-1, MPEG-2, MPEG-4, and H.264/AVC. And, in this embodiment of the present invention, the H.264/AVC method has been adopted. Furthermore, according to the embodiment of the present invention, the H.264/SVC (Scalable Video Coding) or MVC (Multi-view Video Coding) method has been adopted for the compression-encoding process of the enhancement layer image.

The conventional standard for groundwave (or terrestrial) DTV transmission and reception is based upon 2D video content. Accordingly, in order to service 3D TV broadcast content, a transmission and reception standard for 3D TV broadcast content should be additionally defined. A receiver may receive a broadcast signal in accordance with the added transmission and reception standard, so as to adequately process the received signal, thereby supporting a 3D broadcast service.

In the description of the present invention, the ATSC (Advanced Television Systems Committee) standard will be used to describe the conventional DTV transmission and reception standard according to the embodiment of the present invention.

In case of the ATSC system, information for processing a broadcast content may be included in the system information, thereby being transmitted.

The system information may, for example, be referred to as service information. Herein, for example, the system information may include channel information, program information, event information, and so on. In case of the ATSC standard method, the system information may be transmitted and received by being included in a PSI/PSIP (Program Specific Information/Program and System Information Protocol). However, the present invention will not be limited only to this example. And, in case of a protocol transmitting the system information in a table format, the protocol may be applied to the present invention regardless of its term (or name).

According to an embodiment of the present invention, the PSI table may include a PAT (Program Association Table), and a PMT (Program Map Table).

The PAT corresponds to special information that is transmitted by a data packet having a PID of '0'. The PAT may transmit PID information of the corresponding PMT for each program. The PMT transmits PID information of a transport stream (TS) packet, in which program identification numbers and individual bit sequences of video and audio data configuring the corresponding program are transmitted, and also transmits the PID information in which PCR is transmitted. Then, by parsing the PMT acquired from the PAT, the correlation information between the elements configuring the corresponding program may also be acquired.

According to an embodiment of the present invention, the PSIP table may include a VCT (Virtual Channel Table), an STT (System Time Table), an RRT (Rating Region Table), an ETT (Extended Text Table), a DCCT (Direct Channel Change Table), a DDCSCT (Direct Channel Change Selection Code Table), an EIT (Event Information Table), and an MGT (Master Guide Table).

The VCT may transmit information on virtual channels, such as channel information for selecting channels and information such as PIDs (Packet Identifiers) for receiving the audio and/or video data. More specifically, when the VCT is parsed, the PID of the audio/video data of the broadcast program, which is carried through the channel along with the channel name and the channel number, may be acquired. The STT may transmit information on the current data and timing information, and the RRT may transmit information on region and consultation organs for program ratings. The ETT may transmit additional description of a specific channel and broadcast program, and the EIT may transmit information on virtual channel events. The DCCT/DCCSCT may transmit information associated with automatic (or direct) channel change, and the MGT may transmit the version and PID information of each table within the PSIP.

The transmission format of the stereoscopic image includes a single video stream format and a multi-video stream format. The single video stream format corresponds to a method of multiplexing video data of two perspectives into a single video stream and transmitting the single video stream. Herein, since video data are transmitted to one video stream, the single video stream format is advantageous in that a bandwidth being additionally required for providing a 3D broadcast service is not broad. The multivideo stream format corresponds to a method of transmitting multiple video data to multiple video streams. Herein, although the usage of the bandwidth increases, since high capacity data can be transmitted, the multi-video stream format is advantageous in that high picture quality video data can be displayed.

Figure 26:
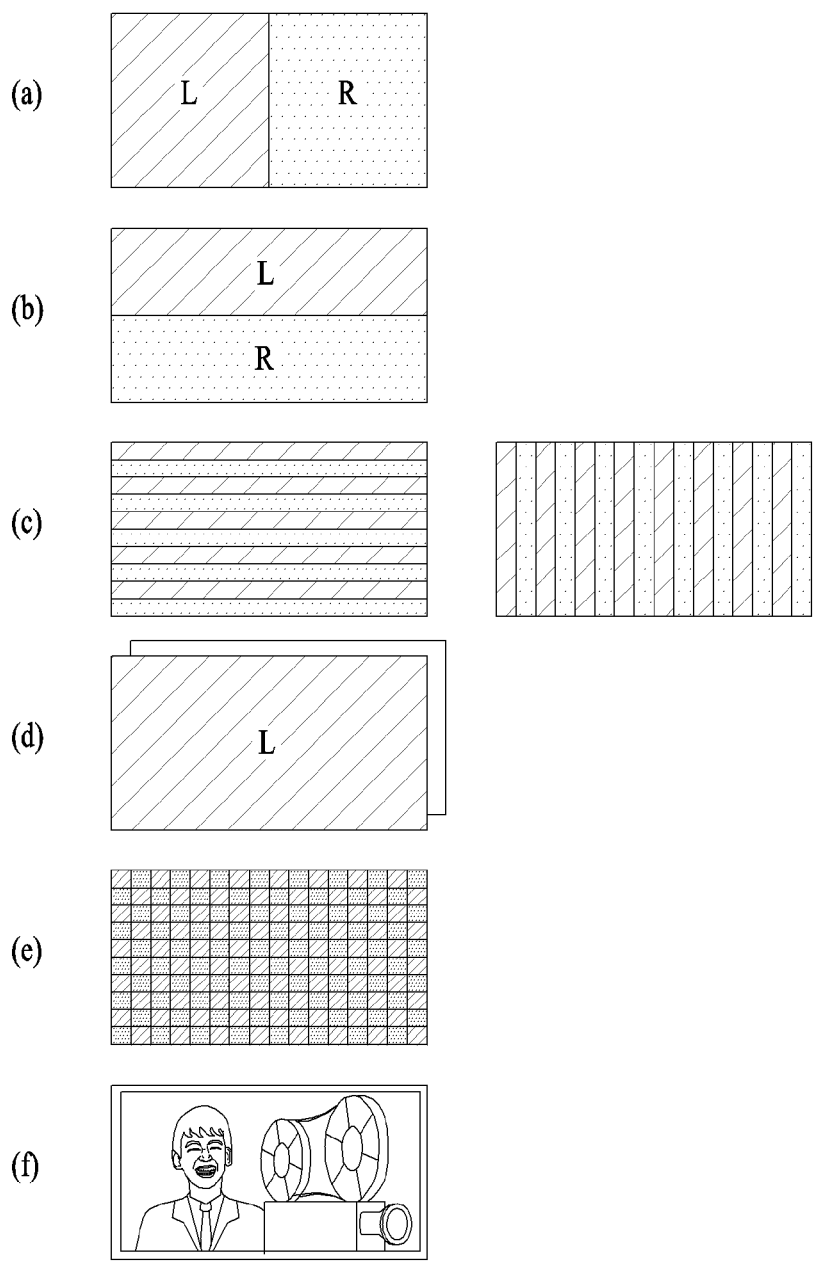
FIG. 26 illustrates a stereoscopic image multiplexing format of a variety of image formats according to an embodiment of the present invention.

FIG. 26 shows a stereoscopic image multiplexing format of a variety of image formats according to an embodiment of the present invention.

The image formats of a 3D broadcast service include a side-by-side format shown in (a), a top-bottom format shown in (b), an interlaced format shown in (c), a frame sequential format shown in (d), a checker board format shown in (e), and an anaglyph format shown in (f).

The side-by-side format shown in (a) corresponds to a format, wherein a left image and a right image are ½ down-sampled in a horizontal direction. Herein, one of the sampled images is positioned on the left side, and the other sampled image is positioned on the right side, thereby creating a single stereoscopic image. The top-bottom format shown in (b) corresponds to a format, wherein a left image and a right image are ½ down-sampled in a vertical direction. Herein, one of the sampled images is positioned on the upper side, and the other sampled image is positioned on the lower side, thereby creating a single stereoscopic image. The interlaced format shown in (c) corresponds to a format, wherein a left image and a right image are ½ down-sampled in a horizontal direction so that the two images can be alternated line by line, thereby creating a single stereoscopic image, or wherein a left image and a right image are ½ down-sampled in a vertical direction so that the two images can be alternated line by line, thereby creating a single stereoscopic image. The frame sequential format shown in (d) corresponds to a format, wherein a left image and a right image are temporally alternated and configured in a single video stream. The checker board format shown in (e) corresponds to format, wherein a left image and a right image are ½ down-sampled so that the left image and the right image can be alternated in each of the horizontal and vertical directions, thereby configuring the two images into a single image. The anaglyph format shown in (f) corresponds to a format configuring an image so that the image can present a cubic effect by using complementary color contrast.

The present digital broadcasting provides broadcast services by using limited system resources. The system resources of a digital broadcasting environment include transmission bandwidth, processing capability, and so on. Particularly, the bandwidth that can be used in the assignment (or allocation) of a frequency is limited. In such a digital broadcasting environment, when a 3D broadcast service is provided, the corresponding 3D broadcast service will also use the limited resources used in the digital broadcasting environment.

According to an embodiment of the present invention, in case of a 3D broadcast service using a stereoscopic image scheme, a left-view image and a right-view image should be transmitted. Therefore, it is difficult to transmit the two images at a high resolution by using the bandwidth of the conventional digital broadcasting. For example, when transmitting full-resolution video data using a bandwidth of digital broadcasting, it is difficult to transmit 2 sets of full-resolution video data by using the same bandwidth. Therefore, a method of transmitting 2 sets of half-resolution video data is being proposed.

Nevertheless, a full-resolution 3D broadcast service is required to be provided so as to satisfy the demands of the user for high picture quality. However, even when a full-resolution 3D broadcast service is being provided, the full-resolution 3D broadcast service should be compatible to the conventional half-resolution 3D broadcast service.

Figure 27:
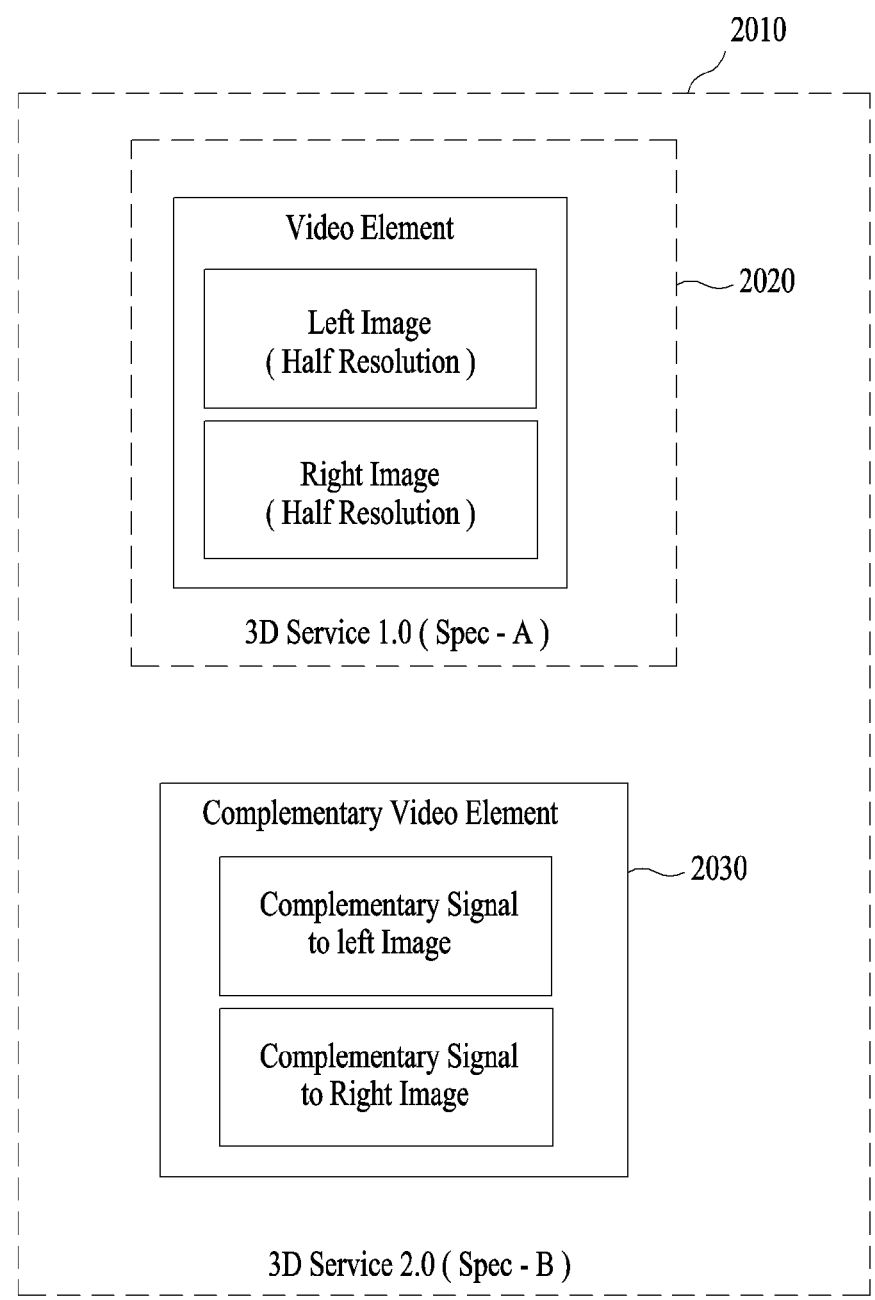
FIG. 27 illustrates a conceptual diagram of a 3D broadcast service according to an embodiment of the present invention.

FIG. 27 shows a conceptual diagram of a 3D broadcast service according to an embodiment of the present invention. According to an embodiment of FIG. 27, a 3D broadcast service (2010) providing full-resolution images may hereinafter be referred to as a 3D service 2.0 or a 3D service Spec-B. A 3D broadcast service (2020) providing half-resolution images may hereinafter be referred to as a 3D service 1.0 or a 3D service Spec-A.

The 3D service 1.0 (2020) may be serviced to a half-resolution left image and to a half-resolution right image. Since the 3D service 2.0 (2010) providing full-resolution images should be compatible to the 3D service 1.0 (2020), instead of newly transmitting full-resolution images, a method of maintaining the image transmission of the 3D service 1.0 (2020) and providing differential data or additional data for providing full-resolution images may be used. More specifically, as shown in FIG. 27, a full-resolution 3D broadcast service (2010) may be provided by adding a complementary video element (2030) of the 3D service 2.0 to a half-resolution video element of the 3D service 1.0 (2020). Eventually, a broadcast receiver that can support 3D service 1.0 may provide half-resolution images by receiving and processing data of the 3D service 1.0 (2020), and a broadcast receiver that can support 3D service 2.0 may provide full-resolution images by receiving and processing data of the 3D service 1.0 (2020) and complementary data of the 3D service 2.0.

Figure 28:
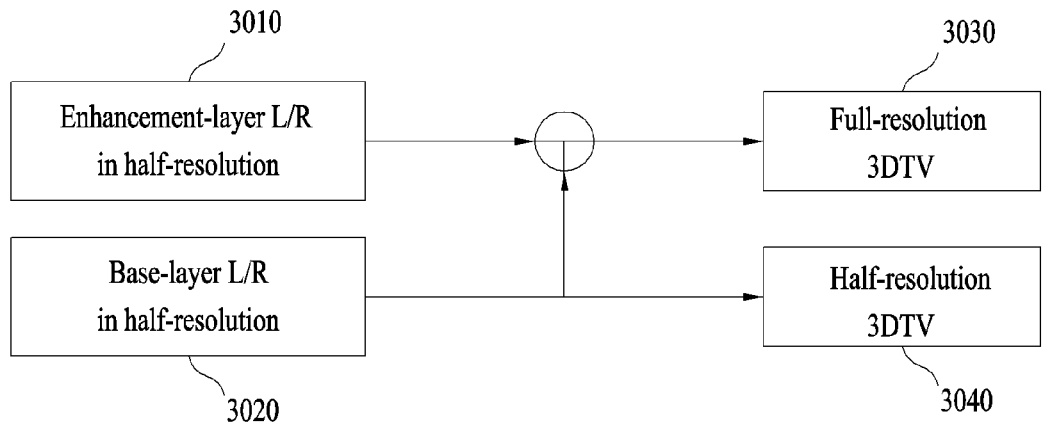
FIG. 28 illustrates a conceptual block diagram showing a method for providing a full-resolution 3D broadcast service according to an embodiment of the present invention.

FIG. 28 illustrates a conceptual block diagram showing a method for providing a full-resolution 3D broadcast service according to an embodiment of the present invention.

In the present invention, a digital broadcast receiver (3030) that can provide full-resolution 3D images and a digital broadcast receiver (3040) that can support half-resolution 3D images may each be provided.

A broadcasting system providing 3D broadcast services may transmit half-resolution 3D video data through a base layer (3020) and may transmit additional half-resolution 3D video data for providing full-resolution 3D images through an enhancement layer (3010).

The digital broadcast receiver (3040) that can support half-resolution 3D images may provide half-resolution 3D images by receiving and processing video data of the base layer (3020). Also, the digital broadcast receiver (3030) that can provide full-resolution 3D images may provide full-resolution 3D images by receiving and processing video data of the base layer (3020) and video data of the enhancement layer (3010). Hereinafter, the video data or video component of the base layer may be respectively referred to as base video data or a base video component, and the video data or video component of the enhancement layer may be respectively referred to as complementary video data or a complementary video component, for simplicity.

Figure 29:
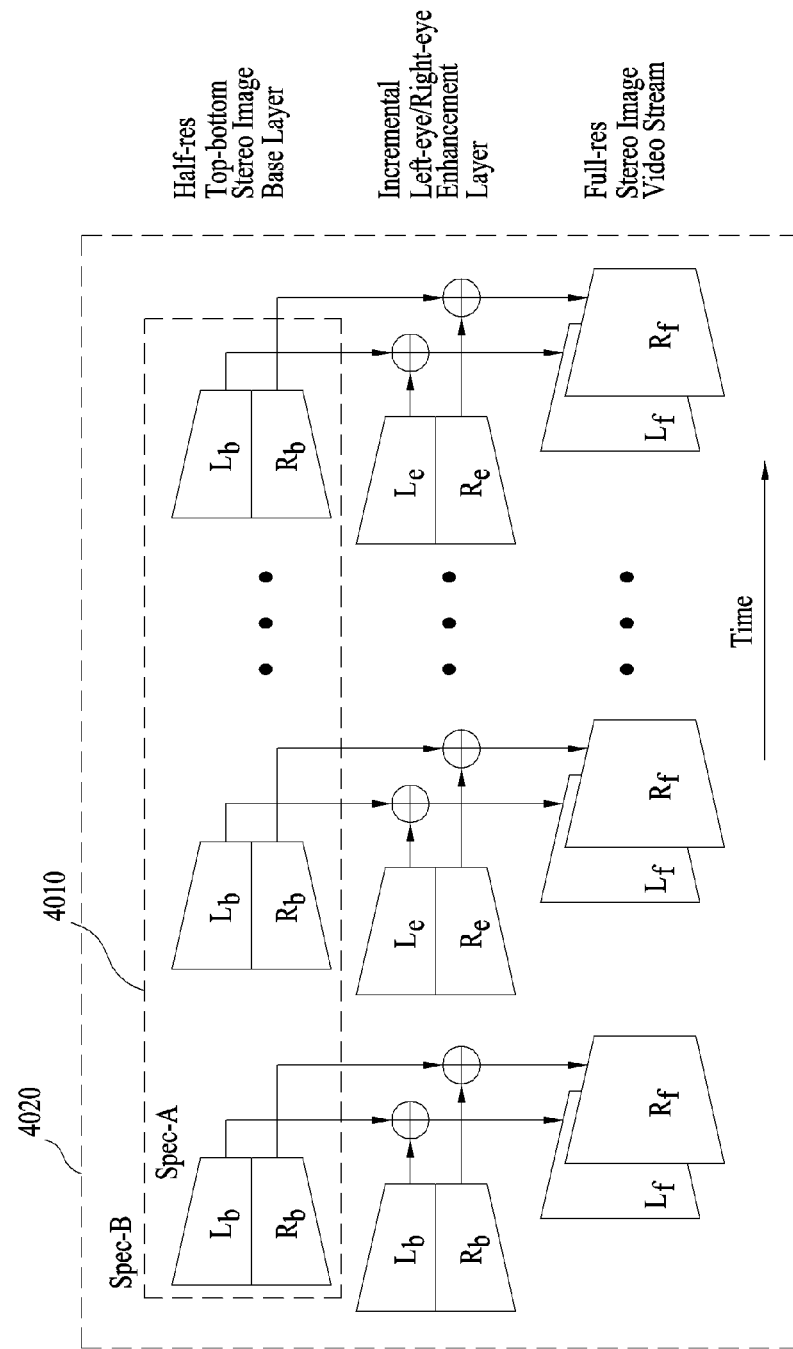
FIG. 29 illustrates a method for providing a 3D broadcast service according to an embodiment of the present invention.

FIG. 29 illustrates a method for providing a 3D broadcast service according to an embodiment of the present invention.

Referring to FIG. 29, a 3D service Spec-A (4010) indicates 3D video data being transmitted through the base layer, and according to the embodiment of FIG. 28, the 3D video data are provided in a half-resolution top-bottom image format.

A 3D service Spec-B (4020) transmits complementary data for the images of each perspective through the enhancement layer. The receiving system receives the transmitted complementary data. And, the received complementary data are additionally processed to the 3D video data transmitted from the 3D service Spec-A (4010), thereby enabling the receiving system to provide the full-resolution stereoscopic images.

FIG. 30 illustrates a method for providing a 3D broadcast service according to another embodiment of the present invention.

According to an embodiment of the present invention, a 3D service Spec-A (5010) corresponds to the top-bottom image format and may include spatially half-resolution and temporally full-resolution 3D video data. According to another embodiment of the present invention, the video data of the 3D service Spec-A (5010) may be interpolated in the receiving system, so as to be provided in spatially full-resolution and temporally half-resolution. The receiving system of a 3D service Spec-B (5020) may additionally process complementary information so as to provide both spatially and temporally full-resolution images.

In the definition of the temporally half-resolution and spatially full-resolution, the size or the amount of the video data that can be transmitted (or transmittable video data) may be limited due to the limitation of the system resources. The video data may include frame-unit images. Herein, depending upon the size of the transmittable video data, the distance between the frame-unit images that can be temporally positioned may also be limited along with the resolution of the images. For example, due to a limitation in a predetermined bandwidth, if a set of transmittable video data is spatially in half-resolution and temporally in full-resolution, and when spatially full-resolution images are being transmitted within the limitations of the same bandwidth, only the temporally half-resolution (e.g., two times the distance of a frame distance in case of the temporally full-resolution) video data may be transmitted.

A variety of embodiments for the method of processing video data according to the resolution in the receiving system may be available.

The receiving system of the 3D service Spec-A (5010) may perform interpolating on the received image (Lb or Rb), so as to provide an image close to full-resolution (Lb' or Rb') (drawing on the left bottom side of FIG. 30).

The receiving system of the 3D service Spec-B (5020) may use the video data received in the base layer and the video data received in the enhancement layer. The receiving system may interleave and combine the horizontal lines of the received image of the base layer (Lb or Rb) and the received image of the enhancement layer (Le or Re), thereby providing full-resolution images (Lf or Rf). Also, the receiving system may perform low-pass filtering on the received image of the base layer (Lb or Rb) and may perform high-pass filtering on the received image of the enhancement layer (Le or Re), thereby combining the two images and reconstructing the full-resolution image (Lf or Rf). Also, the receiving system may perform interpolating on the received image of the base layer (Lb or Rb) and supplement the interpolated full-resolution (close to full-resolution) image (Lb' or Rb') with a complementary information image (Le or Re), thereby providing the full-resolution image (Lf or Rf) (drawing on the right bottom side of FIG. 30).

FIG. 31 illustrates a method for providing a 3D broadcast service according to another embodiment of the present invention.

According to an embodiment of the present invention, a 3D service Spec-A (6010) corresponds to the side-by-side image format and may include spatially half-resolution and temporally full-resolution 3D video data. According to another embodiment of the present invention, the video data of the 3D service Spec-A (6010) may be interpolated in the receiving system, so as to be provided in spatially full-resolution and temporally half-resolution. The receiving system of a 3D service Spec-B (6020) may additionally process complementary information so as to provide both spatially and temporally full-resolution images.

In case of FIG. 31, apart from the fact that the image format corresponds to the side-by-side image format, the remaining description of FIG. 31 is identical to that of FIG. 30. Therefore, the overlapping description of the present invention will be omitted for simplicity. However, referring to FIG. 31, in case of interleaving the received image of the base layer (Lb or Rb) and the received image of the enhancement layer (Le or Re), the receiving system of the 3D service Spec-B (6020) may interleave and combine the vertical lines, thereby providing full-resolution images.

Figure 32:
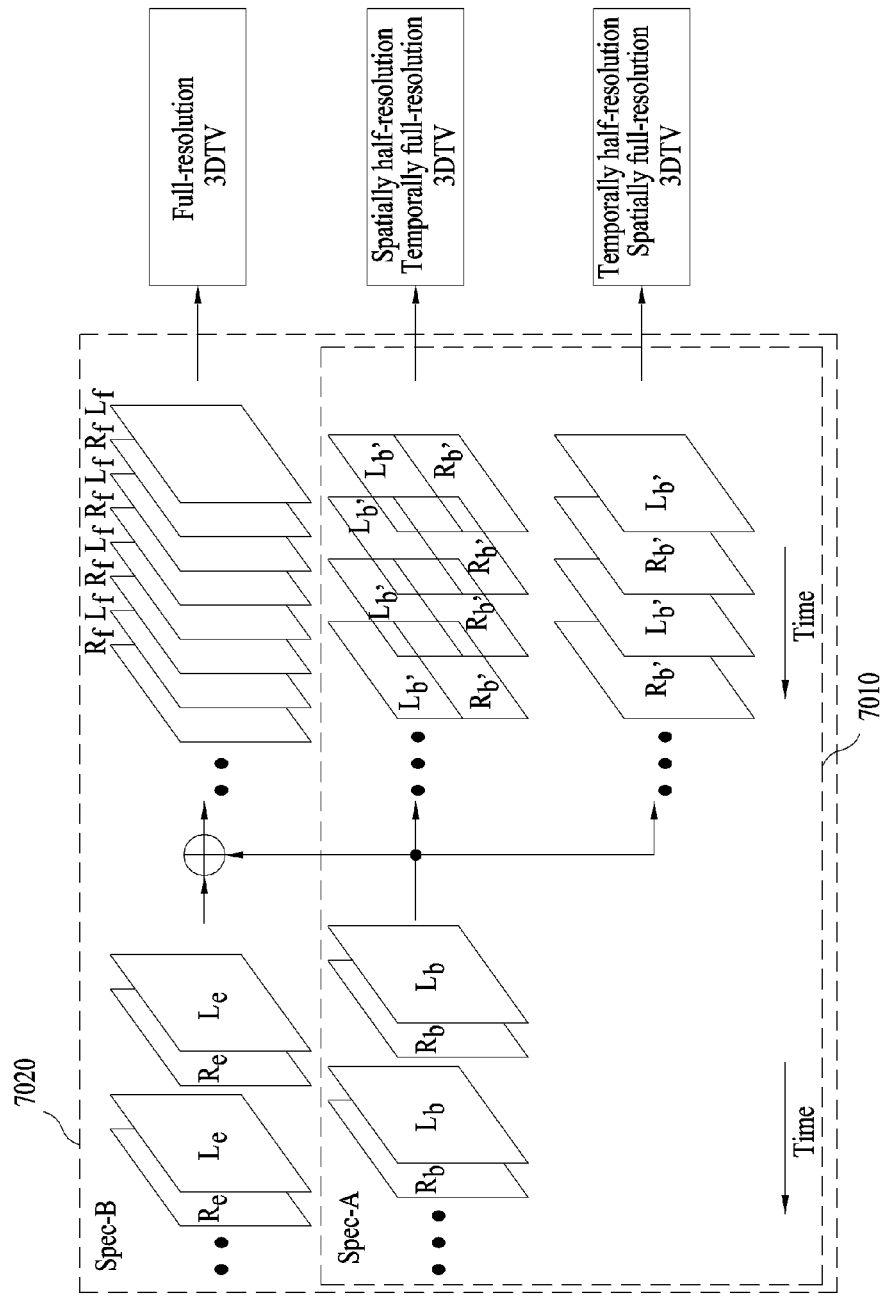
FIG. 32 illustrates a method for providing a 3D broadcast service according to another embodiment of the present invention.

FIG. 32 illustrates a method for providing a 3D broadcast service according to another embodiment of the present invention.

According to an embodiment of the present invention, a 3D service Spec-A (7010) corresponds to the frame sequential image format and may include spatially full-resolution and temporally half-resolution 3D video data. According to another embodiment of the present invention, the video data of the 3D service Spec-A (7010) may be format-converted in the receiving system, so as to be provided in spatially half-resolution and temporally full-resolution. The receiving system of a 3D service Spec-B (7020) may additionally process complementary information so as to provide both spatially and temporally full-resolution images.

According to the embodiment of the present invention, the receiving system of the 3D service Spec-A (7010) may perform decimation on the received image (Lb or Rb), thereby creating (or generating) half-resolution images (Lb' or Rb') of the top-bottom format or the side-by-side format. At this point, while performing decimation, the receiving system acquires a half-resolution images (Lb' or Rb') in the top-bottom format or the side-by-side format. At this point, while performing decimation, the receiving system acquires a pair of half-resolution images that is temporally extended (e.g., doubled) through a frame rate conversion, thereby being capable of providing spatially and temporally full-resolution images.

According to another embodiment, the receiving system of the 3D service Spec-B (7020) respectively inserts images received through the enhancement layer (Le or Le) in-between each consecutive image (Lb or Rb) received through the base layer, thereby being capable of providing spatially and temporally full-resolution images.

As described above, in order to provide a 3D broadcast service of a high resolution, complementary video data should be provided for the 3D broadcast service of the resolution currently being provided, and, accompanying the complementary video data, signaling information for the complementary video data is also required to be transmitted/received and processed.

Hereinafter, a method for signaling complementary video data and information on such complementary video data will be described in detail. According to an embodiment of the present invention, the complementary video data may use an H.264/SVC (Scalable Video Coding) or MVC (Multi-view Video Coding) method as a layered image compression encoding method. And, at this point, the complementary video data may be transmitted through the enhancement layer.

The transmitted signaling information on the complementary video data may be referred to as 3D complementary video information. The 3D complementary video information may be provided in a descriptor or table format according to the embodiment of the present invention, wherein the 3D complementary video information may be referred to as a 3D complementary video descriptor or a 3D complementary video table.

According to the embodiment of the present invention, the 3D complementary video information may be included in the PSIP, which is transmitted from the ATSC broadcasting system, and may particularly be included in the TVCT (or VCT) of the PSIP, thereby being transmitted. Also, the 3D complementary video information may be included in the PSI, which is transmitted from the ATSC broadcasting system, and may particularly be included in the PMT of the PSI. Furthermore, the 3D complementary video information may be included in the complementary video information and may particularly be included in header information of the complementary video ES (Elementary Stream), thereby being transmitted.

FIG. 33 illustrates the full forward and backward interoperability according to the present invention.

The present invention gives full forward and backward interoperability among current and next generation source devices, and near-term half-resolution 3DTV and next-generation full-resolution 3DTV. There are examples on how they operate. For Spec-A content that plays on Current BD player/STB can have two modes which are consumer viewing half-resolution 3D stereoscopic content on near-term 3DTVs and consumer viewing half-resolution 3D stereoscopic content on next-generation 3DTVs. For Spec-A content that plays on Next-Generation BD player/STB, the consumer can view half-resolution 3D stereoscopic content on near-term 3DTVs and consumer can view half-resolution 3D stereoscopic content on next-generation 3D TVs. For Spec-B content that plays on Current BD player/STB, the consumer can view half-resolution 3D stereoscopic content on near-term 3DTVs and consumer can view half-resolution 3D stereoscopic content on next-generation 3DTVs. Lastly, Spec-B content that plays on Next-Generation BD player/STB, the consumer can view half-resolution 3D stereoscopic content on near-term 3DTVs and consumer can view full-resolution 3D stereoscopic content on next-generation 3DTVs.

Spatial half resolution methods such as Top-Bottom and Side-by-Side in the present invention are well supported in existing BD/DVD authoring systems and facilitates the following feature with either no changes or minor medications such as 3D subtitles using presentation graphic mode, 3D graphics with placement of shifted objects in top & bottom portions of the frame, Application of effects over an entire clip (without need to edit each frame), and BD Live content authoring.

Figure 34:
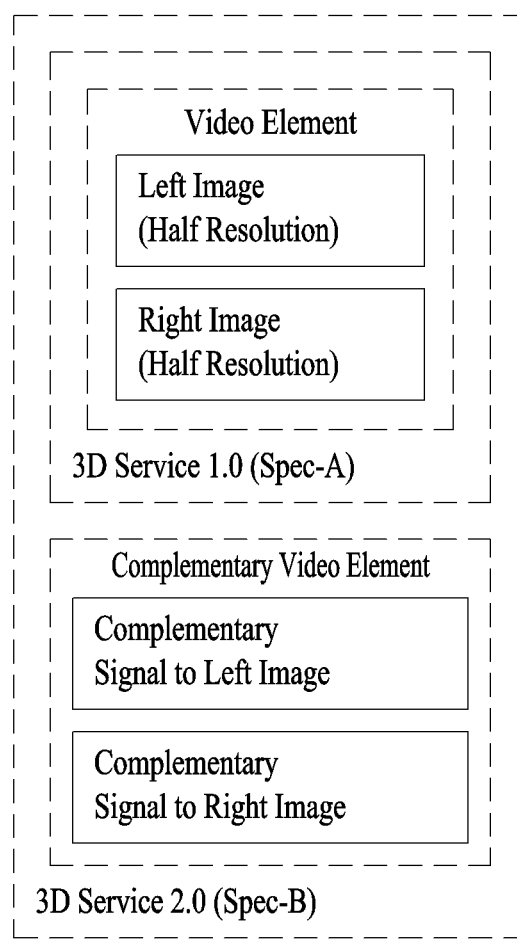
FIG. 34 illustrates a service model of a 3D broadcast service compatible for first generation and second generation 3DTV.

FIG. 34 illustrates a service model that provides compatibility between the first generation 3DTV and second generation 3DTV.

As explained above, if the Left and Right image that configures Stereoscopic 3D video through Spec-A, each half half-resolution, and the future stereoscopic 3DTV service can be provided through high-resolution. Here, since conventional video element already supports half-resolution, in order to support full-resolution, differential signal is transmitted through complementary video element. As a result receiver that supports Spec-B will be able to provide full-resolution 3DTV service by adding complementary video element to Spec-A. And the present invention provides method of transmitting complementary video element in order to support 3DTV service for Spec-B.

FIG. 35 illustrates a syntax structure of a TVCT including 3D complementary video information according to an embodiment of the present invention.

The fields included in the TVCT of FIG. 35 will be described as follows.

A 'table_id' field is an 8-bit unsigned integer number field that indicates the type of table section.

A 'section_syntax_indicator' field is a one-bit field which shall be set to '1' for the 'terrestrial_virtual_channel_table_section( )' field.

A 'private_indicator' field is a one-bit field which shall be set to '1'.

A 'section_length' field is a 12-bit field in which the first two bits shall be set to '00', and specifies the number of bytes of the section, starting immediately following the 'section_length' field, and including the CRC.

A 'transport_stream_id' field indicates the 16-bit MPEG-2 Transport Stream (TS) ID. The 'transport_stream_id' field distinguishes a Terrestrial Virtual Channel Table (TVCT) from others that may be broadcast in different PTCs.

A 'version_number' field serving as a 5-bit field indicates a version number of the Virtual Channel Table (VCT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid.

A 'section_number' field is an 8-bit field which gives the number of this section.

A 'last_section_number' field serving as an 8-bit field specifies the number of the last section (that is, the section with the highest section_number value) of the complete Terrestrial Virtual Channel Table (TVCT).

A 'protocol_version' field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 standard for unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the minor_channel_number represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM). An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the 'hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional_descriptors_length' field may indicate a total length (in bytes) of a VCT descriptor list.

A 'CRC_32' field is a 32-bit field which contains a CRC value that ensures a zero output of registers in the decoder defined in Annex A of ISO/IEC 13818 1 "MPEG-2 Systems" [8] after processing the entire Terrestrial Virtual Channel Table (TVCT) section.

When a broadcast service being provided from a corresponding channel is the 3D service 2.0, a service_type field (8010) corresponds to a field indicating this information. For example, when a field value of the service_type field (8010) is 0x13, this indicates that a 3D broadcast program (audio, video, and complementary video data for displaying 3D stereoscopic images) is being provided from a corresponding virtual channel. A descriptor field (8020) includes the 3D complementary video information and will hereinafter be described in detail with reference to the accompanying drawings.

FIG. 36 illustrates a syntax structure of a 3D complementary video descriptor included in a TVCT according to an embodiment of the present invention.

The fields included in the 3D complementary video descriptor of FIG. 36 will now be described as follows.

A number_elements field indicates a number of video elements configuring a respective virtual channel. The broadcast receiver may receive a 3DTV service location descriptor, so as to parse information included in fields below the numbers_elements field as number of times, the number corresponding to a number of video elements configuring the respective virtual channel.

A complementary_type field indicates a method of configuring complementary video data or complementary video streams. When full-resolution images are being outputted, the receiving system uses the information of this field to reconfigure (or reconstruct) the base video data and the complementary video data into a full-resolution image.

A naive_subsampling_flag field indicates whether subsampling is being performed or whether low-pass filtering and high-pass filtering are being performed, when a base video component and a complementary video component are being configured. For example, when the field value of the naive_subsampling_flag field is equal to 1, this indicates that subsampling is being performed. And, when the field value is equal to 0, this indicates that low-pass filtering and high-pass filtering are being performed.

A codec_type field indicates a type of video codec used for encoding or compressing a complementary video component. For example, depending upon the field value of the codec_type field, a coding scheme such as MPEG-2, AVC/H.264, SVC Extension, and so on, may be indicated.

A horizontal_size field, a vertical_size field, and a frame_rate size field respectively indicate a horizontal size, a vertical size, and a frame rate of the complementary video component. Herein, the horizontal size and the vertical size may indicate spatial resolution, and the frame rate may indicate temporal resolution. For example, when the field value of the complementary_type field is equal to 0x0004, the spatial/temporal resolutions of the complementary video component may both become a full-resolution.

An interpolation_filter_available_flag field indicates whether or not a extra customized filter is being used, when interpolation is performed with respect to the base video component. At this point, according to an embodiment of the present invention, information such as a filter coefficient for implementing a filter may be included in a descriptor loop for the complementary video component in the TVCT or PMT and may be provided in a descriptor format. And, according to another embodiment of the present invention, such information may be included in header information or message information within a video element, thereby being provided. Among the video data for a left view and the video data for a right view configuring the complementary video information, a left_image_first_flag field indicates which of the two video data occur (or are generated) first. According to an embodiment of the present invention, when the video data corresponding to the left view is received first, the field value of the left_image_first_flag field may be set to 1.

A complementary_first_flag field indicates an order of combining the base video component and the complementary video component during the procedure of configuring a full-resolution image. According to an embodiment of the present invention, when the video data corresponding to the base video component precedes the video data corresponding to the complementary video component, the field value of the complementary_first_flag field may be set to 1.

FIG. 37 illustrates an image configuration method according to a field value of a complementary_type field included in 3D complementary video information according to an embodiment of the present invention.

The complementary_type field included in FIG. 36 indicates a method of configuring complementary video data or complementary video streams. And, the receiving system uses the information of this field to reconfigure (or reconstruct) the base video data and the complementary video data into a full-resolution image. Herein, according to an embodiment of the present invention, the reconfiguration (or reconstruction) of the full-resolution image according to the field value of the complementary_type field may be diversely performed as shown in FIG. 37.

1) when the field value of the complementary_type field is equal to 0: The complementary_type field indicates that complementary video data are lineinterleaved and carry video data for the complementary line.

The complementary video data may include video data for even lines or odd lines, which are added to the base video data in order to configure a full-resolution image. The video data for even lines or odd lines may be horizontally or vertically line-interleaved according to the multiplexing format of the base video data, so as to be generated (or created). According to an embodiment of the present invention, when the base video data correspond to the side-by-side format, the vertical line-interleaving may be performed, and when the based video data correspond to the top-bottom format, the horizontal line-interleaving may be performed.

2) when the field value of the complementary_type field is equal to 1: The complementary_type field indicates that the complementary video data are pixelinterleaved and carry order information on the perspective of the image being alternated (or changed) for each line. Herein, the order information corresponds to information on the pixels for reconfiguring a full-resolution image.

The complementary video data may be interleaved in pixel units, so as to be transmitted in a checkerboard format. In this case, a pixel of a left image and a pixel of a right image may be alternated in pixel units (or on a pixel-by-pixel basis) within a single line. Also, in order to normally recover the full-resolution image, the receiving system is required to transmit such information on the order of alternation. In this case, regarding the video data included in the first pixel of the full-resolution image, which is being reconfigured (or reconstructed), the complementary_first_flag field indicates to which perspective or layer the video data included in the first pixel corresponds.

3) when the field value of the complementary_type field is equal to 2: The complementary_type field indicates that the complementary video data are frame-interleaved and include complementary frames for reconfiguring (or reconstructing) a full-resolution image.

According to the embodiment of the present invention, the meaning of full-resolution signifies temporal resolution. In this case, the complementary video data may include image data interleaved in frame units (or on a frame-by-frame basis) and may also include video data on a frame-by-frame (or frame sequential) basis. The complementary_first_flag field may notify the receiving system whether the video frame being received through the complementary video component is positioned before or after the video frame being received through the base video component.

4) when the field value of the complementary_type field is equal to 3: The complementary_type field indicates that the complementary video data are fieldinterleaved and include complementary frames for reconfiguring (or reconstructing) a full-resolution image.

According to the embodiment of the present invention, the meaning of full-resolution signifies temporal resolution. In this case, the complementary video data may include image data interleaved in field units (or on a field-by-field basis) and may also include video data on a field-by-field basis. The complementary_first_flag field may notify the receiving system whether the video field being received through the complementary video component corresponds to an even field or an odd field for the full-resolution image.

5) when the field value of the complementary_type field is equal to 4: The complementary_type field may indicate that the complementary video data include residual or incremental data for reconfiguring (or reconstructing) the full-resolution image.

According to the embodiment of the present invention, regardless of the stereo-multiplexing format of the base video component, the complementary video component includes residual or incremental data for reconfiguring (or reconstructing) the full-resolution image. In this case, prior to combining the complementary video data and the base video data, the receiving system may perform interpolation or doubling on the base video data.

FIG. 38 illustrates an embodiment of signaling of 3D Complementary Video Descriptor in PMT. In other words, 3D complementary video descriptor within PMT will provide complementary video element that configures full-resolution 3D stereoscopic program.

3D_complementary_video_descriptor_PMT is located after the ES_info_length field within the PMT and includes information corresponding to elementary stream. The meaning of each field is identical with 3D_complementary_video_descriptor_VCT. The codec_type can be replaced with stream_type field within PMT and in such a case 3D complementary video descriptor may be omitted.

Subsequently, a method for signaling 3D complementary video information using the PMT will now be described in detail.

FIG. 39 illustrates a syntax structure of a PMT including 3D complementary video information according to an embodiment of the present invention.

The fields included in the PMT of FIG. 39 will be described as follows. A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary_PID' field. In addition, the 'stream_type' field may indicate a coding type of a corresponding video element. As an exemplary coding type, a JPEG, an MPEG-2, an MPEG-4, an H.264/AVC, an H.264/SVC or H.264/MVC scheme may be used.

An 'elementary_PID' field is a 13-bit field specifying a PID of the Transport Stream (TS) packets which carry the associated elementary stream or payload. This PID may be used as a PID of primary video data or secondary video data.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

A descriptor field (11010) includes 3D complementary video information and will hereinafter be described in detail with reference to the accompanying drawings.

Subsequently, a method for signaling 3D complementary video information through a complementary video ES included in the complementary video data will now be described in detail.

Figure 40:
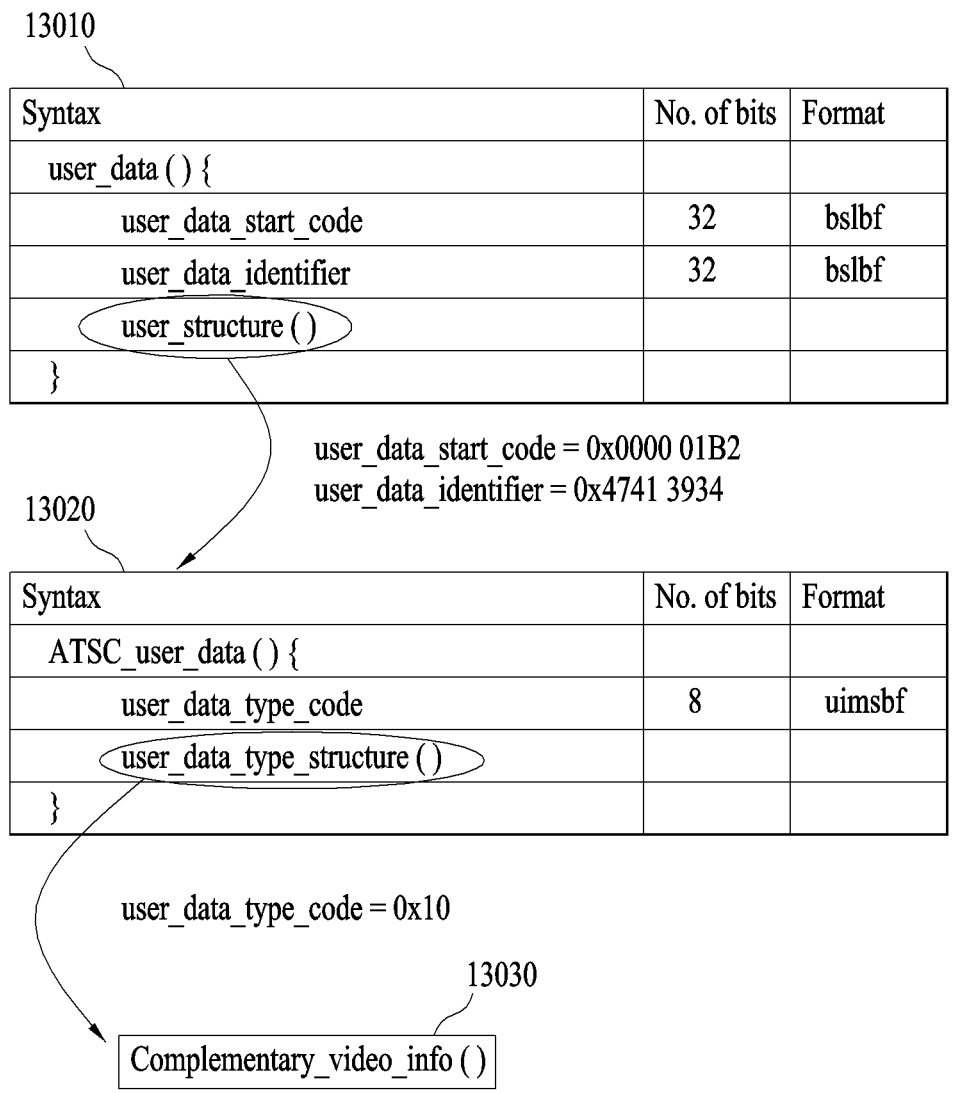
FIG. 40 illustrates a syntax structure of a Picture Extension and user Data of a video ES included 3D complementary video information according to an embodiment of the present invention.

FIG. 40 illustrates a syntax structure of a Picture Extension and user Data of a video ES including 3D complementary video information according to an embodiment of the present invention.

According to an embodiment of the present invention, an ATSC telecommunications system may include 3D complementary video information in the header information of a video ES, instead of a PISP layer, and may signal the corresponding information. More specifically, 3D complementary video information (complementary_video_info( ); 13030) may be included in the complementary video ES so as to be transmitted, and, by parsing the corresponding information in the video decoder, the receiving system may acquire information required for controlling display output.

According to an embodiment of the present invention, when the complementary video data are encoded by using an MPEG-2 video coding scheme, the 3D complementary video information may be included in a user_data( ) (13010) of a Picture Extension and user Data, so as to be transmitted. The Picture Extension and user Data may be received after a Picture Header and a Picture Coding Extension, thereby being decoded.

In the embodiment of FIG. 40, a field value of a user_data_start_code field is fixed to 0x0000 01B2.

A field value of a user_data_identifier (or ATSC_identifier) field corresponds to a 32-bit code given a value of 0x4741 3934.

A user_data_type_code field indicates a data type of an ATSC user data (13020) and may have a field value of 8 bits. According to an embodiment of the present invention, by using a value of 0x10, this field may indicate that the 3D complementary video information (13030) is included.

In case of H.264 or AVC Video, the corresponding information is transmitted to SEI (Supplemental Enhancement Information) area as illustrated in FIG. 41. The user_identifier and user_structure is included in user_data_registered_itu_t_135( ). Therefore, the corresponding information is transported to SEI payloads instead of user_data( ).

Hereinafter, the method for providing a full-resolution image using base video data, complementary video data, and 3D complementary video data received from a 3D video service Spec-B will now be described in detail.

Figure 42:
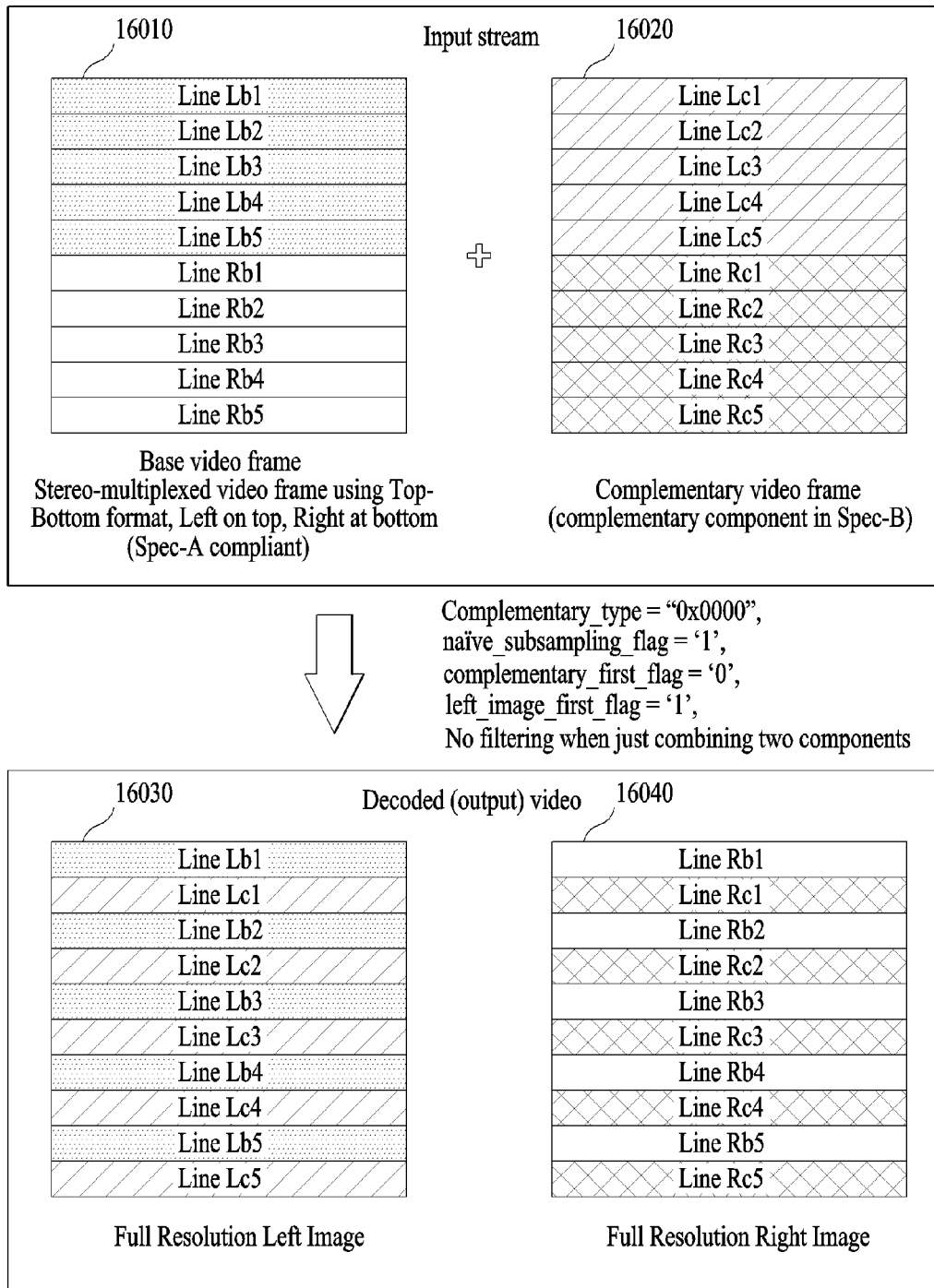
FIG. 42 illustrates a method for providing a full-resolution image using base video data, complementary video data, and 3D complementary video information received from a 3D video service Spec-B according to an embodiment of the present invention.

FIG. 42 illustrates a method for providing a full-resolution image using base video data, complementary video data, and 3D complementary video information received from a 3D video service Spec-B according to an embodiment of the present invention.

In the embodiment of FIG. 42, the image of the base video data is received in the top-bottom format, wherein the left image is positioned at the top side, and wherein the right image is positioned at the bottom side. In case of the 3D complementary video information, the field value of the complementary_type field is indicated as '0x0000', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data are processed with line-interleaving, that low-pass filtering and high-pass filtering are not performed when performing subsampling, that the video data corresponding to the left view is presented first, and that the video data corresponding to the base video precede the video data corresponding to the complementary video.

Depending upon the 3D complementary video information, the receiving system extracts left image portions (Lb1~Lb5) from a base video frame (16010) of the top-bottom format, extracts left image portions (Lc1~Lc5) from a complementary video frame (16020), and reconfigures (or reconstructs) the extracted video data line-by-line, thereby acquiring a full-resolution left image (16030). Similarly, depending upon the 3D complementary video information, the receiving system extracts right image portions (Rb1~Rb5) from a base video frame (16010) of the top-bottom format, extracts right image portions (Rc1~Rc5) from a complementary video frame (16020), and reconfigures (or reconstructs) the extracted video data line-by-line, thereby acquiring a full-resolution right image (16040).

The receiving system may display the acquired full-resolution left image (16030) and right image (16040) through a frame sequential scheme. In this case, since two frames (16030, 16040) are generated from one frame (16010) in frame units, temporal full-resolution display becomes available.

FIG. 43 illustrates a method for providing a full-resolution image using base video data, complementary video data, and 3D complementary video information received from a 3D video service Spec-B according to another embodiment of the present invention.

In the embodiment of FIG. 43, the image of the base video data is received in the top-bottom format, wherein the left image is positioned at the top side, and wherein the right image is positioned at the bottom side. In case of the 3D complementary video information, the field value of the complementary_type field is indicated as '0x0000', the field value of the naive_subsampling_flag field is indicated as '0', the field value of the left_image_first_flag field is indicated as '1', and the field value of the complementary_first_flag field is indicated as '0'. More specifically, the 3D complementary video information indicates that the complementary video data are processed with line-interleaving, that low-pass filtering and high-pass filtering must be performed when performing subsampling, that the video data corresponding to the left view is presented first, and that the video data corresponding to the base video precede the video data corresponding to the complementary video.

Firstly, depending upon the 3D complementary video information, the receiving system performs low-pass filtering on the base video frame, thereby acquiring filtered base video frames (Lb1'~Lb5' and Rb1'~Rb5'). Also, the receiving system performs high-pass filtering on the complementary video frame, thereby acquiring filtered complementary video frames (Lc1'~Lc5' and Rc1'~Rc5').

Depending upon the 3D complementary video information, the receiving system extracts low-pass filtered left image portions (Lb1'~Lb5') from a base video frame of the top-bottom format and extracts low-pass filtered left image portions (Lc1'~Lc5') from a complementary video frame. Thereafter, the receiving system reconfigures (or reconstructs) the extracted video data line-by-line, thereby acquiring a full-resolution left image (1030). Similarly, depending upon the 3D complementary video information, the receiving system extracts low-pass filtered right image portions (Rb1'~Rb5') from a base video frame of the top-bottom format and extracts low-pass filtered right image portions (Rc1'~Rc5') from a complementary video frame. Then, the receiving system reconfigures (or reconstructs) the extracted video data line-by-line, thereby acquiring a full-resolution right image (17040).

The receiving system may display the acquired full-resolution left image (17030) and right image (17040) through a frame sequential scheme. In this case, since two frames (17030, 17040) are generated from one frame (17010) in frame units, temporal full-resolution display becomes available.

Figure 44:
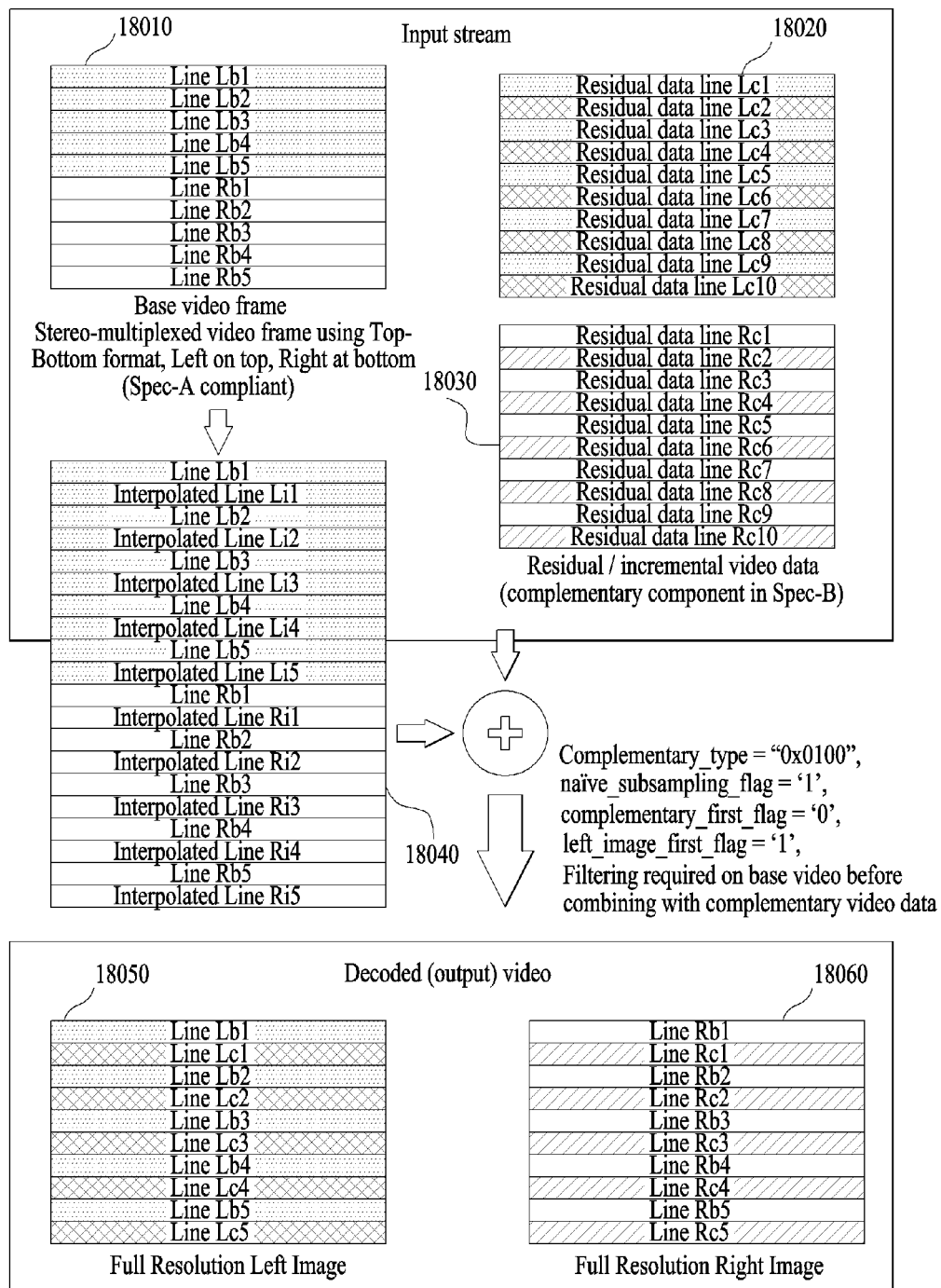
FIG. 44 illustrates a method for providing a full-resolution image using base video data, complementary video data, and 3D complementary video information received from a 3D video service Spec-B according to yet another embodiment of the present invention.

FIG. 44 illustrates a method for providing a full-resolution image using base video data, complementary video data, and 3D complementary video information received from a 3D video service Spec-B according to yet another embodiment of the present invention.

In the embodiment of FIG. 44, the image of the base video data is received in the top-bottom format, wherein the left image is positioned at the top side, and wherein the right image is positioned at the bottom side. In case of the 3D complementary video information, the field value of the complementary_type field is indicated as '0x0004', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data include residual video data with respect to the base video data (0x0004), that low-pass filtering and high-pass filtering are not performed when performing subsampling, that the video data corresponding to the left view is presented first, and that the video data corresponding to the base video precede the video data corresponding to the complementary video.

The receiving system performs line-by-line interpolation on the base video frame (18010), which is received first, thereby acquiring a spatially doubled video frame (18040). Thereafter, the receiving system combines the interpolated lines (Li1, Li2, . . . , Ri5) with the residual data lines (Lc1~Lc10 and Rc1~Rc10) of the complementary video frame (18020). Then, by positioning the combined lines line-by-line with the lines of the base video frame, a full-resolution left image (18050) and right image (18060) are acquired. According to an embodiment of the present invention, in case of the left image, line Li1 of the interpolated base video frame (18040) is combined with data of lines Lc1 and Lc2 of the complementary video frame (18020), thereby acquiring a line image Lc1 of the full-resolution image (18050). Subsequently, by using a method of positioning this line image Lc1 between line images Lb1 and Lb2, a full-resolution left image (18050) may be acquired.

The receiving system may display the acquired full-resolution left image (18050) and right image (18060) through a frame sequential scheme. In this case, since two frames (17050, 17060) are generated from one frame (18010) in frame units, temporal full-resolution display becomes available.

Figure 45:
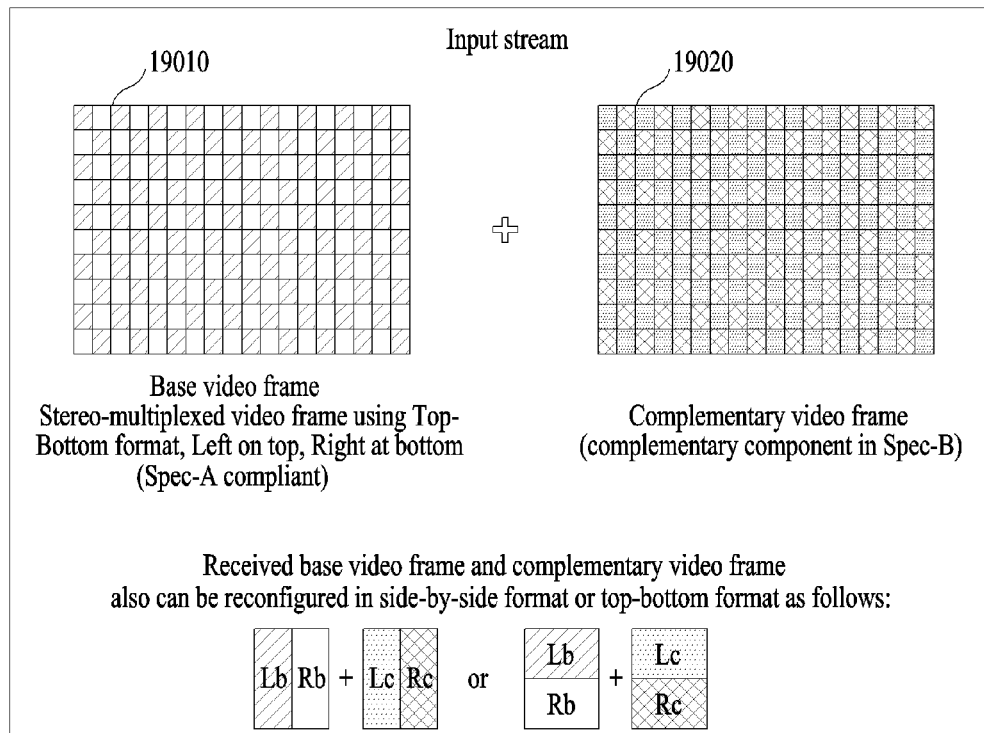
FIG. 45 illustrates a method for providing a full-resolution image using base video data, complementary video data, and 3D complementary video information received from a 3D video service Spec-B according to yet another embodiment of the present invention.

FIG. 45 illustrates a method for providing a full-resolution image using base video data, complementary video data, and 3D complementary video information received from a 3D video service Spec-B according to yet another embodiment of the present invention. In the embodiment of FIG. 45, the image of the base video data is received in the checkerboard format, wherein the left image is positioned in an uppermost pixel of a left-end portion. In case of the 3D complementary video information, the field value of the complementary_type field is indicated as '0x0001', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data include a line-alternating order of the complementary video image for the base video image (0x0001), that low-pass filtering and high-pass filtering are not performed when performing subsampling, that the video data corresponding to the left view is presented first, and that the video data corresponding to the base video precede the video data corresponding to the complementary video.

The receiving system aligns pixels of a left view and pixels of a right view included in the received base video frame (19010) and aligns pixels of a left view and pixels of a right view included in the received complementary video frame (19020) for each line according to the respective order by using the 3D complementary video information. Thus, full-resolution left image (19030) and right image (19040) may be acquired. Also, according to an embodiment of the present invention, the receiving system re-configures (or reconstructs) the received base video frame (19010) and complementary video frame (19020) in the side-by-side format or the top-bottom format. Then, the receiving system aligns the reconfigured video frames in accordance with the 3D complementary video information, thereby acquiring the full-resolution left image (19030) and right image (19040).

The receiving system may display the acquired full-resolution left image (19030) and right image (19040) through a frame sequential scheme. In this case, since two frames (19030, 19040) are generated from one frame (19010) in frame units, temporal full-resolution display becomes available.

The operation of the receiving system acquiring a full-resolution video component by combining a base video component and a complementary video component may be performed according to diverse embodiments in accordance with the above-described embodiments of the present invention.

According to an embodiment of the present invention, when the base video component is referred to as B, when the complementary video component is referred to as C, and when a full-resolution video component is referred to as F, the following operation scenario may be available.

case 1: F=B+C
case 2: F=B'+C
case 3: F=B'+C'

Herein, B' and C' respectively correspond to B and C being processed with interpolation/filtering.

Case 1 corresponds to an example wherein the field value of the naive_subsampling_flag field is equal to '1'. Therefore, this case corresponds to an embodiment wherein two subsampled video component are interleaved and aligned.

Case 2 corresponds to an example wherein B is processed with interpolation/filtering and then combined with C, thereby gaining F. Herein, C may correspond to a residual/incremental data format. (Particularly, when an SVC coding scheme is used, such form of combination may be performed.)

Case 3 corresponds to an example wherein the field value of the naive_subsampling_flag field is equal to '0'. Therefore, this case corresponds to an embodiment wherein both B and C are processed with interpolation/filtering and wherein B' is combined with C', thereby gaining F.

FIG. 46 is another embodiment illustrating signaling 3DTV service using SDT.

The Service Descriptor includes Service type that indicates that it is a 3DTV 2.0 service (signaling whether video data is included for Spec-B support). Also, the descriptor( ) includes information about complementary video component configuring 3DTV service corresponding to Spec-B.

FIG. 47 illustrates service type of full-resolution stereoscopic 3DTV service in order to support Spec-B according to an embodiment of the present invention. The value of the service type may be included in the Descriptor Loop of SDT included in Service Descriptor of DVB. The improvement according to the present invention as compared to the conventional Spec-A is as follows:

1) Spec-A and Spec-B services are separately defined but the streams configuring each service are shared. In case of Spec-B, the service type is defined as explained in FIG. 47. The Base Layer stream that configures the service may be shared and moreover, the Spec-B service further includes Enhancement layer stream to provide Full Resolution 3DTV service.

2) It is also possible to provide the full-resolution service with just configuring Spec-A. In such a case Enhancement Stream does not have a separate value so the conventional Spec-A receiver will ignore the Enhancement Stream and provide half-resolution with just the base Layer stream. In a Spec-B supported receiver, the Enhancement Stream is recognized and the receiver will combine with base layer to provide full-resolution service.

FIG. 48 illustrates the Service_type that is added to signal the 3DTV service using the SDT. FIG. 49 illustrates the syntax of the conventional component descriptor. And, FIG. 50 illustrates the definition and description of stream_content and component_type to indicate full-resolution 3D stereoscopic Service in a DVB broadcast system.

Each elementary stream configured for DVB service signals by adding component descriptor in the descriptor of the SDT. In the present invention, stream_content and component_type is defined as shown in FIG. 50 to separate 3D complementary video to provide full-resolution 3D stereoscopic service. For MPEG-2 video, stream type which indicates the type of the stream is defined as 0x01 and for H.264 video, it is defined to be 0x05.

FIG. 51 illustrates a syntax structure of a 3D complementary video descriptor included in a SDT according to an embodiment of the present invention.

The 3D_complementary_video_descriptor_SDT is located in the descriptor of descriptors_loop_length field in the SDT and includes information regarding 3D complementary elementary stream. The meaning of each field is the same with the 3D_complementary_video_descriptor_VCT as illustrated in FIG. 36. The codec_type may be replaced with stream_content and component_type field within component descriptor in the SDT and in such a case it may also be omitted from the 3D complementary video descriptor.

Further, component_tag may be used to indicate the relationship with ES of the ES_loop of the PMT and component descriptor.

The receiver operation process for receiving 3D complementary video descriptor through TVCT will be explained.

First, using the service_type of TVCT, whether the corresponding virtual channel provides full-resolution stereoscopic 3DTV service is determined. Also, receiver supporting Spec-B is able to determine whether full-resolution stereoscopic 3DTV service is provided or not by the existence of 3D complementary video descriptor by using the same service_type as half-resolution stereoscopic 3DTV service.

Next, if full-resolution stereoscopic 3DTV service is provided, elementary_PID information (PID_B) of 3D stereo base video component is received using the stereo format descriptor.

Then, elementary PID information (PID_C) regarding complementary video component is received using the 3D Complementary video descriptor.

The base video corresponding to PID_B is decoded and then the complementary video signal corresponding to PID_C is decoded.

The left and right image of full resolution is acquired by combining base video and complementary video signal using the complementary_type, left_image_first_flag, and complementary_first_flag included in the 3D complementary video descriptor. Then left and right image is outputted to full-resolution stereoscopic display to provide 3D display to the user.

Figure 52:
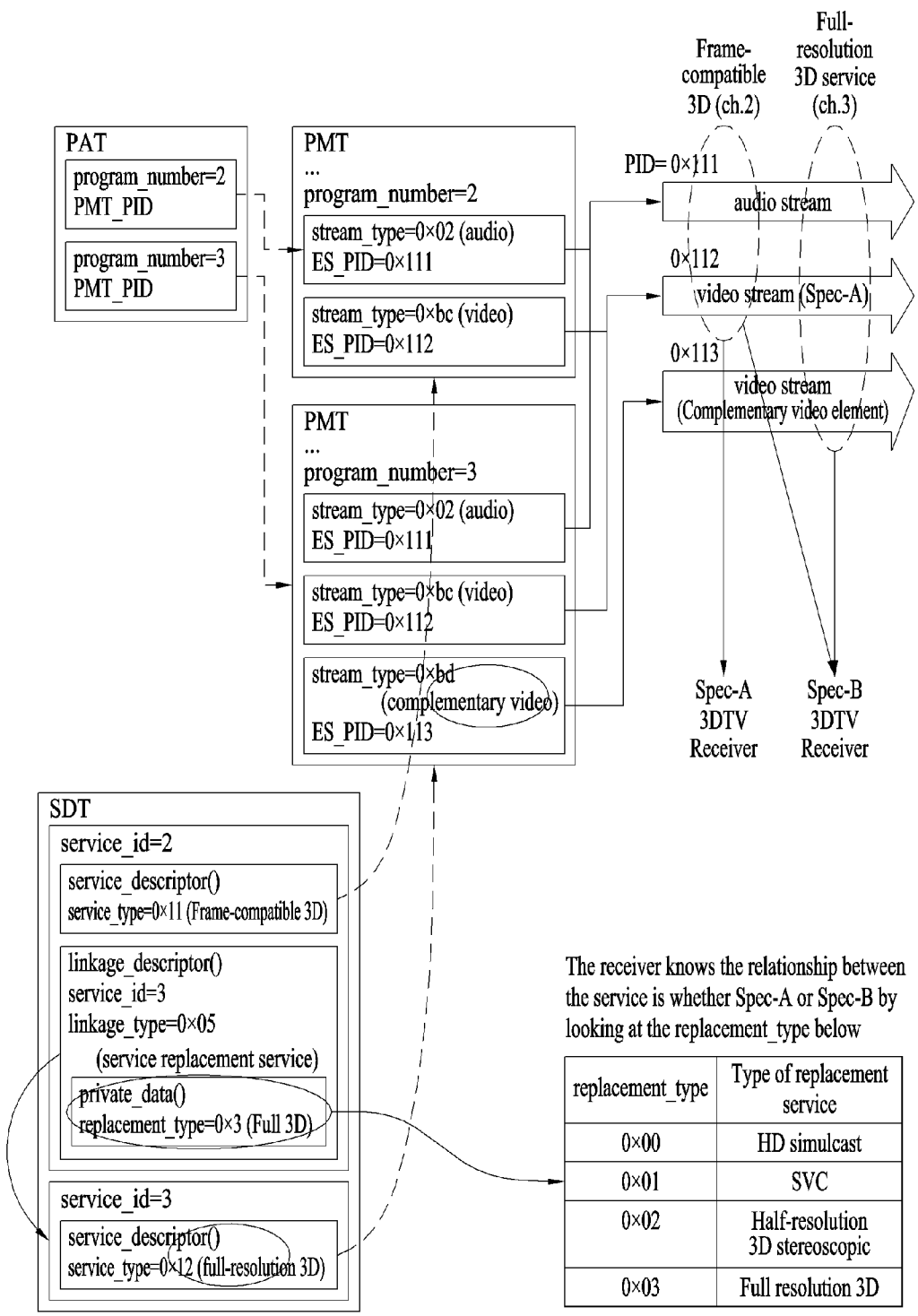
FIG. 52 illustrates a method of signaling Spec-A and Spec-B 3D service using linkage descriptor according to an embodiment of the present invention.

FIG. 52 illustrates how 3D complementary video descriptor is received through PMT according to an embodiment of the present invention.

First, the stream corresponding to Spec-A form the elementary stream signaled from PMT is identified. Next, complementary video stream from elementary stream signaling from PMT is identified. Using the program_number field and the information provided through TVCT, mapping is performed. Then base video is decoded along with decoding the complementary video signal.

Then, full resolution is acquired with left and right image. Finally, full-resolution stereoscopic display is displayed as 3D to the user.

Figure 53:
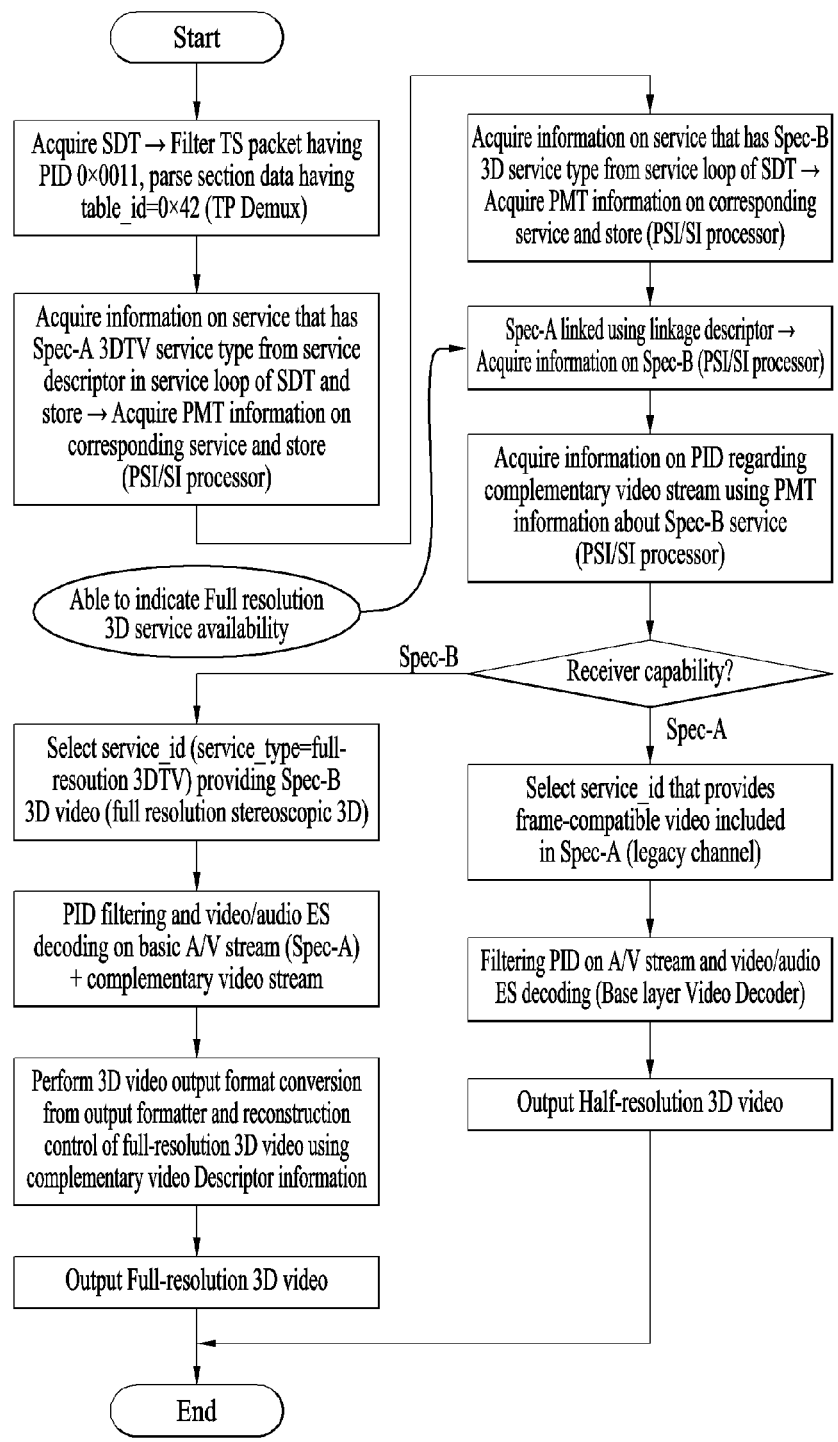
FIG. 53 illustrates a flowchart indicating a process of outputting stereoscopic video signal by parsing 3D signal information according to an embodiment of the present invention.

FIG. 53 illustrates a flow process for outputting stereoscopic video signal by parsing 3D signal. The process is explained below.

First SDT is acquired and the TS packet is being filtered. Then PMT information on corresponding service is acquired. By looking into the service loop within the SDT, Spec-B 3D service type information is acquired and stored. The PMT information corresponding to the service is acquired and stored. Through the linkage descriptor Spec-A and Spec-B information is determined. The PMT information for Spec-B is used to determine the PID information for complementary video stream.

If the receiver is capable of receiving Spec-B then service_id providing Spec-B 3D video is selected and together with conventional NV stream and PID filter of the complementary video stream, ES decoding on video/audio is performed. Then full-resolution 3D video is outputted by reconstruction control and conversion of 3D video output is performed using Complementary video Descriptor information.

If the receiver is capable of receiving Spec-A, the service_id provided by frame-compatible video included in Spec-A is selected. Then video/audio ES decoding and PID filter is performed on A/V stream. Finally, Half-resolution 3D video is outputted.

Figure 54:
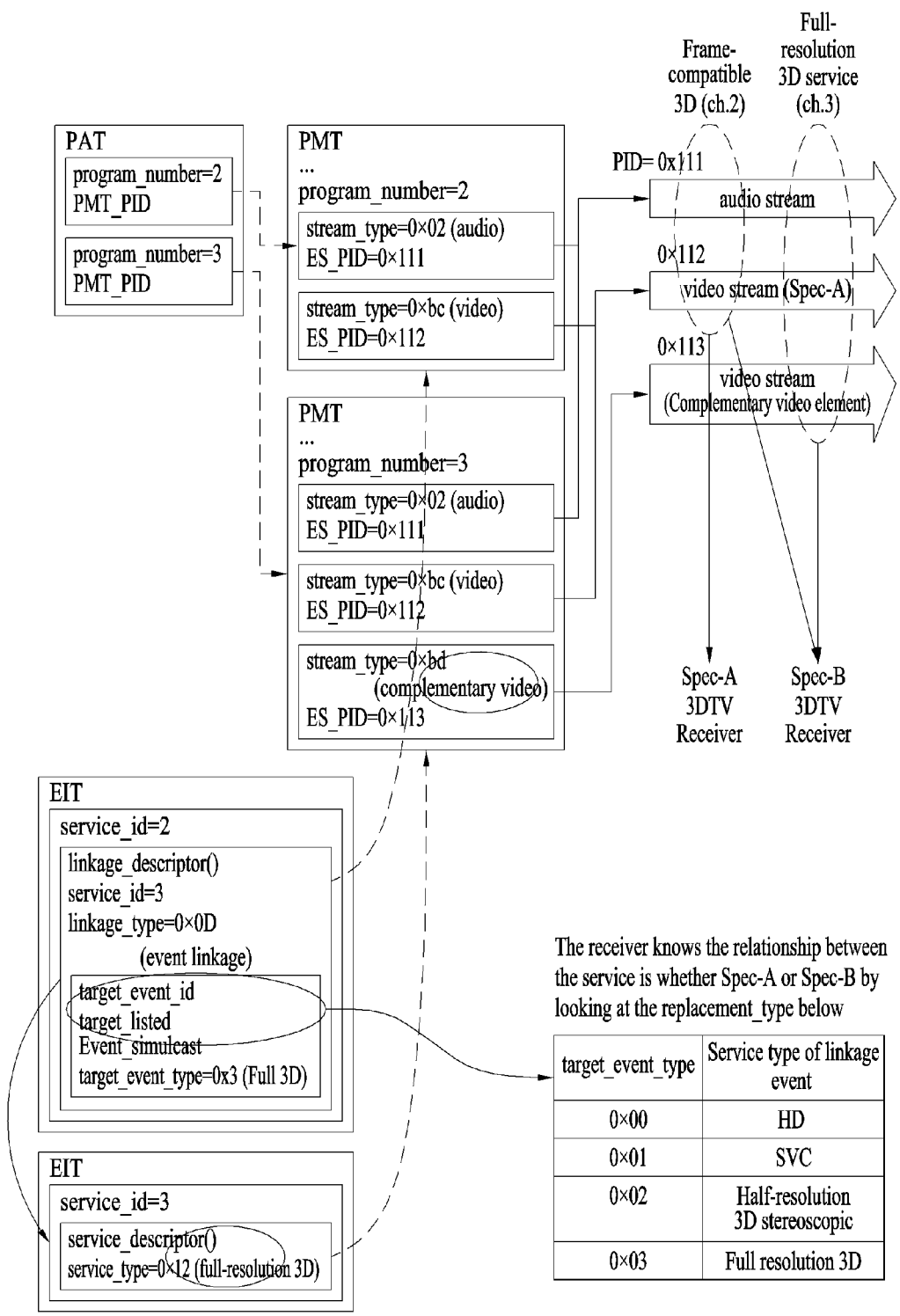
FIG. 54 illustrates a method of signaling Spec-A and Spec-B 3D service using linkage descriptor according to another embodiment of the present invention.

FIG. 54 illustrates in detail of the process of expanding event linkage for linking Spec-A event and Spec-B event. In the conventional SD event and HD event, separate information on the target event service type was not provided. By expanding the target_event type, 2D HD, Half-resolution 3D, Full resolution 3D is now distinguishable. And based on it, there is now a link between Half-resolution 3D event and Full resolution 3D event.

FIG. 55 illustrates that location of 3D_complementary_video_descriptor is in the event_information_table_section( ) to provide full-resolution 3D TV service guide for ATSC PSIP EIT.

The descriptor( ) is inside the for loop to indicate whether full-resolution 3D TV service is available for each program and event.

FIG. 56 indicates that component descriptor or 3D_complementary_video_descriptor's location within the for loop of event_information_section( ) of DVB SI EIT.

As mentioned above, in ATSC transmission, 3D_Complementary_video_descriptor_TVCT is included in EIT to signal full-resolution 3DTV and for DVB, in addition to the same method for ATSC, component descriptor is utilized as well.

Figure 57:
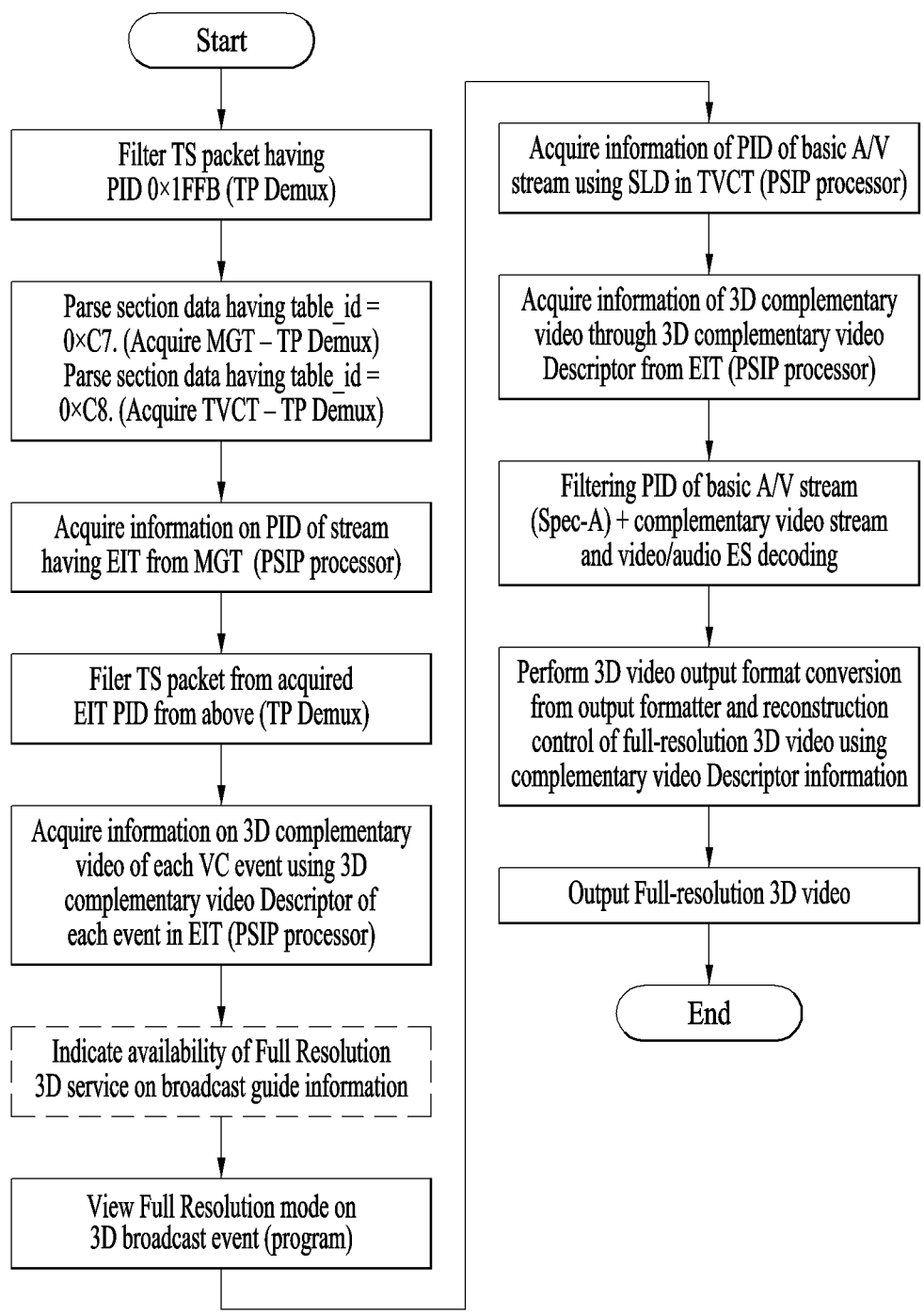
FIG. 57 illustrates a flowchart indicating a process for outputting stereoscopic video signal by parsing 3D complementary video descriptor and rendering using ATSC PSIP EIT according to an embodiment of the present invention.
Figure 58:
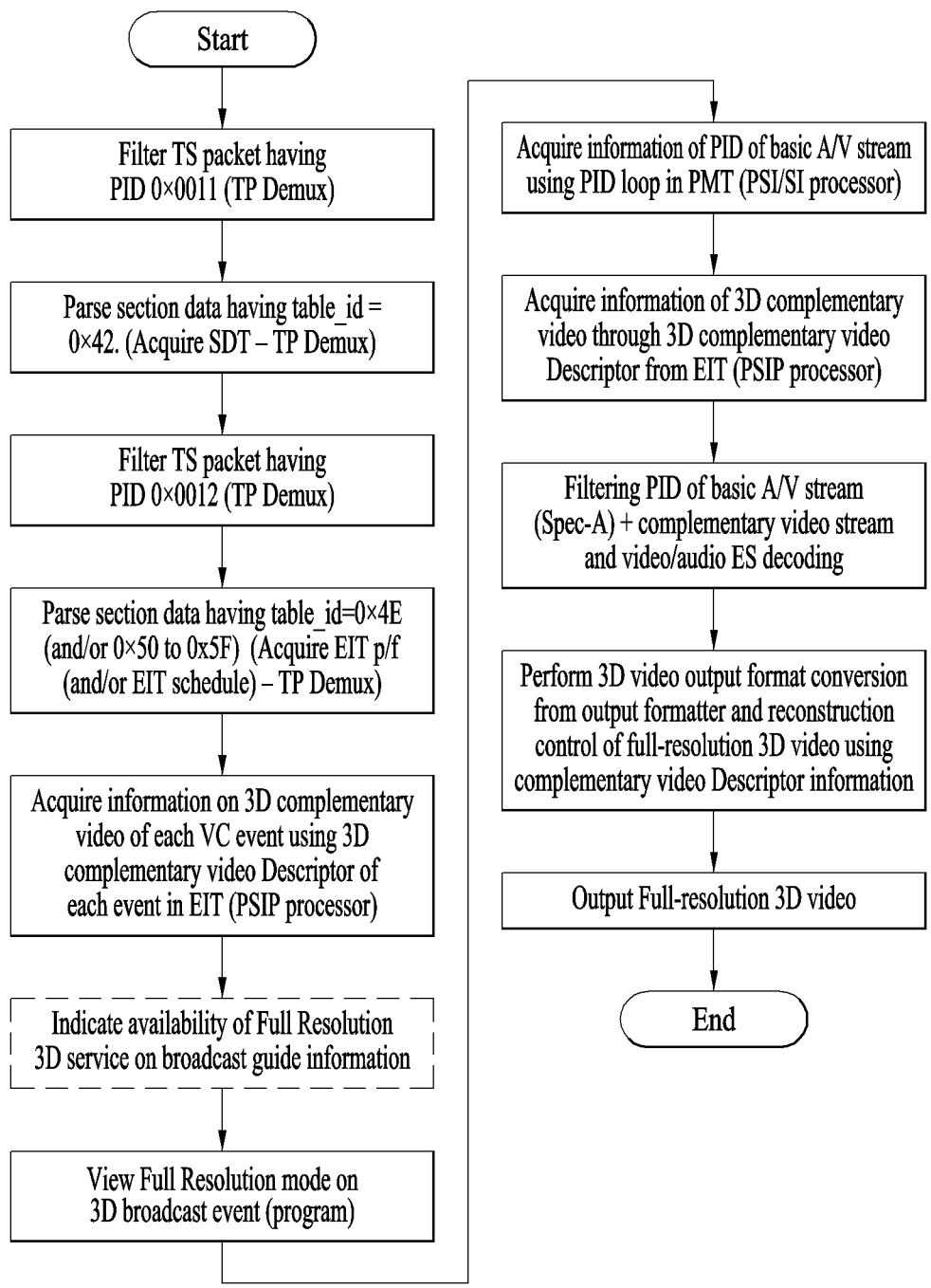
FIG. 58 illustrates a flowchart indicating a process for outputting stereoscopic video signal by parsing 3D complementary video descriptor and rendering using DVB SI EIT according to an embodiment of the present invention.

FIG. 57 illustrates the process of parsing and rendering 3D complementary video Descriptor for ATSC PSIP EIT and FIG. 58 illustrates the process for DVB SI EIT.

For ATSC PSIP EIT, filtering is performed for TS packet having PID value of 0x1FFB. Then section data having table id equal to 0xC7 and 0xC8 are parsed. Then information on PID of stream having EIT from MGT is acquired. Then TS packet from acquired EIT PID is filtered. Information on 3D complementary video of each VC event using 3D complementary video Descriptor of each event in EIT is acquired.

Then availability of full-resolution 3D service on broadcast guide information is indicated to view full-resolution mode on 3D broadcast event. Next, information of PID of basic A/V stream using SLD in TVCT is acquired. Acquiring information of 3D complementary video through 3D complementary video Descriptor from EIT is performed. Next filtering PID of basic A/V stream is performed as well and ES decoding video/audio.

Finally output of full-resolution 3D video is performed by conversion from output formatter and reconstruction control of full-resolution 3D video using complementary video descriptor information.

FIG. 58 shows the process of parsing and rendering 3D complementary video Descriptor for DVB SI EIT.

First, TS packet is filtered for PID value 0x0011. Then section data having table_id=0x42 is parsed. TS packet having PID 0x0012 is filtered and section data having table_id=0x4E is parsed. The difference between the ATSC and DVB is that in DVB, 3D complementary video Descriptor or component descriptor can be used to determine the existence of 3D complementary video stream.

Figure 59:
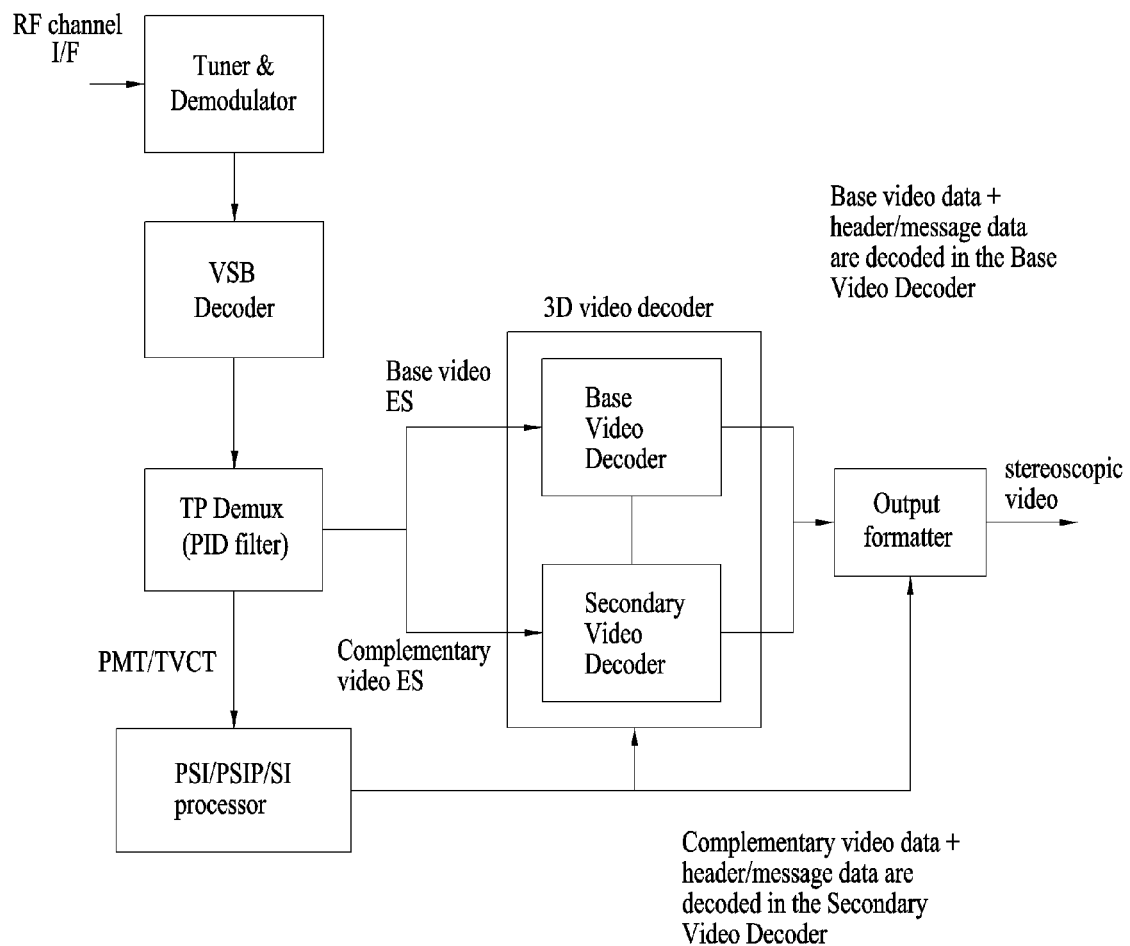
FIG. 59 illustrates a block diagram of broadcasting receiving system having a 3D video decoder according to an embodiment of the present invention.

Lastly, FIG. 59 illustrates a block diagram of broadcasting receiver having 3D video decoder.

Video streams in two layers pass through new-generation broadcasting receiver and base-layer video stream is decoded in the primary video decoder.

Enhancement-layer video stream is decoded in the secondary video decoder. Further the PSI/PSIP/SI processor parses 3D stereoscopic information from new-generation ATSC spec and DVB spec where PMT/TVCT/SDT contains new signaling syntaxes to support 3D services. And the Next-generation receiver may convert full-resolution 3D video formats into specific stereoscopic formats according to kinds of 3DTV or 3D display.

Figure 60:
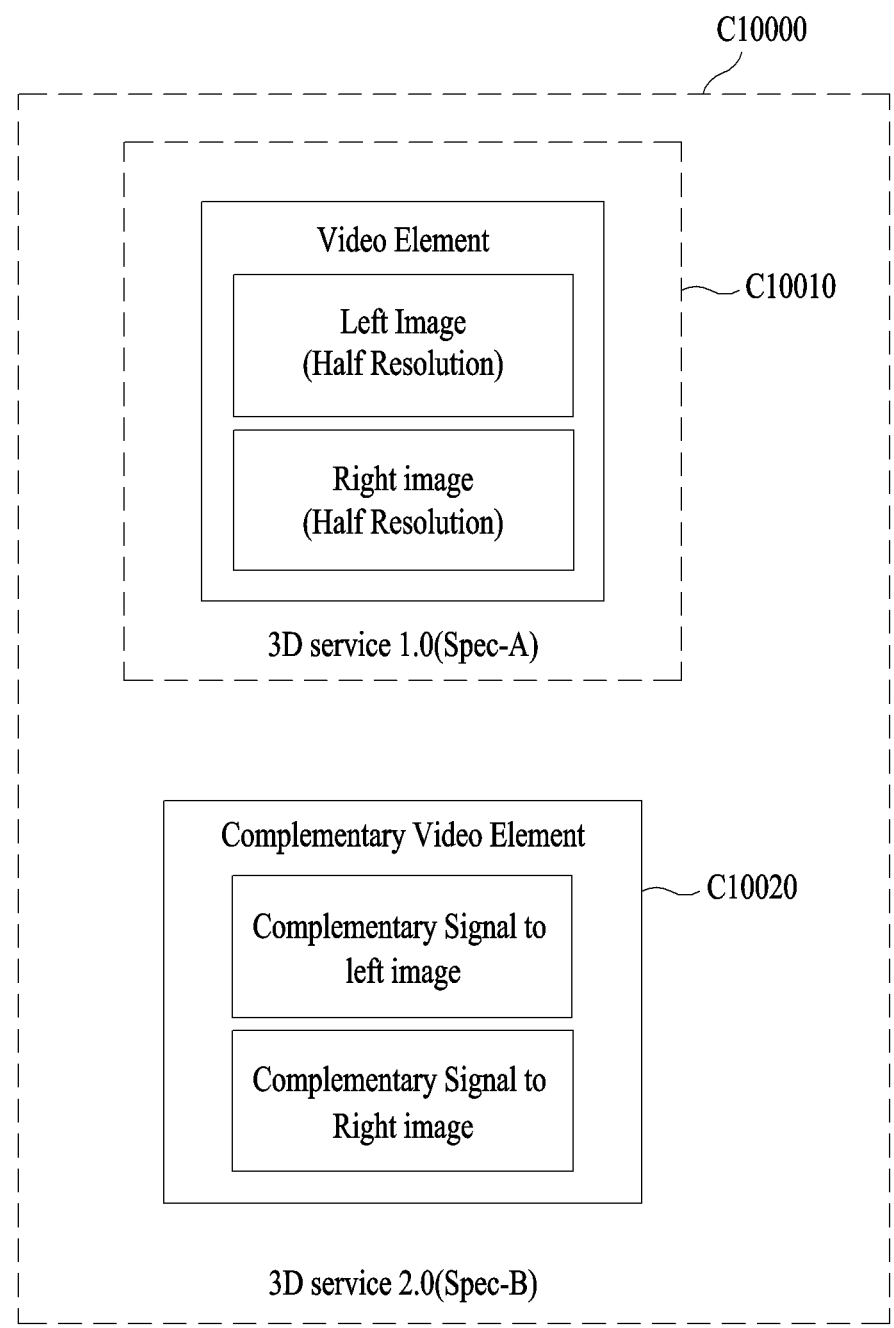
FIG. 60 is a diagram illustrating a concept of 3D service 2.0 (Spec-B) according to an embodiment of the present invention.

FIG. 60 is a diagram illustrating a concept of 3D service 2.0 (Spec-B) according to an embodiment of the present invention.

The drawing illustrates a concept of a 3D service according to the embodiment of the present invention. According to the embodiment of the present invention, a 3D service C10000 for providing a full-resolution image will be referred to as a 3D service 2.0 (Spec-B) and/or 3D service 2B. Hereinafter, a 3D service 1.0 C10010 for providing a half-resolution image will be referred to as a Frame Compatible 3D service (FC-3D service), 3D service 1.0 (Spec-A), and/or 3D service 1A.

The 3D service 1.0 (Spec-A) C10010 may be served as a half-resolution left image and a half-resolution right image. 3D service 2.0 (Spec-B) C10020 for providing a full-resolution image needs to be compatible with the 3D service 1.0 (Spec-A) C10010 instead of newly transmitting a full-resolution image and, thus, a method of providing differential data or additional data for transmitting a full-resolution image while maintaining transmission of an image of the 3D service 1.0 (Spec-A) C10010 may be used. In more detail, a complementary video element C10020 of the 3D service 2.0(Spec-B) may be added to a half-resolution video element of the 3D service 1.0 (Spec-A) C10010 so as to provide the 3D service C10000 of full-resolution. Accordingly, a broadcast receiving apparatus for supporting the 3D service 1.0(Spec-A) may receive and process data of the 3D service 1.0 (Spec-A) C10010 so as to provide a half-resolution image and a broadcast receiving apparatus for supporting the 3D service 2.0(Spec-B) may receive and process data of the 3D service 1.0 (Spec-A) C10010 and complementary data of the 3D service 2.0 (Spec-B) so as to provide a full-resolution image.

Figure 61:
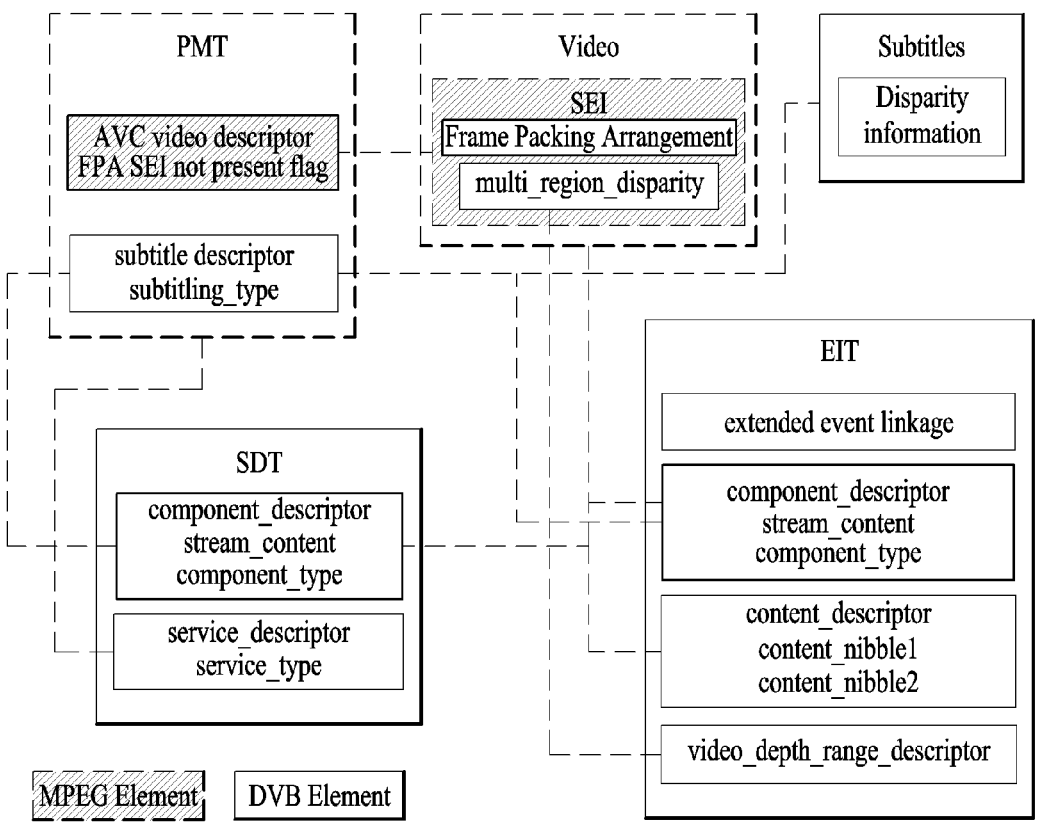
FIG. 61 is a diagram illustrating a method of signaling 3D service 2.0(Spec-B) according to an embodiment of the present invention.

FIG. 61 is a diagram illustrating a method of signaling 3D service 2.0(Spec-B) according to an embodiment of the present invention.

Signaling information for signaling the 3D service 2.0 (Spec-B) may be defined at a system level and/or a video level.

When defined at the system level, the signaling information may be included in PSI, ATSC-PSIP, and/or DVB-SI. According to the embodiment of the present invention, a PSI table may include PAT and/or PMT. In addition, a DVB SI table may include NIT, SDT, and/or EIT. In addition, an ATSC PSIP table may include VCT, STT, RRT, ETT, DCCT, DDCSCT, EIT, and/or MGT. A detailed description of the PSI table, the DVB SI table, and/or the ATSC PSIP table is the same as the above description and, thus, will be substituted with the above description. Hereinafter, the present invention will be described in terms of a case in which the signaling information is defined in the PSI table and/or the DVB SI table.

When defined at the video level, the signaling information may be included in a header of a video ES. When video data is encoded using an MPEG-2 or MPEG-4 video coding scheme, the signaling information may be included in user_data( ) 13010 of picture extension and user data. When video data is encoded using a H.264/AVC or H.265/HEVC video coding scheme, the signaling information may be included in a Supplemental Enhancement Information (SEI) message. The case in which the signaling information is defined at the video level may be applied in the same way to a DVB transmission procedure as well as an ATSC transmission procedure. Hereinafter, the present invention will be described in terms of a case in which the signaling information and video data are encoded using a H.264/AVC video coding scheme.

The signaling information may include a service descriptor, a component descriptor of a base layer, and/or a component descriptor of an enhancement layer. The service descriptor, the component descriptor of the base layer, and/or the component descriptor of the enhancement layer will be described in detail.

Hereinafter, the present invention will be described in terms of a method of signaling 3D service 2.0 (Spec-B) in MPEG and/or DVB standard.

Referring to the drawing, the signaling information for signaling the 3D service 2.0 (Spec-B) may be a descriptor and/or a field included in at least one of PMT, video ES, subtitle, SDT, and/or EIT.

The PMT may include AVC_video_descriptor and/or subtitling descriptor. Each video ES may include an SEI message and subtitles may include disparity information and/or Disparity Signaling Segment (DSS). The SDT may include a service descriptor and/or a component descriptor. The EIT may include extended event linkage, component descriptor, content descriptor, and/or video depth range descriptor. The signaling information will be described below in detail.

A receiving apparatus for supporting the 3D service 1.0 (Spec-A) may receive and process base video data and/or 3D video information of a base layer based on the signaling information so as to provide a half-resolution 3D image. In addition, a receiving apparatus for supporting the 3D service 2.0 (Spec-B) may receive and process complementary video data and/or 3D complementary video information of an enhancement layer as well as the base video data and/or the 3D video information of the base layer based on the signaling information so as to full-resolution 3D image.

The detailed description of the method of providing the base video data, the 3D video information, the complementary video data, the 3D complementary video information, and/or the 3DTV service according to the embodiment of the present invention is the same as the above description and, thus, will be substituted with the above description.

Hereinafter, the signaling information will be described in detail.

First, the signaling information may include AVC_video_descriptor.

The AVC_video_descriptor may include basic information for identifying coding parameters of an AVC video stream related to a profile and/or level parameters included in a Sequence Parameter Set (SPS) of an AVC video stream. The AVC_video_descriptor may be included in a descriptor loop of each elementary stream entry in a PMT of a transport stream for transmitting a 3D service. The SPS may be header information present across an entire sequence, such as a profile and/or a level.

The AVC_video_descriptor may include a descriptor_tag field, a descriptor_length field, a profile_idc field, a constraint_set0_flag field, a constraint_set1_flag field, a constraint_set2_flag field, an AVC_compatible_flags field, a level_idc field, an AVC_still_present field, an AVC_24_hour_picture_flag field, and/or a Reserved field.

The descriptor_tag field may include information for identifying the AVC_video_descriptor.

The descriptor_length field may include information indicating a size of the AVC_video_descriptor.

The profile_idc field may indicate a profile on which a bitstream is based. For example, the profile may include a Baseline profile, a Main profile, and/or an Extended profile.

The constraint_set0_flag field may indicate whether decoding can be performed with the Baseline profile.

The constraint_set1_flag field may indicate whether decoding can be performed with the Main profile.

The constraint_set2_flag field may indicate whether decoding can be performed with the Extended profile.

The AVC_compatible_flags field may be 5-bit data with a value of '0'. A decoder may disregard 5 bits.

The level_idc field may indicate a level of a bitstream. A level is determined in each profile according to a size of an image. The level may be used to determine constraint of a parameter according to a size of a corresponding image. The level_idc field may include five levels and an intermediate level thereof.

The AVC_still_present field may indicate whether an AVC video stream includes AVC still pictures. The AVC still pictures may include an AVC Access Unit including an IDR picture. The IDR picture may be subsequent to a Sequence Parameter Set (SPS) NAL unit and/or a Picture Parameter Set (PPS) NAL unit for transmitting sufficient information to accurately decode the IDR picture.

The AVC_24_hour_picture_flag field may indicate whether a related AVC video stream includes AVC 24-hour pictures. The AVC 24-hour picture may refer to an AVC Access Unit including future presentation time of 24 hours or more.

The AVC_video_descriptor may further include a Frame_Packing_SEI_not_present_flag field.

The Frame_Packing_SEI_not_present_flag field may indicate whether a frame packing arrangement SEI message is present in a coded video sequence (or video ES). The Frame_Packing_SEI_not_present_flag field may indicate whether a video sequence is 3DTV video format or an HDTV video format.

For example, during transmission of the 3D video format, the Frame_Packing_SEI_not_present_flag field may be set to '0' in order to signal that a frame packing arrangement SEI message is present in a coded video sequence. In addition, during transmission of the HDTV video format, the Frame_Packing_SEI_not_present_flag field may be set to '0' in order to signal that a frame packing arrangement SEI message is present in a coded video sequence.

When only the HDTV video format is used, when format transition is not supposed to occur in the 3D video format, and/or when format transition does not occur in the 3D video format, the Frame_Packing_SEI_not_present_flag field may be set to '1' in order to signal that a frame packing arrangement SEI message is not present in a coded video sequence.

In a base layer stream, a receiving apparatus may process base video data based on signaling information.

In an enhancement layer stream, when a value of the stream_type field of the PMT is "0x20", a video stream of the enhancement layer may be represented by "MVC video sub-bitstream of an AVC video stream". The receiving apparatus may identify whether a frame packing arrangement SEI message is present in a bitstream based on the Frame_Packing_SEI_not_present_flag field of the AVC_video_descriptor.

The signaling information may include a service descriptor.

The service descriptor may be used to describe a service type, a service provider, and/or a service name. The service descriptor may be included in PMT, SDT, and/or EIT.

The service descriptor may include a descriptor_tag field, a descriptor_length field, a service_type field, a service_provider_name_length field, a char field indicating a name of a service provider, a service_name_length field, and/or a char field indicating a service name. A detailed description of the service descriptor will be substituted with the above description.

The service_type field may indicate a service type. A detailed description of allocation of the service_type for a service will be substituted with the above description.

When a value of the service_type field is "0x0B", the service_type field may indicate "advanced codec mosaic service" and/or "H.264/AVC mosaic service". When a value of the service_type field is "0x16", the service_type field may include "advanced codec SD digital television service" and/or "H.264/AVC SD digital television service". When a value of the service_type field is "0x17", the service_type field may indicate "advanced codec SD NVOD time-shifted service" and/or "H.264/AVC SD NVOD time-shifted service". When a value of the service_type field is "0x18", the service_type field may indicate "advanced codec SD NVOD reference service" and/or "H.264/AVC SD NVOD reference service". When a value of the service_type field is "0x19", the service_type field may indicate "advanced codec HD digital television service" and/or "H.264/AVC HD digital television service". When a value of the service_type field is "0x1A", the service_type field may indicate "advanced codec HD NVOD time-shifted service" and/or "H.264/AVC HD NVOD time-shifted service". When a value of the service_type field is "0x1B", the service_type field may indicate "advanced codec HD NVOD reference service" and/or "H.264/AVC HD NVOD reference service".

When a value of the service_type field is "0x1C", the service_type field may indicate "advanced codec frame compatible plano-stereoscopic HD digital television service" and/or "H.264/AVC frame compatible plano-stereoscopic HD digital television service". When a value of the service_type field is "0x1D", the service_type field may indicate "advanced codec frame compatible plano-stereoscopic HD NVOD time-shifted service" and/or "H.264/AVC frame compatible plano-stereoscopic HD NVOD time-shifted service". When a value of the service_type field is "0x1 E", the service_type field may indicate "advanced codec frame compatible plano-stereoscopic HD NVOD reference service" and/or "H.264/AVC frame compatible plano-stereoscopic HD NVOD reference service".

When a value of the service_type field is any one of "0x1C", "0x1 D", and/or "0x1 E", the service_type field may indicate a "H.264/AVC frame compatible HD" service. When a value of the service_type field of base video data and/or enhancement video data is any one of "0x1C", "0x1 D", and/or "0x1 E", a receiving apparatus may determine that a corresponding video service is "H.264/AVC frame compatible HD".

In addition, the signaling information may include content_descriptor.

The content_descriptor may provide classification information of an event. The content_descriptor may be included in EIT and/or SIT. The content_descriptor will be described below in detail.

The signaling information may include a Frame Packing Arrangement SEI message.

The 3D service 2.0 (Spec-B) may provide signaling for dynamic transition between a 2D event and a 3D event. The encoded video stream may include a Frame Packing Arrangement (FPA) Supplemental Enhancement Information (SEI) message in order to signal the 3D service 2.0 (Spec-B). A 3D service for switching the 3DTV video format and the HDTV video format (e.g., non-3DTV format) may include a Frame Packing Arrangement SEI during transmission of a video stream of the HDTV video format as well as during transmission of the video stream of the 3DTV video format.

The Frame Packing Arrangement SEI message may include information for signaling the 3D service 2.0 (Spec-B). For example, the Frame Packing Arrangement SEI message may include a Frame_packing_arrangement_cancel_flag field and other feature information items such as format of 3D service 2.0 (Spec-B) video stream.

The Frame_packing_arrangement_cancel_flag field may indicate whether the video stream is 3D video format or HDTV video format.

For example, when a value of the Frame_packing_arrangement_cancel_flag field is '0', the Frame_packing_arrangement_cancel_flag field may indicate that the 3D video format is used and other fields of a corresponding descriptor may signal format and/or other features of the 3D video stream.

When a value of the Frame_packing_arrangement_cancel_flag field is '1', the Frame_packing_arrangement_cancel_flag field may indicate that the HDTV video format (i.e., non-3D video format) is used. For example, when a value of the Frame_packing_arrangement_cancel_flag field is '1, the Frame_packing_arrangement_cancel_flag field may indicate that the HDTV video format is used.

A receiving apparatus may rearrange samples based on the Frame Packing Arrangement SEI message and process the samples so as to display the samples of composition frames (left image and/or right image).

The Frame Packing Arrangement SEI message may not be present in the enhancement layer stream and may be present only in the base layer stream.

However, the Frame Packing Arrangement SEI message may include fields included in the aforementioned 3D service descriptor and fields included in the aforementioned 3D complementary video information. The 3D service descriptor may include signaling information on base video data. The 3D complementary video information may include signaling information on enhancement video data. The detailed description of the 3D service descriptor and/or the 3D complementary video information is the same as the above description and, thus, will be substituted with the above description.

Hereinafter, signaling information related to a subtitle will be described.

A receiving apparatus may display additional content such as subtitles and/or graphics so as not to be hidden by a 3D image. The subtitle may be a main element of a 3D service as well as SDTV and/or HDTV. It may be very important to accurately position subtitles together with on-screen graphics on the 3D video content under a depth and timing condition.

First, signaling information may include Disparity Signaling Segment (DSS).

The DSS may include definition of sub regions in a region. The Disparity Signaling Segment (DSS) may be included in a subtitle.

Second, the signaling information may include information on a DVB subtitle. In the component descriptor, when a value of the stream_content field is "0x03", the signaling information may include information on a DVB subtitle according to a value of the component_type field.

Third, the signaling information may include a subtitling descriptor.

The subtitling descriptor may include information on a DVB subtitle. The subtitling descriptor may be included in PMT.

Fourth, the signaling information may include disparity information. The disparity information may indicate how close an object is to a screen or how far the object is from the screen. The disparity information may be included in a subtitle.

Fifth, the signaling information may include video depth range descriptor. In order to optimize arrangement of graphics (e.g., text and/or icon) displayed at an upper end of 3D video, the video depth range descriptor may indicate an intended depth range of the 3D video.

Sixth, the signaling information may include multi-region disparity. The multi-region disparity may provide disparity information at the video level.

The Disparity Signaling Segment (DSS), the information on DVB subtitle, the subtitling descriptor, disparity information, the video depth range descriptor, and/or the multi-region disparity.

FIG. 62 is a diagram illustrating a stream_content field and/or a component_type field of a component descriptor according to an embodiment of the present invention.

The signaling information may include a component descriptor. For example, the signaling information may include a component descriptor of a base layer and/or a component descriptor of an enhancement layer.

The component descriptor may be used to identify a type of a component stream and to provide text description of an elementary stream. The component descriptor may be included in SDT and/or EIT. That is, the component descriptor may be defined as a descriptor of the SDT so as to determine whether a corresponding service serves a 3DTV service and defined as a descriptor of the EIT so as to determine whether a corresponding event serves a 3DTV.

The component descriptor may include a descriptor_tag field, a descriptor_length field, a reserved_future_use field, a stream_content field, a component_type field, a component_tag field, an ISO_639_language_code field, and/or a text_char field. A detailed description of the component descriptor will be substituted with the above description.

A type of a component stream may include at least one parameter. For example, the parameter may include bitstream information, codec information of a video stream, profile information, resolution information, image ratio information, frame rate information, image format information, and/or Bitdepth information.

When the stream_content field is '0x01', the stream_content field may indicate MPEG-2 video. In this case, when the component_type field is '0x11', the component_type field may indicate 25 Hz of frame-compatible 3D video and when the component_type field is '0x12', the component_type field may indicate 30 Hz of frame-compatible 3D video.

When the stream_content field is '0x05', the stream_content field may indicate H.264/AVC standard definition (SD) video. In this case, when the component_type field is '0x11', the component_type field may indicate 25 Hz of frame-compatible 3D video and when the component_type field is '0x12', the component_type field may indicate 30 Hz of frame-compatible 3D video.

When the stream_content field is '0x03' and the component_type field is '0x14', this may indicate DVB subtitles for displaying on a 3D monitor and when the stream_content field is '0x03' and the component_type field is '0x24', this may indicate DVB subtitles (for the hard of hearing) for displaying on a 3D monitor.

Referring to the drawing, the component descriptor according to an embodiment of the present invention may include a new stream_content field and/or component_type field applicable to the 3D service 2.0 (Spec-B).

When the stream_content field of the base layer is '0x05' and the component_type field is '0x80', the base video data may indicate H.264/AVC planostereoscopic frame compatible high definition video, 16:9 aspect ratio, 25 Hz, and/or Side-by-Side.

When the stream_content field of the base layer is '0x05' and the component_type field is '0x81', the base video data may indicate H.264/AVC planostereoscopic frame compatible high definition video, 16:9 aspect ratio, 25 Hz, and Top-and-Bottom.

When the stream_content field of the base layer is '0x05' and the component_type field is '0x82', the base video data may indicate H.264/AVC planostereoscopic frame compatible high definition video, 16:9 aspect ratio, 30 Hz, and Side-by-Side.

When the stream_content field of the base layer is '0x05' and the component_type field is '0x83', the base video data may indicate H.264/AVC stereoscopic frame compatible high definition video, 16:9 aspect ratio, 30 Hz, and Top-and-Bottom.

According to an embodiment of the present invention, when the stream_content field is '0x05', the component descriptor may further include a new component_type field for an enhancement layer. In this case, irrespective of a type of a 3D system, the stream_content field and/or component_type field of the enhancement layer corresponding to the base layer may each have the same value. However, in some embodiments, the stream_content field and/or component_type field of the enhancement layer may have different values.

For example, when the stream_content field of the enhancement layer is '0x05' and the component_type field is '0x85', enhancement video data may indicate H.264/MVC dependent view and plano-stereoscopic service compatible video. A value of the component_type field may not be fixed and may be changed in some embodiments. For example, when the stream_content field of the enhancement layer is '0x05' and the component_type field is '0x84', enhancement video data may indicate H.264/MVC dependent view and plano-stereoscopic service compatible video.

When the stream_content field of the enhancement layer is '0x05' and the component_type field is '0x85', the enhancement video data may indicate H.264/MVC dependent view, plano-stereoscopic service compatible video, 25 Hz, and Side-by-Side. When the stream_content field of the enhancement layer is '0x05' and the component_type field is '0x85', the enhancement video data may indicate H.264/MVC dependent view, plano-stereoscopic service compatible video, 25 Hz, and Top-and-Bottom. When the stream_content field of the enhancement layer is '0x05' and the component_type field is '0x85', the enhancement video data may indicate H.264/MVC dependent view, plano-stereoscopic service compatible video, 30 Hz, and Side-by-Side. When the stream_content field of the enhancement layer is '0x05' and the component_type field is '0x85', the enhancement video data may indicate H.264/MVC dependent view, plano-stereoscopic service compatible video, 30 Hz, and Top-and-Bottom.

A receiving apparatus may identify a type of a video stream based on the stream_content field and/or the component_type field of the component descriptor. For example, when the stream_content field of the base layer is '0x05' and the component_type field is '0x80', this may indicate that format of the base video data is frame-compatible video format. In addition, when the stream_content field of the enhancement layer is '0x05' and the component_type field is '0x85', this may indicate that format of the enhancement video data is frame-compatible video format. In this case, format of the base video data and/or the enhancement video data may be one of side-by-side and/or top-bottom.

When each format of the base video data and/or the enhancement video data is frame-compatible video format, this may indicate the 3D service 2.0 (Spec-B).

FIG. 63 is a diagram illustrating a linkage_type field and/or link_type field of a linkage descriptor according to an embodiment of the present invention.

The signaling information may include the linkage descriptor.

The linkage descriptor may indicate a service to be present when additional information related to a specific entity in an SI system is required. The linkage descriptor may be present in a corresponding table that requires a service for providing additional information. The service replacement service may be determined using the linkage descriptor. In this regard, when a running status of a currently executed service is a 'non running' status, a receiving apparatus may automatically select a corresponding replacement service.

For example, the linkage descriptor may be included in SDT and/or EIT, and the receiving apparatus may recognize a 3D service or an event corresponding to a specific 2D service_id that is currently viewed or a specific 2D event_id that is broadcast in the future based on the linkage descriptor.

The linkage descriptor may include a descriptor_tag field, a descriptor_length field, a transport_stream_id field, an original_network_id field, a service_id field, a linkage_type field, a mobile_hand-over_info( ) field, an event_linkage_info( ) field, an extended_event_linkage_info( ) field, and/or a private_data_byte field. A detailed description of the linkage descriptor will be substituted with the above description.

The mobile_hand-over_info( ) field may identify a service on which a mobile receiving apparatus performs hand-over. When an actual service cannot be received with the service_id any longer, the service may be automatically selected.

The event_linkage_info( ) field may be used to signal two events in the same way. A linked event may be simulcast or time offset. When a target event has higher quality, the event_simulcast filed may be set.

The event_linkage_info( ) field may include a target_event_id field, a target_listed field, an event_simulcast field, and/or a reserved field.

The target_event_id field may include event_id information for identifying a target event corresponding to a source event. The source event may be an event to which the corresponding linkage_descriptor belongs and may be identified by a position of the corresponding linkage_descriptor. The target event may be determined by a corresponding linkage_descriptor and transmitted with a service defined according to a original_network_id, a transport_stream_id and/or a service_id.

The target_listed field may indicate whether a service included in the original_network_id field, the transport_stream_id field, and/or the service_id field is included in the SDT transmitted to a TS.

The event_simulcast field may indicate whether the target event and the source event are simulcast.

The extended_event_linkage_info( ) field may be used to signal at least one event in the same way. The linked event may be simulcast or time offset.

The extended_event_linkage_info( ) field may include a loop_length and/or at least one loop. Each loop may indicate a linked event. Each loop may include a target_event_id field, a target_listed field, an event_simulcast field, a link_type field, a target_id_type field, an original_network_id_flag field, a service_id_flag field, a user_defined_id field, a target_transport_stream_id field, a target_original_network_id field, and/or target_service_id field.

The loop_length field may indicate a size of a byte unit of a subsequent loop.

The target_event_id may include event_id information for identifying a target event corresponding to a source event.

The target_listed field may indicate whether a service defined according to the original_network_id field, the transport_stream_id field, and/or the service_id field is included in SDT transmitted in a corresponding TS.

The event_simulcast field may indicate whether a target event and a source event are simulcast.

The link_type field may indicate a type of a target service.

Referring to the drawing, when the linkage_type field is "0x0E" and the link_type is "0", a linkage type may indicate "extended event linkage" and a type of the target service may indicate Standard Definition Video (SD). When the linkage_type field is "0x0E" and the link_type is "1", the linkage type may indicate "extended event linkage" and the type of the target service may indicate High Definition Video (HD). When the linkage_type field is "0x0E" and the link_type is "2", the linkage type may indicate "extended event linkage" and a type of a target service may indicate frame compatible plano-stereoscopic H.264/AVC. When the linkage_type field is "0x0E" and the link_type is "3", the linkage type may be "extended event linkage" and the type of the target service may indicate a service compatible plano-stereoscopic MVC.

The target_id_type field may identify a target service or target services together with the original_network_id_flag field and/or the service_id_flag field.

When the target_id_type field is "0", this may indicate that the transport_stream_id field is used in order to identify a single target service. When the target_id_type field is "1", this may indicate that the target_transport_stream_id field is used instead of the transport_stream_id field in order to identify a single target service. When the target_id_type field is "2", this may indicate that target services are included in at least one transport stream (wildcarded TSid). When the target_id_type field is "3", target services may be matched by a user defined identifier.

The original_network_id_flag field may indicate whether the target_original_network_id field is used instead of the original_network_id field in order to determine a target service.

The service_id_flag field may indicate whether the target_service_id is used instead of the service_id in order to determine a target service.

When the user_defined_id field is used, the linkage descriptor may be included in a range of the private data specifier descriptor. Accordingly, the receiving apparatus may determine the meaning of the user_defined_id field.

The target_transport_stream_id field may identify an alternative TS including an information service indicate under control of the target_id_type field, the original_network_id_flag field, and/or the service_id_flag field.

The target_original_network_id may include network_id information of an alternative originating delivery system including an information service indicated under control of the target_id_type field, the original_network_id_flag field, and/or the service_id_flag field.

The target_service_id may identify an alternative information service indicated under control of the target_id_type field, the original_network_id_flag field, and/or the service_id_flag field.

A method of signaling 3D service 2.0 (Spec-B) using a linkage descriptor according to an embodiment of the present invention will be described.

First, when the linkage_type field is '0x05', the linkage type may indicate "service replacement service". In a private_data_byte region, a replacement type may be defined as 3D service 2.0 (Spec-B).

Second, when the linkage descriptor is transmitted to an EIT, if the linkage_type is '0x0D', the linkage type may indicate "event linkage". A receiving apparatus may signal corresponding 3D service 2.0 (Spec-B) using the 3D service descriptor or the component descriptor of the target_event_id through the EIT.

Third, when the linkage descriptor is transmitted to an EIT, if the linkage_type is '0x0E', the linkage type may indicate "extended event linkage". When the link_type is '2', a type of a target service may indicate frame compatible plano-stereoscopic H.264/AVC. When the linkage_type field is '0x0E' and the link_type field is '2', this may indicate 3D service 2.0 (Spec-B). Accordingly, the receiving apparatus may signal 3D service 2.0 (Spec-B) based on the linkage_type field and/or the link_type field. The receiving apparatus may signal corresponding 3D service 2.0 (Spec-B) using the 3D service descriptor or component descriptor of the target_event_id through the EIT.

Fourth, a new value of '0x0F' may be determined as the linkage_type field, and a corresponding description may be determined as "3D service 2.0 (Spec-B)".

Fifth, when the linkage_type field is '0x05' and the linkage type may indicate "service replacement service". The receiving apparatus may directly parse SDT, EIT, and so on of a corresponding service with respect to the service_type of a target service to signal 3D service 2.0 (Spec-B). Based on the method, the receiving apparatus may search for a 2D service corresponding 3D.

Figure 64:
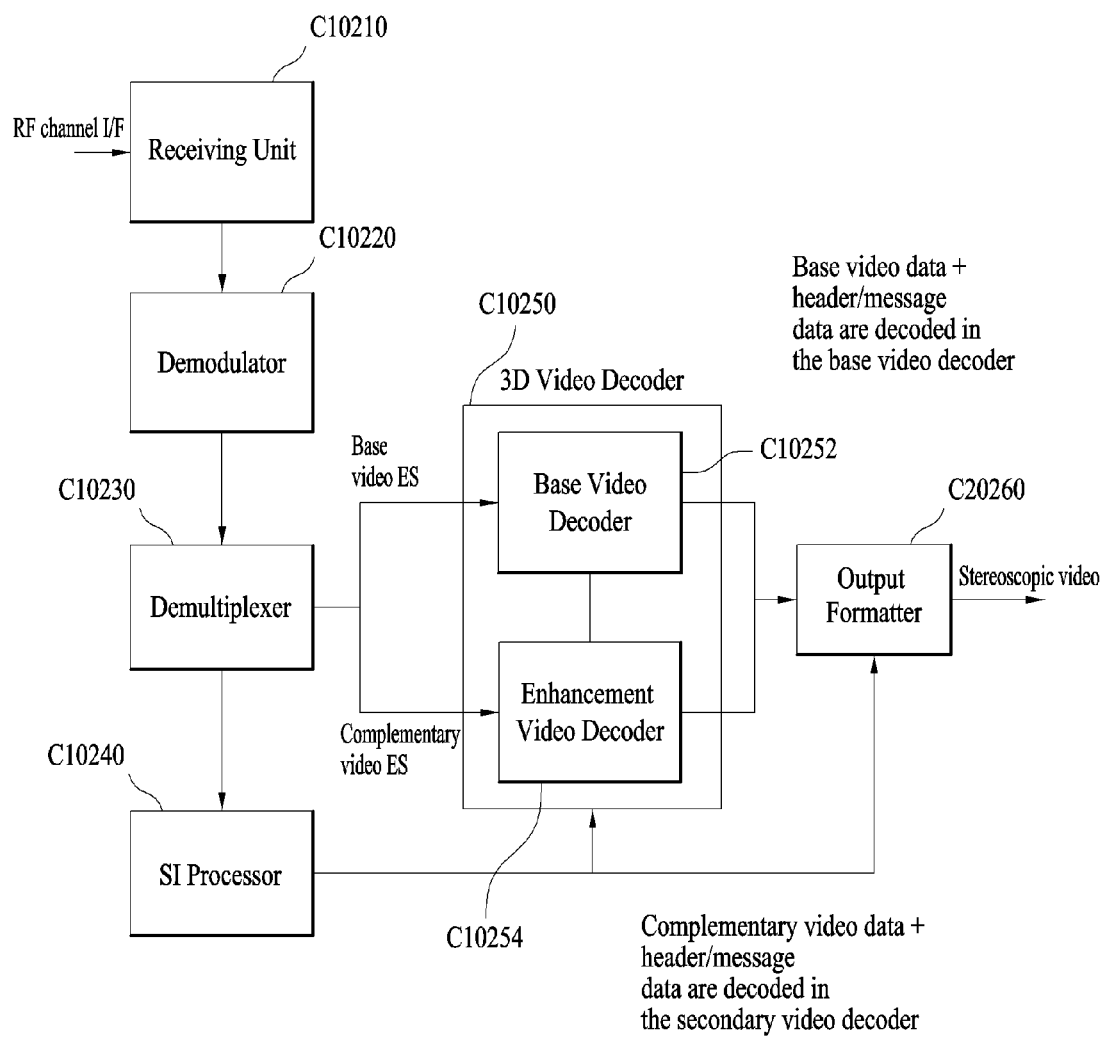
FIG. 64 is a block diagram of a receiving apparatus according to an embodiment of the present invention.

FIG. 64 is a block diagram of a receiving apparatus according to an embodiment of the present invention.

The receiving apparatus according to an embodiment of the present invention may have the aforementioned functions of a 3D image display device and/or a broadcast receiving apparatus.

Referring to the drawing, the receiving apparatus according to an embodiment of the present invention may include a receiving unit C10210, a demodulator C10220, a demultiplexer C10230, a signaling information processor C10240, a 3D video decoder C10250, and/or an output formatter C10260.

The receiving unit C10210 may receive a broadcast signal through a radio frequency (RF) channel.

The demodulator C10220 may demodulate the received broadcast signal.

The demultiplexer C10230 may demultiplex audio data, video data and/or signaling information from the demodulated broadcast signal. To this end, the demultiplexer C10230 may filter a Packet Identifier (PID) to demultiplex the broadcast signal. The demultiplexer C10230 may output the demultiplexed video signal to the 3D video decoder C10250 of a back end and output the signaling information to the signaling information processor C10240. Here, the signaling information may include system information such as the aforementioned PSI, ATSC-PSIP, and/or DVB-SI The signaling information processor C10240 may process the signaling information received from the demultiplexer C10230. Here, the signaling information processor C10240 may include a database (DB) inside or outside thereof for temporally storing the processed signaling information.

The signaling information processor C10240 may process signaling information for signaling the aforementioned 3D service 2.0 (Spec-B). For example, the signaling information may include information for identifying whether a 3D service is served, 3D service information (3D service descriptor) for providing detailed information on base video data, and/or 3D complementary video information for providing detailed information on enhancement video data. The information for identifying whether the 3D service is served may include information for identifying whether content is 2D or 3D and whether content is 3D service 1.0 (Spec-A) or 3D service 2.0 (Spec-B).

The video decoder C10250 may receive and decode the demultiplexed video data. For example, the video decoder C10250 may decode the video data based on the signaling information. The video decoder C10250 may include a base video decoder C10252 for decoding base video data and/or an enhancement video decoder C10254 for decoding enhancement video data.

The output formatter C10260 may format 3D video data items decoded by the 3D video decoder C10250 according to output format and output the formatted data to an outputter (not shown). Here, when the decoded video data is 3D video data, the output formatter C10260 may format the video data according to output format for 3D output. When the decoded video data is 2D video data, the output formatter C10260 may output the video data without separate processing of the video data according to output format for 2D output.

Hereinafter, a method of processing a broadcast signal by a receiving apparatus according to an embodiment of the present invention will be described.

The demultiplexer C10230 may filter and parse SDT and/or EIT sections from the received broadcast signal. Here, as described above, the demultiplexer C10230 may filter the SDT and/or EIT sections via PID filtering.

The signaling information processor C10240 may acquire and store information on a service of a 3D service 1.0 (Spec-A) type in a service loop in the parsed SDT and/or EIT. Then the signaling information processor C10240 may acquire and store PMT information on the 3D service 1.0 (Spec-A).

The signaling information processor C10240 may acquire and store information on a service of a 3D service 2.0 (Spec-B) type in a service loop in the parsed SDT and/or EIT. That is, the signaling information processor C10240 may acquire and store PMT information on the 3D service 2.0 (Spec-B).

The signaling information processor C10240 may acquire PID information on base video stream and/or PID information on enhancement video stream using PMT information on the 3D service 1.0 (Spec-A) and/or PMT information on the 3D service 2.0 (Spec-B).

An operation of the receiving apparatus may be divided into two parts according to a service type.

First, the 2D service will be described as follows.

The receiving apparatus may select service_id for providing 2D video (base view video). A channel having the service_id may be, for example, a legacy channel.

The 3D video decoder C10250 may perform PID filtering and video ES decoding on a video stream corresponding to 2D data. Then the receiving apparatus may output the decoded 2D video through an outputter.

Hereinafter, the 3D service 1.0 (Spec-A) will be described.

The receiving apparatus may select service_id for providing the 3D service 1.0 (Spec-A). The service_type of the service_id may be, for example, a half-resolution 3D service.

The 3D video decoder C10250 may perform PID filtering and video ES decoding on a base video stream of a base layer.

The output formatter C10260 may format 3D video data items according to output format based on the signaling information and/or the 3D service descriptor and output the 3D video data items to an outputter (not shown).

The receiving apparatus may output the half-resolution 3D video on a screen through the outputter.

Lastly, the 3D service 2.0 (Spec-B) will be described below.

The receiving apparatus may select service_id for providing 3D service 2.0 (Spec-B). In this case, the service_type of the service_id may be, for example, full-resolution 3D service.

The 3D video decoder C10250 may perform PID filtering and video ES decoding on a base video stream of a base layer. In addition, the 3D video decoder C10250 may perform PID filtering and video ES decoding on an enhancement video stream of an enhancement layer.

The output formatter C10260 may format 3D video data items according to output format according to the signaling information, the 3D service information, and/or the 3D complementary video information and output the 3D video data items to an outputter (not shown).

The receiving apparatus may output full-resolution 3D video on a screen through the outputter.

The signaling information processor C10240 may parse a linkage descriptor from the signaling information and recognize connection information of 2D service, 3D service 1.0 (Spec-A), and/or 3D service 2.0 (Spec-B) using the parsed linkage descriptor.

Figure 65:
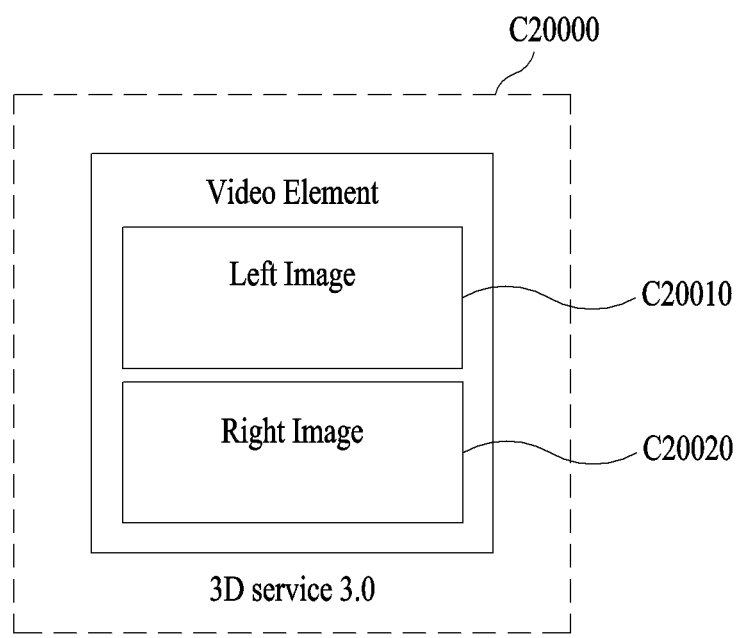
FIG. 65 is a diagram illustrating a concept of 3D service 3.0 according to an embodiment of the present invention.

FIG. 65 is a diagram illustrating a concept of 3D service 3.0 according to an embodiment of the present invention.

The drawing illustrates a concept of 3D service 3.0 C20000 according to an embodiment of the present invention.

The 3D service 3.0 C20000 according to an embodiment of the present invention may be used to embody a function of transmitting and/or receiving a broadcast signal of a video stream encoded using a H.265/High efficiency video coding (HEVC) coding scheme.

The 3D service 3.0 C20000 may refer to service-frame-compatible 3D service (Service frame compatible Plano-stereoscopic 3DTV for HEVC coded services and SFC 3DTV service) of the services (e.g., video stream and video data) encoded using the H.265/High efficiency video coding (HEVC) coding scheme.

The SFC-3D service may be a frame-compatible service (FC-3D service) for selectively transmitting signaling information in a video bitstream. The signaling information may include control information for extracting one image (e.g., left image) from two images (e.g., left image and right image) included in the video stream of the FC-3D service. The signaling information may include control information for upscaling the extracted image in order to simulate reception of the HDTV service. The HDTV receiving apparatus may extract one image (e.g., left image) from two images (e.g., left image and right image) included in the video stream of the FC-3D service based on the signaling information and upscale the extracted image in order to simulate reception of the HDTV service.

The SFC-3D service may be different from the HDTV service in that a video component of a 3D service is a frame compatible video format bitstream.

The video bitstream of the SFC-3D service may comply with requirements of video format of the HDTV service except for signaling information of a video layer.

The 3DTV service (or 3D service) may indicate a DVB service for transmitting 3DTV events. The SFC-3D service may be signal by a service_type field (which will be described below) indicating "HEVC digital television service". The SFC-3D even (or SFC-3DTV event) may be a DVB service event including a video stream of SFC-3D format.

The signaling information may include HD video encoding parameters (e.g., codec/profile, resolution, and/or frame rate) for the SFC-3D service. The signaling information may include information for signaling video format transition for a 3D service (or 3DTV service) switched between a 3DTV mode and a HDTV mode.

Conventional event linkage service information may be extended to allow more convenient event linkage signaling scenarios as well as an increased number of other service types.

Hereinafter, the service-frame-compatible 3DTV service may be referred to as an SFC-3DTV service and/or an SFC-3D service. The SFC-3D service may include the service-compatible 3D service and the frame-compatible 3D service.

The frame-compatible 3D service (FC-3D service) may be a service that spatially multiplex, arrange, and transmit a left image C20010 and a right image C20020 that are included in video content. Accordingly, the 3D receiving apparatus for supporting the frame-compatible 3D service may display a 3D image based on the received left image C20010 and right image C20020. However, a conventional 2D receiving apparatus that does not support the frame-compatible 3D service may output both the received left image C20010 and the right image C20020 on one screen like a general 2D image (an HDTV image).

A service-compatible 3D service (SC-3D service) may be a service that arranges and transmits the left image C20010 and the right image C20020 such that the conventional 2D receiving apparatus (e.g., HDTV) extracts a 2D version of video content from the frame-compatible 3D service.

The SFC-3D service and the conventional HDTV service may be multiplexed in one MPEG-2 Transport Stream and transmitted to the receiving apparatus. A transmission system for the SFC-3D service may be applied to any broadcast and/or delivery channel using a DVB MPEG-2 Transport Stream in order to transmit DVB services.

According to an SFC-3D service according to an embodiment of the present invention, a service provider may also provide a video stream for displaying a 3D image to the conventional 2D receiving apparatus (e.g., HDTV infrastructure). The conventional 2D receiving apparatus may receive the video stream encoded using a H.265/High efficiency video coding (HEVC) coding scheme and extract one from the left image C20010 and the right image C20020 included in the received video stream. Then, the conventional 2D receiving apparatus may upscale the extracted one image (e.g., the left image C20010) and display a 2D image (e.g., H DTV).

The 3D receiving apparatus may receive the video stream encoded using the H.265/High efficiency video coding (HEVC) coding scheme and determine whether the received video stream is output as a 2D image or a 3D image. When the video stream is output as a 2D image, one of the left image C20010 and the right image C20020 included in the received video stream may be extracted, as described above. Then the 3D receiving apparatus may upscale the extracted one image and display a 2D image (e.g., HDTV). When the video stream is output as a 3D image, the left image C20010 and the right image C20020 included in the received video stream may be formatted and a 3D image may be displayed.

The 3D receiving apparatus may receive the 2D video stream and the 3D video stream that are encoded using a H.265/High efficiency video coding (HEVC) coding scheme and may selectively switch and output a 2D image and a 3D image of video content based on relationship information (for example, the relationship information may be included in signaling information) of the video streams.

In order to provide the aforementioned SFC-3D service, a SFC-3D service according to an embodiment of the present invention may provide signaling information. Hereinafter, signaling information for signaling the SFC-3D service will be described in detail.

Figure 66:
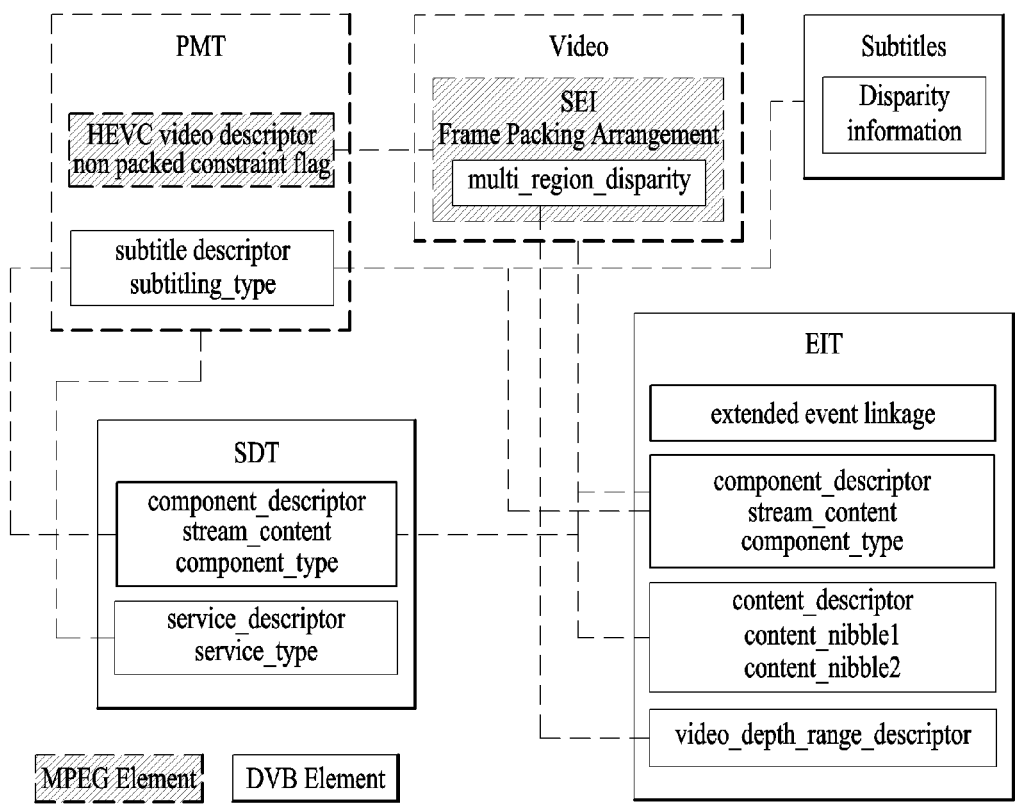
FIG. 66 is a diagram illustrating a method of signaling an SFC-3DTV service according to an embodiment of the present invention.

FIG. 66 is a diagram illustrating a method of signaling an SFC-3DTV service according to an embodiment of the present invention.

The drawing illustrates various signaling information items for transmission of an SFC-3D service in a DVB transmission system.

The signaling information for signaling the SFC-3D service may indicate all control information items for transmitting, receiving, and/or processing the video stream encoded using a H.265/High efficiency video coding (HEVC) coding scheme. The signaling information may indicate all of the control information items for transmitting, receiving, and/or processing the video stream encoded using a H.265/High efficiency video coding (HEVC) coding scheme.

For example, the signaling information may include at least one of a Frame Packing Arrangement SEI message, Default Display Window (DDW) information, AFD/bar data, HEVC_video_descriptor, content_descriptor, Disparity Signaling Segment (DSS), information on DVB subtitle, subtitling descriptor, disparity information, video depth range descriptor, multi-region disparity, service descriptor, component descriptor, and/or linkage descriptor.

The signaling information for signaling the SFC-3D service (3D service 3.0) may be included in at least one of a video stream, a transmission layer, and/or subtitles.

When the signaling information is included in the video stream, the signaling information may be included in the video ES. When the video data is encoded using an MPEG-2 or MPEG-4 video coding scheme, the signaling information may be included in user_data( ) 13010 of the picture extension and user data. When the video data is encoded using an H.264/AVC or H.265/HEVC video coding scheme, the signaling information may be included in a Supplemental Enhancement Information (SEI) message. Hereinafter, the present invention will be described in terms of a case in which video data is encoded using an H.265/HEVC video coding scheme.

When signaling information is included in a transmission layer, the signaling information ÷ signaling information may be included in PSI, ATSC-PSIP, and/or DVB-SI. A detailed description of the PSI, the ATSC-PSIP, and/or the DVB-SI is the same as the above description and, thus, will be substituted with the above description. Hereinafter, the present invention will be described in terms of a case in which signaling data is included in PSI and/or DVB-SI.

When the signaling information is included in subtitles, the signaling information may include disparity information and signal subtitles together with other information items included in PSI and/or DVB-SI.

First, the signaling information may include a Frame Packing Arrangement SEI message.

A coded video stream of the SFC-3D service may include a Frame Packing Arrangement SEI message in order to signal format of a video component of an FC-3D service. When video is format of the SFC-3D service, the coded video stream of the SFC-3D service may include the Frame Packing Arrangement SEI message with respect to all video frames.

The Frame Packing Arrangement SEI message may include Frame_packing_arrangement_cancel_flag field for identifying whether a frame compatible video format is used. In addition, the Frame Packing Arrangement SEI message may include information for signaling format and/or other features of the 3D video stream.

For example, the Frame Packing Arrangement SEI message may include fields included in the aforementioned 3D service descriptor. The 3D service descriptor may be a descriptor including signaling information on video data. A detailed description of the 3D service descriptor is the same as the above description and, thus, will be substituted with the above description.

The Frame_packing_arrangement_cancel_flag field may indicate whether the video stream is 3D video format or HDTV video format.

For example, when a value of the Frame_packing_arrangement_cancel_flag field is '0', this may indicate that frame compatible video format is used. In addition, other fields of the Frame Packing Arrangement SEI message may signal format and/or other feature of the 3D video stream.

When a value of the Frame_packing_arrangement_cancel_flag field is '1', this may indicate that non-3D video format is used. For example, when the value of the Frame_packing_arrangement_cancel_flag field is '1', this may indicate that HDTV video format is used.

SFC-3D services for switching 3DTV and non-3DTV (e.g., HDTV) may also transmit the Frame Packing Arrangement SEI messages during transmission of HDTV format of a video stream.

Accordingly, the receiving apparatus may signal the SFC-3D service based on the Frame_packing_arrangement_cancel_flag field of the Frame Packing Arrangement SEI message. In addition, the receiving apparatus may rearrange samples based on the Frame Packing Arrangement SEI message and process samples of composition frames (left image and/or right image) so as to be appropriate to be displayed.

Hereinafter, the Frame Packing Arrangement SEI message will be described in detail.

According to an embodiment of the present invention, the Frame Packing Arrangement SEI message may include a frame_packing_arrangement_id field, a frame_packing_arrangement_cancel_flag field, a frame_packing_arrangement_type field, a quincunx_sampling_flag field, a content_interpretation_type field, a spatial_flipping_flag field, frame0_flipped_flag field, a field_views_flag field, a current_frame_is_frame0_flag field, a frame0_self_contained_flag field, a frame1_self_contained_flag field, a frame0_grid_position_x field, a frame0_grid_position_y field, a frame1_grid_position_x field, a frame1_grid_position_y field, a frame_packing_arrangement_reserved_byte field, a frame_packing_arrangement_repetition_period field, and/or a frame_packing_arrangement_extension_flag field.

The frame_packing_arrangement_id field may include information for identifying the frame packing arrangement SEI message.

The frame_packing_arrangement_cancel_flag field may indicate whether persistence of a previous frame packing arrangement SEI message is removed from an output order. For example, when a value of the frame_packing_arrangement_cancel_flag field is "0", the frame packing arrangement information may be subsequent to the previous frame packing arrangement information.

The frame_packing_arrangement_type field may indicate a type of packing arrangement. For example, the type of the packing arrangement may include checker board format (frame_packing_arrangement_type=0), column interlaced format (frame_packing_arrangement_type=1), row interlaced format (frame_packing_arrangement_type=2), side-by-side format (frame_packing_arrangement_type=3), top-bottom format (frame_packing_arrangement_type=4), frame sequential format (frame_packing_arrangement_type=5), and 2D format (frame_packing_arrangement_type=6).

The quincunx_sampling_flag field may indicate whether a color component plane of composition frames (left image and/or right image) is quincunx-sampled.

The content_interpretation_type field may indicate intended interpretation of composition frames (left image and/or right image). For example, when a value of the content_interpretation_type field is "0", this may indicate that there is no relationship between the composition frames. When a value of the content_interpretation_type field is "1", two composition frames indicate a left image and a right image of a stereo view scene, respectively, "frame 0" may indicate a left image, and "frame 1" may indicate a right image. When a value of the content_interpretation_type field is "2", the two composition frames may indicate the left image and the right image of the stereo view scene, respectively, "frame 0" may indicate a right image, and "frame 1" may indicate a left image.

The spatial_flipping_flag field may indicate whether one of a left image and a right image is flipped compared with an originally intended direction. For example, in the case of side-by-side format, when a value of the spatial_flipping_flag field is "1", this may indicate that one of the left image and the right image is horizontally flipped. In the case of top-bottom format, when the value of the spatial_flipping_flag field is "1", this may indicate that one of the left image and the right image is vertically flipped.

When the value of the spatial_flipping_flag field is "1", the frame0_flipped_flag field may indicate a frame that is flipped among the two composition frames (left image and right image).

The field_views_flag field may indicate whether all pictures in a currently coded video sequence are coded as complementary field pairs.

In the case of frame sequential format (frame_packing_arrangement_type=5), the current_frame_is_frame0_flag field may indicate that a currently decoded frame is a left image or a right image. For example, when the value of the current_frame_is_frame0_flag field is "1", a currently decoded frame may indicate a left image and a subsequently decoded frame may indicate a right image.

The frame0_self_contained_flag field may indicate whether inter prediction operations that refer to a sample of a second composition frame (e.g., a right image) is performed in a decoding process of a sample of a first composition frame (e.g., a left image) of a coded video sequence.

The frame1_self_contained_flag field may indicate whether inter prediction operations that refer to the sample of the first composition frame (e.g., right image) in a decoding process of the sample of the second composition frame (e.g., right image) of a coded video sequence.

The frame0_grid_position_x field may indicate an x component of a coordinate pair (x,y) of the first composition frame (e.g., left image).

The frame0_grid_position_y field may indicate a y component of a coordinate pair (x,y) of the first composition frame (e.g., left image).

The frame1_grid_position_x field may indicate an x component of a coordinate pair (x,y) of the second composition frame (e.g., right image).

The frame1_grid_position_y field may indicate a component y of a coordinate pair (x,y) of the second composition frame (e.g., right image).

The frame_packing_arrangement_reserved_byte field may be a byte reserved for future use.

The frame_packing_arrangement_repetition_period field may indicate persistence of the frame packing arrangement SEI message. The frame_packing_arrangement_repetition_period field may indicate a frame order count interval. Other frame packing arrangement SEI messages having the same frame_packing_arrangement_id value in the frame order count interval or a last portion of a coded video sequence may be indicated in a bitstream.

The frame_packing_arrangement_extension_flag field may indicate whether additional data is present in the frame packing arrangement SEI message.

In addition, the signaling information may include Default Display Window (DDW) information.

The DDW information may include information for extracting a 2D image from a 3D image. For example, the DDW information may include for extracting one of a left image and a right image from the 3D image. In addition, the DDW may include a coordinate range corresponding to a left image or a right image in the 3D image. The DDW may be included in Video Usability Information (VUI) of SPS.

The signaling information may include AFD/bar data.

The AFD/bar data may include information for extracting a valid region from an entire encoded video region. For example, when a transmitting apparatus transmits video content at a first image ratio (e.g., 21:9) and a receiving apparatus processes video content at a second image ratio (e.g., 16:9), the AFD/bar data may include information for extracting the second image ratio. The AFD/bar data may be included in a video ES.

In addition, the signaling information may include the HEVC_video_descriptor.

The HEVC_video_descriptor may indicate information for identifying coding parameters related to an HEVC video stream.

The HEVC_video_descriptor may include a descriptor_tag field, a descriptor_length field, a profile_idc field, a reserved_zero_8 bits field, a level_idc field, a temporal_layer_subset_flag field, a HEVC_still_present_flag field, a HEVC_24 hr_picture_present_flag field, a temporal_id_min field, and/or a temporal_id_max field.

The descriptor_tag field may include information for identifying the HEVC_video_descriptor.

The descriptor_length field may include information indicating a size of the HEVC_video_descriptor.

The profile_idc field may indicate a profile on which the bitstream is based. For example, the profile may include a Main profile, a Main 10 profile, and/or a Main Still Picture profile, which are defined in HEVC spec.

The reserved_zero_8 bits field may include 8-bit information immediately subsequent to the profile_idc field in the sequence_parameter_set according to HEVC spec.

The level_idc field may indicate a level of a bitstream defined in the HEVC spec. In each profile, a level may be determined according to a size of an image. The level may determine a parameter according to a size of a corresponding image. The level_idc field may include six levels and an intermediate level thereof.

The temporal_layer_subset_flag field may indicate whether a syntax element for describing a subset of temporal layers is present in the HEVC_video_descriptor.

The HEVC_still_present_flag field may indicate whether the HEVC video stream includes AVC still pictures. The AVC still pictures may include an AVC Access Unit including the IDR picture. The IDR picture may be subsequent to a Sequence Parameter Set (SPS) NAL unit and/or a Picture Parameter Set (PPS) NAL unit for transmitting sufficient information to accurately decode the IDR pictures.

The HEVC_24 hr_picture_present_flag field may indicate whether a related HEVC video stream includes HEVC 24-hour pictures. The HEVC 24-hour picture may refer to an HEVC Access Unit including future presentation time of 24 hours or more.

The temporal_id_min field may indicate a minimum value of the temporal_id field in a header of the NAL unit about the related video ES.

The temporal_id_max field may indicate a maximum value of the temporal_id field in a header of the NAL unit about the related video ES.

The HEVC_video_descriptor may further include the non_packed_constraint_flag field.

The non_packed_constraint_flag field may indicate whether the Frame Packing Arrangement SEI message is present in the video stream. The non_packed_constraint_flag field may indicate whether a video stream is 3DTV video format or HDTV video format.

For example, during transmission of 3D video format, the non_packed_constraint_flag field may be set to '0' in order to signal that the Frame Packing Arrangement SEI message is present in a coded video sequence. In addition, during transmission of HDTV video format, the non_packed_constraint_flag field may be set to '0' in order to signal that the Frame Packing Arrangement SEI message is present in a coded video sequence.

When only HDTV video format is used, when format transition is not supposed to occur in the 3D video format, and/or when format transition does not occur in the 3D video format, the non_packed_constraint_flag field may be set to '1' in order to signal that the Frame Packing Arrangement SEI message is not present in a coded video sequence.

The receiving apparatus may identify whether the frame packing arrangement SEI message is present in the bitstream based on the non_packed_constraint_flag field.

In addition, the signaling information may include content_descriptor.

The content_descriptor may provide classification of an event. The content_descriptor may be included in EIT and/or SIT.

The content_descriptor may include a descriptor_tag field, a descriptor_length field, and/or at least one for loop. Each for loop may include classification information of an event. Each for loop may include a content_nibble_level_1 field, a content_nibble_level_2 field, and/or a user_byte field.

The descriptor_tag field may include information for identifying the content_descriptor.

The descriptor_length field may indicate a size a byte unit of a subsequent for loop.

The content_nibble_level_1 field may have 4 bits and indicate a first level of a content identifier.

The content_nibble_level_2 field may have 4 bit and indicate a second level of a content identifier. The second level may be a detailed field of the first level.

The user_byte field may have 8 bits and may be defined by the transmitting apparatus.

The content_nibble_level_1 field may have a value of "0x0" to "0xF". When the content_nibble_level_1 field is "0x0", the first level of classification information may indicate "undefined content". When the content_nibble_level_1 field is "0x1", the first level of classification information may indicate "Movie/Drama". When the content_nibble_level_1 field is "0x2", the first level of classification information may indicate "News/Current affairs". When the content_nibble_level_1 field가 "0x3", the first level of classification information may indicate "Show/Game show". When the content of the content_nibble_level_1 field is "0x4", the first level of classification information may indicate "Sports". When the content_nibble_level_1 field is "0x5", the first level of classification information may indicate "Children's/Youth programs". When the content_nibble_level_1 field is "0x6", the first level of classification information may indicate "Music/Ballet/Dance". When the content_nibble_level_1 field is "0x7", the first level of classification information may indicate "Arts/Culture (without music)". When the content_nibble_level_1 field is "0x8", the first level of classification information may indicate "Social/Political issues/Economics". When the content_nibble_level_1 field is "0x9", the first level of classification information may indicate "Education/Science/Factual topics". When the content_nibble_level_1 field is "0xA", the first level of classification information may indicate "Leisure hobbies". When the content_nibble_level_1 field is "0xB", the first level of classification information may indicate "Special characteristics". When the content_nibble_level_1 field is "0xC" to "0xE", the first level of classification information may indicate "Reserved for future use". In addition, when the content_nibble_level_1 field is "0xF", the first level of classification information may indicate "User defined".

The content_nibble_level_2 field may have a value of "0x0" to "0xF". The content_nibble_level_2 field may have a specific value with respect to each content_nibble_level_1 field and indicate more detailed classification information with respect to the first level of classification information.

For example, when the content_nibble_level_1 field is "0xB", the first level of classification information may indicate "Special characteristics", and when the content_nibble_level_2 field is "0x4", the second level of content classification information may indicate "plano-stereoscopic 3DTV format".

Accordingly, the receiving apparatus of the component descriptor may identify classification information of a video stream based on the content_nibble_level_1 field and/or the content_nibble_level_2 field. In addition, the receiving apparatus may highlight an event for supporting a 3D service in an EPG based on the component descriptor.

Hereinafter, signaling information related to a subtitle will be described.

A receiving apparatus may display additional content such as subtitles and/or graphics so as not to be hidden by a 3D image. The subtitle may be a main element of a 3D service as well as SDTV and/or HDTV. It may be very important to accurately position subtitles together with on-screen graphics on the 3D video content under a depth and timing condition.

First, signaling information may include Disparity Signaling Segment (DSS).

The DSS may include definition of sub regions in a region. The Disparity Signaling Segment (DSS) may be included in a subtitle.

In changed depths in a page and/or a region, different disparity values for arrangement of subtitles may be transmitted to respective sub regions. The disparity information may be transmitted together with sub-pixel accuracy information. The sub-pixel accuracy information may include information for optimally arranging subtitles in a 3D scene.

The DSS may support subtitling of 3D content based on disparity values of a region or sub region.

Second, the signaling information may include information on a DVB subtitle.

When a value of the stream_content field in the component descriptor is "0x03", the signaling information may include information on a DVB subtitle according to a value of the component_type field.

For example, when a value of the stream_content field is "0x03" and a value of the component_type field is "0x14", this may indicate "DVB subtitles (normal) for display on a high definition monitor". When a value of the stream_content field is "0x03" and a value of the component_type field is "0x15", this may indicate "DVB subtitles (normal) with plano-stereoscopic disparity for display on a high definition monitor".

Third, the signaling information may include a subtitling descriptor.

The subtitling descriptor may include information on a DVB subtitle. The subtitling descriptor may be included in PMT. The subtitling descriptor may be determine as stream_type=0x06 of a packet for transmitting a DVB subtitle in a PMT table.

The subtitling descriptor may include an ISO_639_language_code field, a subtitling_type field, a composition_page_id field, and/or an ancillary_page_id field.

The ISO_639 language_code field may indicate a language code represented by a 3-character text.

The subtitling_type field may include information on content of a subtitle and display to be applied. When a value of the stream_content field in the component_descriptor is "0x03", the subtitling_type field may indicate a code defined for each component_type field.

The composition_page_id field may include information for identifying a composition page.

The ancillary_page_id field may include information for identifying an ancillary page.

Fourth, the signaling information may include disparity information.

The subtitles may include disparity information. The disparity information may indicate how close an object is to a screen or how far the object is from the screen. The disparity information may be included in a video depth range descriptor and/or a multi-region descriptor.

Fifth, the signaling information may include a video depth range descriptor.

In order to optimize arrangement of graphics (e.g., text and/or icon) displayed at an upper end of 3D video, the video depth range descriptor may indicate an intended depth range of the 3D video. The video depth range descriptor may provide disparity information at a service and/or event level. The disparity information may have a static value during a period of a corresponding service and/or corresponding event.

The video depth range descriptor may include a range_type field, a range_length field, a production_disparity_hint_info( ) field, and/or a range_selector_byte field.

The range_type field may indicate a type of a depth range. When a value of the range_type field is '0x00', this may indicate that a type of a depth range is "production disparity hint", and when the value of the range_type field is '0x01', this may indicate that a type of the depth range is "multi-region disparity SEI present". When a value of the range_type field is '0x01', this may indicate that multi-region disparity SEI data is present in a video ES. In this case, the value of the range_length field may be '0'.

Sixth, the signaling information may include multi-region disparity.

The multi-region disparity may provide disparity information at the video level. The multi-region disparity may have dynamic values for different spatial regions of all frames and/or each frame of 3D video.

The receiving apparatus may transmit depth information in the form of a disparity value in order to overlay additional information (graphic, menu, etc.) based on the multi-region disparity. As a result, the receiving apparatus may avoid depth violation between 3D video (plano-stereoscopic video) and graphics.

In each frame, one maximum disparity value may be transmitted. Regions may be defined according to a set of predefined image partitioning patterns. With respect to regions of respective frames, one minimum disparity value may be accurately transmitted.

The multi-region disparity may include a multi_region_disparity_length field, a max_disparity_in_picture field, and/or a min_disparity_in_region_i field.

The multi_region_disparity_length field may have 8 bits and may define the number of bytes subsequent to a byte defined as a value of the multi_region_disparity_length field in the multi_region_disparity( ).

The multi_region_disparity_length field may signal a type of a region pattern. The multi_region_disparity_length field may include a limited set of values corresponding to predefined image partitioning patterns. Each image partitioning pattern may define several regions of an image.

For example, when a value of the multi_region_disparity_length field is '0', this may indicate "no disparity information is to be delivered". When the value of the multi_region_disparity_length field is '2', this may indicate "one minimum_disparity_in_region is coded as representing the minimum value in overall picture". When the value of the multi_region_disparity_length field is '3', this may indicate "two vertical minimum_disparity_in_regions are coded". When the value of the multi_region_disparity_length field is '4', this may indicate "three vertical minimum_disparity_in_regions are coded". When the value of the multi_region_disparity_length field is '5', this may indicate "four minimum_disparity_in_regions are coded". When the value of the multi_region_disparity_length field is '10', this may indicate "nine minimum_disparity_in_regions are coded". When the value of the multi_region_disparity_length field is '17', this may indicate "sixteen minimum_disparity_in_regions are coded".

The max_disparity_in_picture field may define a maximum disparity value in a picture.

The min_disparity_in_region_i field may define a minimum disparity value in an $i^{th}$ region.

FIG. 67 is a diagram illustrating a service_type field of a service descriptor according to an embodiment of the present invention.

The signaling information may include the service descriptor.

The service descriptor may be a descriptor for describing a service type, a service provider, and/or a service name. The service descriptor may be included in SDT and/or Selection Information Table (SIT).

The service descriptor may include a descriptor_tag field, a descriptor_length field, a service_type field, a service_provider_name_length field, a char field indicating a name of a service provider, service_name_length field, and/or a char field indicating a service name. A detailed description of the service descriptor will be substituted with the above description.

The service_type field may describe a service type. A detailed description of allocation of the service_type for a service will be substituted with the above description.

When a value of the service_type field is "0x1F", a service type (or service type information) may indicate "HEVC digital television service" and/or "H.265/HEVC frame compatible plano-stereoscopic HD digital television service". When the value of the service_type field is "0x20", a service type may indicate "HEVC digital television service" and/or "H.265/HEVC frame compatible plano-stereoscopic HD NVOD time-shifted service". When the value of the service_type field is "0x21", a service type may indicate "HEVC digital television service" and/or "H.265/HEVC frame compatible plano-stereoscopic HD NVOD reference service".

The service_type field may signal whether an HEVC video service is present in a broadcast signal (e.g., MPEG-TS). For example, when a value of the service_type field is one of "0x1F", "0x20", and/or "0x21", a service type may indicate "HEVC digital television service" and/or "H.265/HEVC frame compatible HD service".

Here, the service descriptor may include a value of the service_type field (a value of the service_type field is "0x1F") used in a conventional 2D service (2D HEVC).

The conventional 2D receiving apparatus may process video data based on the value of the service_type field used in the conventional 2D service and display a 2D image.

According to an embodiment of the present invention, the receiving apparatus that supports the SFC-3D service may process video data based on a newly defined service_type field and display a 2D image and/or a 3D image.

The receiving apparatus may signal whether an HEVC video service is present in a broadcast signal (e.g., MPEG-TS) based on the service_type field. For example, when a value of the service_type field of a video stream is "0x1F", the receiving apparatus may determine that a service type is "HEVC digital television service" and/or "H.265/HEVC frame compatible HD service".

When a value of the service_type field of the video stream is one of "0x20" and/or "0x21", the receiving apparatus may determine that a corresponding video service is an HEVC video service. For example, when a value of the service_type field is one of "0x20" and/or "0x21", the receiving apparatus may determine that a service type is "HEVC digital television service" and/or "H.265/HEVC frame compatible HD service".

FIG. 68 is a diagram illustrating a service_type field of a service descriptor according to an embodiment of the present invention.

The signaling information may include a service descriptor. A detailed description of the service descriptor is the same as the above description and, thus, will be substituted with the above description.

Referring to the drawing, a service type may be subdivided according to a value of bitdepth. The Bitdepth may indicate a unit of a color number (or a degree of brightness in the case of a gray scale image) for reproducing color (or shadow of gray). For example, the Bitdepth may include an 8-bit Bitdepth and/or a 10-bit Bitdepth.

When a value of the service_type field is "0x1F", a service type may indicate "HEVC digital television service" and/or "H.265/HEVC frame compatible plano-stereoscopic 8 bit bitdepth HD digital television service". When the value of the service_type field is "0x20", a service type may indicate "HEVC digital television service" and/or "H.265/HEVC frame compatible plano-stereoscopic 8 bit bitdepth HD NVOD time-shifted service". When the value of the service_type field is "0x21", a service type may indicate "HEVC digital television service" and/or "H.265/HEVC frame compatible plano-stereoscopic 8 bit bitdepth HD NVOD reference service".

When the value of the service_type field is "0x22", a service type may indicate "HEVC digital television service" and/or "H.265/HEVC frame compatible plano-stereoscopic 10 bit bitdepth HD digital television service". When the value of the service_type field "HEVC digital television service" and/or "0x23", a service type may indicate "H.265/HEVC frame compatible plano-stereoscopic 10 bit bitdepth HD NVOD time-shifted service". When a value of the service_type field is "0x24", a service type may indicate "HEVC digital television service" and/or "H.265/HEVC frame compatible plano-stereoscopic 10 bit bitdepth HD NVOD reference service".

The service_type field may signal whether an HEVC video service is present in a broadcast signal (e.g., MPEG-TS). For example, when the value of the service_type field is one of "0x1F", "0x20", "0x21", "0x22", "0x23", and/or "0x24", a service type may indicate "HEVC digital television service" and/or "H.265/HEVC frame compatible HD service".

The receiving apparatus may signal whether an HEVC video service is present in a broadcast signal (e.g., MPEG-TS) based on the service_type field. For example, when the value of the service_type field of a video stream is "0x1F", the receiving apparatus may determine that a service type is "HEVC digital television service" and/or "H.265/HEVC frame compatible HD service".

The receiving apparatus may signal whether a HEVC video service is present in a broadcast signal (e.g., MPEG-TS) based on the service_type field. For example, when the value of the service_type field of the video stream is one of "0x20", "0x21", "0x22", "0x23", and/or "0x24", the receiving apparatus may determine that a corresponding video service is "HEVC digital television service" and/or "H.265/HEVC frame compatible HD service".

FIG. 69 is a diagram illustrating a stream_content field and/or a component_type field of a component descriptor according to an embodiment of the present invention.

The signaling information may include the component descriptor.

The component descriptor may be used to identify a component stream and to provide text description of an elementary stream. The component descriptor may be included in SDT and/or an EIT.

The component descriptor may include a descriptor_tag field, a descriptor_length field, a reserved_future_use field, a stream_content field (or first stream content information), a component_type field (or component type information), a component_tag field, an ISO_639_language_code field, and/or a text_char field. A detailed description of the component descriptor will be substituted with the above description.

The component descriptor may include a value of the stream_content field and/or a value of the component_type field that are used in the conventional 2D service (2D HEVC). The component descriptor may include a value of a new stream_content field and/or a value of component_type field that are applicable to the SFC-3D service.

Referring to the drawing, the SFC-3D service according to an embodiment of the present invention may identify component type information (e.g., bitstream, component stream, and/or type of video stream) based on one component descriptor. The component type information may include at least one parameter.

For example, the parameter may include bitstream information, codec information (encoding type information) of a video stream, profile information, resolution information, screen ratio information, frame rate information, image format information, and/or Bitdepth information.

The bitstream information may be information on a type of the bitstream. For example, the bitstream information may include a video stream, an audio stream, and/or a subtitle stream. The codec information may be information on codec for encoding the bitstream. For example, the codec information may include H.265/HEVC. The resolution information may be resolution information on a bitstream. For example, the resolution information may include High Definition and/or Standard Definition. Image ratio information may be ratio information of a horizontal size and a vertical size of a frame when video data is displayed. For example, the image ratio information may include aspect ratio of 16:9. The resolution information may information on the number of video frame to be output per second. For example, the resolution information may include 25 Hz and/or 30 Hz. Image format information may be information on arrangement of a left image and a right image included in a video stream. For example, image format information may include side-by-side and/or top-and-bottom. Bitdepth information may indicate a unit of a color number (or a degree of brightness in the case of a gray scale image) for reproducing color (or shadow of gray). For example, the Bitdepth may include an 8-bit Bitdepth and/or a 10-bit Bitdepth.

When a value of the stream_content field is '0x09' and a value of the component_type is '0x80', video data may indicate "H.265/HEVC plano-stereoscopic frame compatible high definition video, 16:9 aspect ratio, 25 Hz, Side-by-Side".

Here, when a value of the stream_content field is '0x09', this may indicate H.265/HEVC video. In addition, '0x09' as a value of the stream_content field and/or '0x80' as a value of the component_type field are not fixed and, thus, may be changed.

The "H.265/HEVC plano-stereoscopic frame compatible high definition video" may be a bitstream of a video stream and the video stream may be encoded using an H.265/HEVC video coding scheme and may indicate High Definition video for supporting a frame-compatible 3D service.

The "16:9 aspect ratio" may indicate image ratio information of a video stream, the "25 Hz" may indicate frame rate information of a video stream frame rate information, and the "Side-by-Side" may indicate image format information of a left image and/or a right image included in a video stream. Hereinafter, the same representation refers to the same meaning and will be schematically described.

When a value of the stream_content field is '0x09' and a value of the component_type field is '0x81', video data may indicate "H.265/HEVC plano-stereoscopic frame compatible high definition video, 16:9 aspect ratio, 25 Hz, Top-and-Bottom".

When a value of the stream_content field is '0x09' and a value of the component_type field is '0x82', video data may indicate "H.265/HEVC plano-stereoscopic frame compatible high definition video, 16:9 aspect ratio, 30 Hz, Side-by-Side".

When a value of the stream_content field is '0x09' and a value of the component_type field is '0x83', video data may indicate "H.265/HEVC plano-stereoscopic frame compatible high definition video, 16:9 aspect ratio, 30 Hz, Top-and-Bottom".

A conventional 2D receiving apparatus may process video data and display a 2D image based on a value of the stream_content field used in a conventional 2D service and/or a value of the component_type field.

According to an embodiment of the present invention, the receiving apparatus for supporting the SFC-3D service may process video data and display a 2D image and/or a 3D image based on a newly defined value of the stream_content field and/or a value of the component_type field.

FIG. 70 is a diagram illustrating a stream_content field and/or a component_type field of a component descriptor according to an embodiment of the present invention.

The signaling information may include the component descriptor. The component descriptor may identify a type of a component stream. A detailed description of the component descriptor is the same as the above description and, thus, will be substituted with the above description.

Referring to the drawing, a component type may be subdivided according to a value of bitdepth. The Bitdepth may indicate a unit of a color number (or a degree of brightness in the case of a gray scale image) for reproducing color (or shadow of gray). For example, the Bitdepth may include an 8-bit Bitdepth and/or a 10-bit Bitdepth.

When a value of the stream_content field is '0x09' and a value of the component_type field is '0x80', video data may indicate "H.265/HEVC plano-stereoscopic frame compatible high definition video, 16:9 aspect ratio, 25 Hz, Side-by-Side, 8 bit bitdepth". When a value of the stream_content field is '0x09' and a value of the component_type field is '0x81', video data may indicate "H.265/HEVC plano-stereoscopic frame compatible high definition video, 16:9 aspect ratio, 25 Hz, Top-and-Bottom, 8 bit bitdepth". When a value of the stream_content field is '0x09' and a value of the component_type field is '0x82', video data may indicate "H.265/HEVC plano-stereoscopic frame compatible high definition video, 16:9 aspect ratio, 30 Hz, Side-by-Side, 8 bit bitdepth". When a value of the stream_content field is '0x09' and a value of the component_type field is '0x83', video data may indicate "H.265/HEVC plano-stereoscopic frame compatible high definition video, 16:9 aspect ratio, 30 Hz, Top-and-Bottom, 8 bit bitdepth".

When a value of the stream_content field is '0x09' and a value of the component_type field is '0x84', video data may indicate "H.265/HEVC plano-stereoscopic frame compatible high definition video, 16:9 aspect ratio, 25 Hz, Side-by-Side, 10 bit bitdepth". When a value of the stream_content field is '0x09' and a value of the component_type field is '0x85', video data may indicate "H.265/HEVC plano-stereoscopic frame compatible high definition video, 16:9 aspect ratio, 25 Hz, Top-and-Bottom, 10 bit bitdepth". When a value of the stream_content field is '0x09' and a value of the component_type field is '0x86', video data may indicate "H.265/HEVC plano-stereoscopic frame compatible high definition video, 16:9 aspect ratio, 30 Hz, Side-by-Side, 10 bit bitdepth". When a value of the stream_content field is '0x09' and a value of the component_type field is '0x87', video data may indicate "H.265/HEVC plano-stereoscopic frame compatible high definition video, 16:9 aspect ratio, 30 Hz, Top-and-Bottom, 10 bit bitdepth".

The receiving apparatus may identify a type of a component stream (e.g., video stream) based on a component descriptor. For example, the receiving apparatus may identify that a video stream is high definition video encoded using a H.265/HEVC video coding scheme based on the component descriptor. The receiving apparatus may identify that image format information of a left image and a right image included in a video stream is "top and bottom" based on the component descriptor.

FIG. 71 is a diagram illustrating a stream_content field and/or a component_type field of a component descriptor according to an embodiment of the present invention.

The signaling information may include a plurality of component descriptors.

The component descriptor may be used to identify a type of a component stream (e.g., video stream) and to provide text description of an elementary stream. The component descriptor may be included in SDT and/or EIT.

The component descriptor may include a descriptor_tag field, a descriptor_length field, a stream_content_ext field, a reserved_future_use field, a stream_content field (first stream content information), a component_type field (component type information), a component_tag field, an ISO_639_language_code field, and/or a text_char field.

The stream_content_ext field (second stream content information) may be combined with the stream_content field to identify a type of a stream. The component descriptor may further include the stream_content_ext field and extend a space for defining the stream_content.

The component_tag field may include information for identifying the component stream. That is, the component_tag field may identify a video stream indicated by the component descriptor. For example, the component_tag field may have the same value as the component_tag field in a stream identifier descriptor (when this is present in a PSI program map section) for the component stream.

A plurality of component descriptors may be present with respect to the same value of the component_tag field. For example, the SDT and/or the EIT may each include a plurality of component descriptors. The SDT may include one component descriptor and the EIT may include a plurality of component descriptors.

In order to identify a type (e.g., aspect ratio of 16:9, side-by-side, and/or top and bottom) of the component stream (e.g., video stream), a plurality of component descriptors may be present with respect to one component stream.

A detailed description of the component descriptor is the same as the above description and, thus, will be substituted with the above description.

Referring to the drawing, according to an embodiment of the present invention, an additional component descriptor may include image format information of a left image and a right image included in a video stream.

When a value of the stream_content field is '0xA', if a value of the stream_content_ext field is '0x0' and a value of the component_type field is '0x00', the image format information may indicate "Top-and-Bottom". When a value of the stream_content field is '0xA', if a value of the stream_content_ext field is '0x0' and a value of the component_type field is '0x01', the image format information may indicate "Side-by-Side". The value of the stream_content field, the value of the stream_content_ext field, and/or the value of the component_type field may not be fixed and may be changed.

The signaling information may include a plurality of component descriptors. In this case, at least one component descriptor may identify the same bitstream. Some of at least one component descriptor may be component descriptors having the same content for identifying the same bitstream. In addition, the other some of the at least one component descriptor may be component descriptors having different contents for identifying the same bitstream.

A combination of the stream_content field and the component_type field may identify at least one of encoding type information (compression information) of a bitstream (e.g., video stream and/or audio stream), image format information of a left image and a right image included in a video stream for providing a 3D service, profile information (e.g. profile information of HEVC) of video data, image ratio information, frame rate information, and/or information for identifying types of other bitstreams (which include video data, subtitle, and/or audio data).

Accordingly, each component descriptor may include at least one of encoding type information (compression information) of a bitstream (e.g., video stream and/or audio stream), image format information of a left image and a right image included in a video stream for providing a 3D service, profile information (e.g. profile information of HEVC) of video data, image ratio information, frame rate information, and/or information for identifying types of other bitstreams which include video data, subtitle, and/or audio data).

The receiving apparatus may combine at least one component descriptor to acquire encoding type information of a bitstream, image format information of a left image and a right image included in a video stream for providing a 3D service, and/or additional information on a bitstream. For example, the receiving apparatus may combine at least one component descriptors to acquire information indicating that a bitstream is encoded using a H.265/HEVC video coding scheme and/or information indicating that image format is side-by-side format. The receiving apparatus may combine at least one component descriptor to acquire information indicating that a bitstream provides an SFC-3D service.

The component descriptor may include values of the stream_content field, the stream_content_ext field, and/or the component_type field which are used in the conventional 2D service (2D HEVC). For example, when a value of the stream_content field of the component descriptor is '0x09', a value of the stream_content_ext field is '0x0', and a value of the component_type field is '0x00', video data may indicate "HEVC Main Profile high definition video, 50 Hz". When a value of the stream_content field of the component descriptor is '0x09', a value of the stream_content_ext field is '0x0', and a value of the component_type field is '0x01', video data may indicate "HEVC Main 10 Profile high definition video, 50 Hz". When a value of the stream_content field of the component descriptor is '0x09', a value of the stream_content_ext field is '0x0', and a value of the component_type field is '0x02', video data may indicate "HEVC Main Profile high definition video, 60 Hz". When a value of the stream_content field of the component descriptor is '0x09', a value of the stream_content_ext field is '0x0', and a value of the component_type field is '0x03', video data may indicate "HEVC Main 10 Profile high definition video, 60 Hz". When a value of the stream_content field of the component descriptor is '0x09', a value of the stream_content_ext field is '0x0', and a value of the component_type field is '0x04', video data may indicate "HEVC ultra high definition video".

The component descriptor may include a value of a new value of the stream_content field, a value of the stream_content_ext field, and/or a value of the component_type field, which are applicable to the SFC-3D service.

Accordingly, the conventional 2D receiving apparatus may process video data based on values of the stream_content field, the stream_content_ext field, and/or the component_type field, which are used in the conventional 2D service, and display a 2D image. In addition, a receiving apparatus for supporting the SFC-3D service may process video data based on a newly defined value of the stream_content field, a value of the stream_content_ext field, and/or a value of the component_type field and display a 2D image and/or a 3D image.

In addition, according to an embodiment of the present invention, an SFC-3D service may identify one type of the same bitstream (e.g., video stream) based on multiple component descriptors.

For example, the signaling information may include a first component descriptor, a second component descriptor, a third component descriptor, and/or a fourth component descriptor. The first component descriptor, the second component descriptor, the third component descriptor, and/or the fourth component descriptor may identify the same bit stream with the same value of the component_tag field.

When a value of the stream_content field of the first component descriptor is '0x09', a value of the stream_content_ext field is '0x0', and a value of the component_type field is '0x00', video data may indicate "HEVC Main Profile high definition video, 50 Hz".

When a value of the stream_content field of the second component descriptor is '0x0B', a value of the stream_content_ext field is '0xF', and a value of the component_type field is '0x03', video data may indicate "plano-stereoscopic top and bottom (TaB) frame-packing".

When a value of the stream_content field of the third component descriptor is '0x0B', a value of the stream_content_ext field is '0xF', and a value of the component_type field is '0x01', video data may indicate "16:9 aspect ratio".

When a value of the stream_content field of the fourth component descriptor is '0x0B', a value of the stream_content_ext field is '0xF', and a value of the component_type field is '0x03', video data may indicate "plano-stereoscopic top and bottom (TaB) frame-packing". Here, the second component descriptor and the fourth component descriptor may have the same content for identifying the same stream.

Accordingly, the signaling information may be formed by combining at least one of the first component descriptor, the second component descriptor, the third component descriptor, and/or the fourth component descriptor to identify one the same video stream.

The receiving apparatus may identify a type of a received bitstream based on at least one component descriptor. Even if the receiving apparatus may not recognize some of a plurality of component descriptors, the receiving apparatus may receive a service. That is, the receiving apparatus may process a relationship between a plurality of component descriptors via operation "or" and receive a service based on only the some component descriptors.

For example, upon receiving only the first component descriptor, the receiving apparatus may identify that the received video stream is high definition video encoded using a H.265/HEVC video coding scheme.

Upon receiving the first component descriptor and the second component descriptor, the receiving apparatus may combine the first component descriptor and the second component descriptor to identify that the received video stream is High Definition video encoded using a H.265/HEVC video coding scheme and that image format information of a left image and a right image included in a video stream is "plano-stereoscopic top and bottom (TaB) frame-packing".

Even if the receiving apparatus may not receive at least one of a plurality of component descriptors during reception of the signaling information, the receiving apparatus may receive the other component descriptors to identify one the same video stream. For example, even if the receiving apparatus may not receive the fourth component descriptor, the receiving apparatus may receive the second component descriptor and identify that image format information 을 of a left image and a right image included in a video stream is "plano-stereoscopic top and bottom (TaB) frame-packing".

FIG. 72 is diagram illustrating a linkage_type field and/or a link_type field of a linkage descriptor according to an embodiment of the present invention.

The signaling information may include the linkage descriptor.

The linkage descriptor may indicate a service to be present when additional information related to a specific entity in an SI system is required. The linkage descriptor may be present in a corresponding table that requires a service for providing additional information. The service replacement service may be determined using the linkage descriptor and, in this regard, when a running status of a currently executed service is 'non running', the receiving apparatus may automatically select a corresponding replacement service.

For example, the linkage descriptor may be included in SDT and/or EIT. However, when a value of the linkage_type field is '0x0D' to '0x1F', the linkage descriptor may be included only in the EIT. The receiving apparatus may recognize a 3D service or event corresponding to a currently viewed a specific 2D service_id or next broadcast specific 2D event_id based on the linkage descriptor.

The linkage descriptor may include a descriptor_tag field, a descriptor_length field, a transport_stream_id field, an original_network_id field, a service_id field, a linkage_type field, a mobile_hand-over_info( ) field, an event_linkage_info( ) field, an extended_event_linkage_info( ) field, and/or a private_data_byte field. A detailed description of the linkage descriptor will be substituted with the above description.

Figure 73:
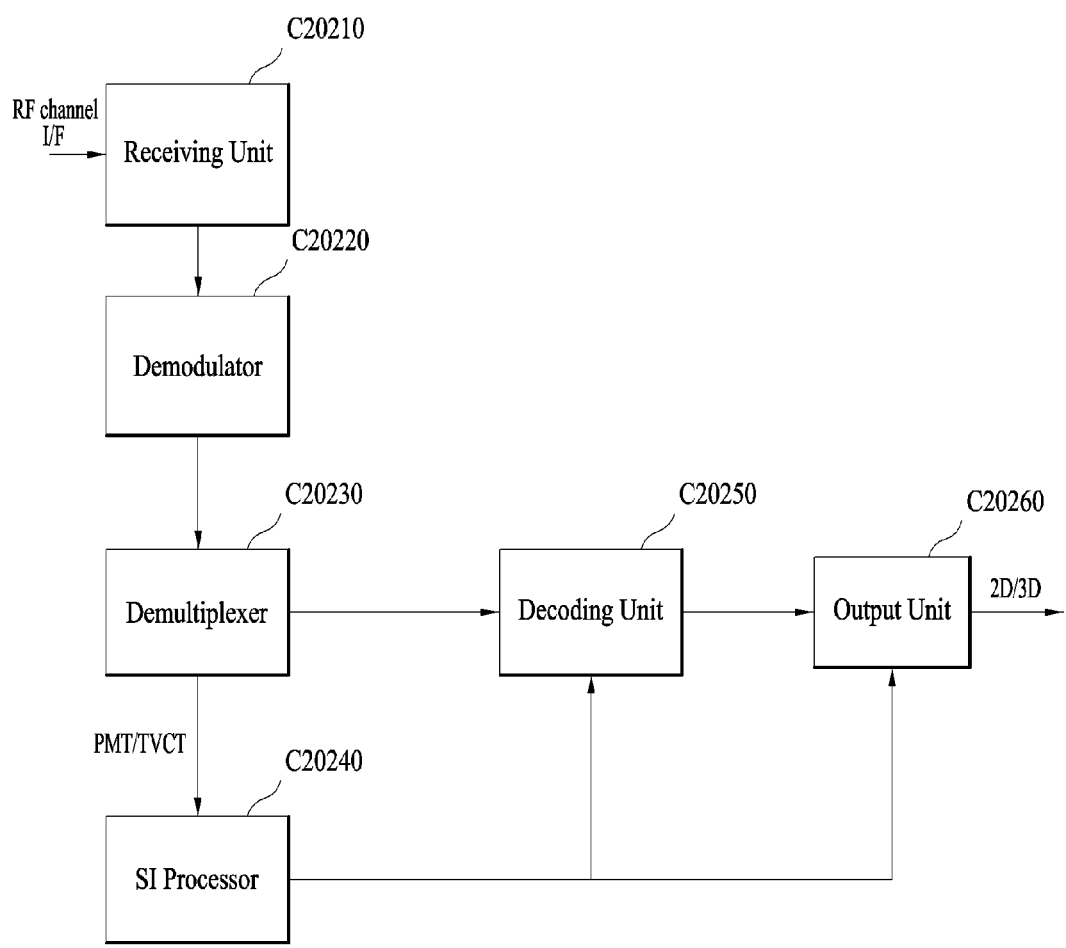
FIG. 73 is a block diagram of a receiving apparatus according to an embodiment of the present invention.

FIG. 73 is a block diagram of a receiving apparatus according to an embodiment of the present invention.

Referring to the drawing, the receiving apparatus according to an embodiment of the present invention may include a receiving unit C20210, a demodulator C20220, a demultiplexer C20230, a signaling information processor C20240, a decoding unit C20250, and/or an output unit C20260. The above description may be applied to a broadcast signal transmitting apparatus.

The receiving unit C20210 may receive a broadcast signal through a radio frequency (RF) channel.

The receiving unit C20210 may receive a broadcast signal including a video stream of a video component and signaling information for signaling the video stream. The video stream may provide one of frame compatible 3-dimensional television (3DTV) service and a High Definition Television (HDTV) service.

For example, the signaling information may include first information indicating whether a video stream is frame compatible 3DTV video format or High Definition Television (HDTV) video format, service type information indicating that a service type of a video stream is service type information indicating a High Efficiency Video Coding (HEVC) service, and a plurality of component descriptors indicating a type of an HEVC service with respect to a video stream.

The signaling information may include at least one of a Frame Packing Arrangement SEI message, Default Display Window (DDW) information, AFD/bar data, HEVC_video_descriptor, content_descriptor, Disparity Signaling Segment (DSS), information on DVB subtitle, subtitling descriptor, disparity information, a video depth range descriptor, multi-region disparity, a service descriptor, a component descriptor, and/or a linkage descriptor.

The demodulator C20220 may demodulate the received broadcast signal.

The demultiplexer C20230 may demultiplex audio data, video data, and/or signaling information from the demodulated broadcast signal. To this end, the demultiplexer C20230 may perform filtering using packet identifier (PID) to demultiplex a broadcast signal. The demultiplexer C20230 may output the demultiplexed video signal to the decoding unit C20250 of a rear end and output the signaling information to the signaling information processor C20240.

The signaling information processor C20240 may process the signaling information transmitted from the demultiplexer C20230. The signaling information processor C20240 may identify a type of a video stream based on the signaling information. Here, the signaling information processor C10240 may include a database (DB) inside or outside thereof for temporally storing the processed signaling information.

The signaling information processor C20240 may order switching between the 3DTV video format and the HDTV video format based on the signaling information. The receiving apparatus may receive switching information for ordering output of a video stream in a 2D image mode from a user. In this case, the signaling information may include switching information.

The decoding unit C20250 may receive and decode the demultiplexed video data. For example, the decoding unit C20250 may decode the video data based on the signaling information. The decoding unit C20250 may decode a video stream of the 3DTV video format and/or the HDTV video format.

The output unit C20260 may format and output the decoded video data items according to output format. The output unit C20260 may output the video stream in one format among the 3DTV video format and the HDTV video format.

Here, the output unit C20260 may format the decoded video data according to output form for 3D output when the video data is 3DTV video data. The output unit C20260 may output the video data without separate processing of the video data according to output format for 2D output.

Hereinafter, a method of receiving a broadcast signal according to an embodiment of the present invention will be described.

The signaling information processor C20240 may process signaling information items included in the PMT. The signaling information processor C20240 may acquire channel information received based on the signaling information and generate a channel map.

The signaling information processor C20240 may identify whether the received video stream is 3DTV video format or HDTV video format.

For example, the signaling information processor C20240 may check the non_packed_constraint_flag of the HEVC video descriptor included in the PMT. The non_packed_constraint_flag field may indicate whether the video stream is 3DTV video format or HDTV video format. The non_packed_constraint_flag field may signal whether the Frame Packing Arrangement SEI message is present in the video stream.

For example, when the non_packed_constraint_flag field indicates that a video stream is 3DTV video format, the Frame Packing Arrangement SEI message may be present. When the non_packed_constraint_flag field indicates that the video stream is HDTV video format, the Frame Packing Arrangement SEI message may not be present.

When the video stream is HDTV video format, the decoding unit C20250 may decode a video stream of the HDTV video format. The output unit C20260 may output the decoded video stream as a 2D image.

When the video stream is 3DTV video format, the signaling information processor C20240 may identify a type of a service of the video stream and a type of a component stream.

First, the signaling information processor C20240 may identify a type of a service based on service type information (service_type field) of a service descriptor.

The service_type field may signal whether an HEVC video service is present in the broadcast signal (e.g., MPEG-TS). For example, when a value of the service_type field is "0x1F", the service type may indicate "HEVC digital television service" and/or "H.265/HEVC frame compatible HD service".

Then the signaling information processor C20240 may identify a type of a component stream based on first stream content information (stream_content field), second stream content information, and component type information (component_type field) of a component descriptor.

For example, each component descriptor may include first stream content information indicating a type of a video stream, second stream content information combined with the first stream content information to indicate a type of the video stream, and component type information indicating a type of a video component. The component descriptor may indicate a type of the HEVC service based on the first stream content information, the second stream content information, and the component type information.

A plurality of component descriptors may be present in the same value of the component_tag field. For example, SDT and/or EIT may each include a plurality of component descriptors. The SDT may include one component descriptor and the EIT may include a plurality of component descriptors. In order to identify a type (e.g., 16:9 aspect ratio, side-by-side, and/or top and bottom) of a component stream (e.g., video stream), a plurality of component descriptors may be present with respect to one component stream.

For example, when a value of the stream_content field of the first component descriptor is '0x09', a value of the stream_content_ext field is '0x0', and a value of the component_type field is '0x00', video data may indicate "HEVC Main Profile high definition video, 50 Hz".

When a value of the stream_content field of the second component descriptor is '0x0B', a value of the stream_content_ext field is '0xF', and a value of the component_type field is '0x03', video data may indicate "plano-stereoscopic top and bottom (TaB) frame-packing".

According to an embodiment of the present invention, the service type information and the first component descriptor may be included in the SDT and the second component descriptor may be included in the EIT.

According to an embodiment of the present invention, the SDT and/or the EIT may each include a plurality of component descriptors. For example, the SDT and/or the EIT may include at least one first component descriptor and/or at least one second component descriptor.

The signaling information processor C20240 may combine the first component descriptor and the second component descriptor to identify that the received video stream is High Definition video encoded using a H.265/HEVC video coding scheme and that image format information of a left image and a right image included in a video stream is "plano-stereoscopic top and bottom (TaB) frame-packing".

The signaling information processor C20240 may acquire the Frame Packing Arrangement SEI message included in the video stream. The signaling information processor C20240 may acquire detailed information on a video stream based on the Frame Packing Arrangement SEI message. For example, the Frame Packing Arrangement SEI message may include a frame_packing_arrangement_id field, a frame_packing_arrangement_cancel_flag field, a frame_packing_arrangement_type field, a quincunx_sampling_flag field, a content_interpretation_type field, a spatial_flipping_flag field, a frame0_flipped_flag field, a field_views_flag field, a current_frame_is_frame0_flag field, a frame0_self_contained_flag field, a frame1_self_contained_flag field, a frame0_grid_position_x field, a frame0_grid_position_y field, a frame1_grid_position_x field, a frame1_grid_position_y field, a frame_packing_arrangement_reserved_byte field, a frame_packing_arrangement_repetition_period field, and/or a frame_packing_arrangement_extension_flag field.

The output unit C20260 may output the video stream as a 3D image based on the Frame Packing Arrangement SEI message.

The output unit C20260 may divide the 3D image into a left image and a right image based on the Frame Packing Arrangement SEI message. The output unit C20260 may format the left image and the right image and output a 3D image. To this end, the output unit C20260 may further include a formatter (not shown) for formatting the left image and the right image according to a 3D output format.

The output unit C20260 may effectively change an image ratio according to an aspect ratio of the receiving apparatus based on the AFD/bar data and output a 3D image.

The receiving apparatus may input switching information for ordering output of a video stream in a 2D image mode from a user. In this case, the signaling information may include switching information.

Upon ordering output of the signaling information in a 2D image mode, the signaling information processor C20240 may extract one of the left image and right image from the video stream. The output unit C20260 may output the one extracted image as a 2D image.

For example, the signaling information processor C20240 may acquire Default Display Window (DDW) information and/or AFD/bar data. That is, in the case of a stream including the Frame packing arrangement SEI message, the DDW information may include information for extracting a 2D image from a 3D image and the AFD/bar data may include information for extracting a valid region from an entire encoded video region.

The output unit C20260 may extract the 2D image from the 3D image based on the Default Display Window (DDW) information and separate a valid region based on the AFD/bar data.

The output unit C20260 may upscale using the one extracted image.

According to an embodiment of the present invention, the broadcast signal transmitting apparatus may include a first encoder (not shown), a second encoder (not shown), and/or a transmitting unit (not shown).

The first encoder may generate a video stream in the video component. The video stream may provide one of frame compatible 3-dimensional Television (3DTV) service and a High Definition Television (HDTV) service.

The signaling information may include first information indicating whether the video stream is frame compatible 3DTV video format or High Definition Television (HDTV) video format, service type information indicating that a service type of a video stream is a High Efficiency Video Coding (HEVC) service, and a plurality of component descriptors indicating a type of the HEVC service with respect to a video stream. The transmitter may transmit a broadcast signal including the video stream and the signaling information.

According to an embodiment of the present invention, the broadcast signal transmitting method may be performed by the aforementioned broadcast signal transmitting apparatus and may be inversely performed to the broadcast signal receiving method. The above description may be applied to the aforementioned broadcast signal transmitting apparatus and/or broadcast signal transmitting method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR INVENTION

Various embodiments have been described in the best mode for carrying out the invention.

INDUSTRIAL APPLICABILITY

The present invention may be industrially applied to a series of industrial fields related to a broadcast signal transmitting method, a broadcast signal receiving method, a broadcast signal transmitting apparatus, and a broadcast signal receiving apparatus.

The invention claimed is:

1. A broadcast signal transmitting apparatus, comprising:
a first encoder configured to generate a video stream of a frame compatible 3-Dimensional Television (3DTV) service;
a second encoder configured to generate signaling information for signaling the video stream,
wherein the signaling information includes first information indicating whether the video stream includes a frame packing arrangement supplemental enhancement information (SEI) message, service type information indicating that a service type of the video stream is a High Efficiency Video Coding (HEVC) frame compatible 3DTV service, and a plurality of component descriptors indicating a type of component stream with respect to the video stream,
wherein each of the plurality of component descriptors includes:
component tag information includes information for identifying component stream,
first stream content information,
second stream content information indicating a stream type of the component stream in combination with the first stream content information, and
component type information indicating a component type of the component stream, and
wherein a combination of the first stream content information, the second stream content, and the component type information indicates the type of the component stream; and
a transmitter configured to transmit a broadcast signal comprising the video stream and the signaling information.

2. The broadcast signal transmitting apparatus according to claim 1,
wherein a combination of the first stream content information, the second stream content, and the component type information included in a first component descriptor among the plurality of component descriptors indicates a first type of the component stream,
wherein a combination of the first stream content information, the second stream content, and the component type information included in a second component descriptor among the plurality of component descriptors indicates a second type of the component stream, and
wherein when component tag information of the first component descriptor and component tag information of the second component descriptor are same each other, the first component descriptor and the second component descriptor with the same component tag information indicate the first type and the second type of the component stream at a time.

3. The broadcast signal transmitting apparatus according to claim 2, wherein a combination of the first stream content information, the second stream content, and the component type information included in the first component descriptor indicates codec type of the component stream, and wherein the codec type indicates HEVC.

4. The broadcast signal transmitting apparatus according to claim 3, wherein a combination of the first stream content information, the second stream content, and the component type information included in the second component descriptor indicates one of image ratio type of the component stream, and image format type of the component stream.

5. The broadcast signal transmitting apparatus according to claim 4, wherein:
the first information is included in a Program Map Table (PMT),
the service type information and the first component descriptor are included in a Service Descriptor Table (SDT), and
the second component descriptor is included in an Event Information Table (EIT).

6. The broadcast signal transmitting apparatus according to claim 4, wherein the image format type indicates a top and bottom format.

7. A broadcast signal receiving apparatus, comprising:
a receiving unit configured to receive a broadcast signal comprising a video stream of a frame compatible 3-Dimensional Television (3DTV) service and signaling information for signaling the video stream,
wherein the signaling information includes first information indicating whether the video stream includes frame packing arrangement supplemental enhancement information (SEI) message, service type information indicating that a service type of the video stream is a High Efficiency Video Coding (HEVC) frame compatible 3DTV service, and a plurality of component descriptors indicating a type of component stream with respect to the video stream;

wherein each of the plurality of component descriptors includes:
  component tag information includes information for identifying component stream,
  first stream content information,
  second stream content information indicating a stream type of the component stream in combination with the first stream content information, and
  component type information indicating a component type of the component stream, and
wherein a combination of the first stream content information, the second stream content, and the component type information indicates the type of the component stream,
a signaling information processor configured to identify the type a of the component stream with respect to the video stream based on the signaling information; and
an output unit configured to output the video stream.

8. The broadcast signal receiving apparatus according to claim 7,
  wherein a combination of the first stream content information, the second stream content, and the component type information included in a first component descriptor among the plurality of component descriptors indicates a first type of the component stream,
  wherein a combination of the first stream content information, the second stream content, and the component type information included in a second component descriptor among the plurality of component descriptors indicates a second type of the component stream, and
  wherein when component tag information of the first component descriptor and component tag information of the second component descriptor are same each other, the first component descriptor and the second component descriptor with the same component tag information indicate the first type and the second type of the component stream at a time.

9. The broadcast signal receiving apparatus according to claim 8, wherein a combination of the first stream content information, the second stream content, and the component type information included in the first component descriptor indicates codec type of the component stream, and wherein the codec type indicates HEVC.

10. The broadcast signal receiving apparatus according to claim 9,
  wherein a combination of the first stream content information, the second stream content, and the component type information included in the second component descriptor indicates one of image ratio type of the component stream, and image format type of the component stream.

11. The broadcast signal receiving apparatus according to claim 10, wherein:
  the first information is included in a Program Map Table (PMT),
  the service type information and the first component descriptor are included in a Service Descriptor Table (SDT), and
  the second component descriptor is included in an Event Information Table (EIT).

12. The broadcast signal receiving apparatus according to claim 10, wherein the image format type indicates a top and bottom format.

* * * * *